US012628027B2

(12) United States Patent     (10) Patent No.:   US 12,628,027 B2

Barac et al.     (45) Date of Patent:    May 12, 2026

(54) FIRST NODE, SECOND NODE AND METHODS PERFORMED THEREBY IN A COMMUNICATIONS NETWORK FOR HANDLING TRANSMISSION OF ONE OR MORE PACKETS FROM A SENDING NODE TO A RECEIVING NODE

(71) Applicant: Telefonaktiebolaget LM Ericsson (publ), Stockholm (SE)

(72) Inventors: Filip Barac, Huddinge (SE); Gunnar Mildh, Sollentuna (SE); Oumer Teyeb, Montréal (CA); Ajmal Muhammad, Sollentuna (SE); Per-Erik Eriksson, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 301 days.

(21) Appl. No.: 17/919,525

(22) PCT Filed: Apr. 16, 2021

(86) PCT No.: PCT/SE2021/050348
§ 371 (c)(1),
(2) Date: Oct. 17, 2022

(87) PCT Pub. No.: WO2021/211045
PCT Pub. Date: Oct. 21, 2021

(65) Prior Publication Data
US 2023/0164617 A1     May 25, 2023

Related U.S. Application Data

(60) Provisional application No. 63/011,778, filed on Apr. 17, 2020, provisional application No. 63/011,789, (Continued)

(51) Int. Cl.
| | | |
|---|---|---|
| *H04W 28/02* | (2009.01) | |
| *H04W 76/12* | (2018.01) | |
| *H04W 76/15* | (2018.01) | |

(52) U.S. Cl.
CPC ... *H04W 28/0231* (2013.01); *H04W 28/0236* (2013.01); *H04W 76/12* (2018.02); *H04W 76/15* (2018.02)

(58) Field of Classification Search
CPC ......... H04W 28/0231; H04W 28/0236; H04W 76/12; H04W 76/15; H04W 84/047
See application file for complete search history.

(56) References Cited

U.S. PATENT DOCUMENTS

| | | | |
|---|---|---|---|
| 2017/0279723 A1 | 9/2017 | Vedam et al. | |
| 2017/0366618 A1 | 12/2017 | Vrzic et al. | |

(Continued)

FOREIGN PATENT DOCUMENTS

| | | |
|---|---|---|
| CN | 110351024 A | 10/2019 |
| CN | 113259959 A | 8/2021 |

(Continued)

OTHER PUBLICATIONS

International Search Report and the Written Opinion of the International Searching Authority, issued in corresponding International Application No. PCT/SE2021/050348, dated Jul. 20, 2021, 15 pages.

(Continued)

*Primary Examiner* — Sudesh M. Patidar

(74) *Attorney, Agent, or Firm* — Rothwell, Figg, Ernst & Manbeck, P.C.

(57) ABSTRACT

A method performed by a first node, for handling transmission of one or more packets from a sending node to a receiving node. The first node operates in a communications network. The communications network comprises at least (Continued)

one intermediate node between the sending node and the receiving node. The first node determines whether or not to duplicate the one or more packets between the first node and a second node comprised in the communications network. The first node then sends, based on a result of the determination, at least one of the one or more packets and the one or more duplicates, over a Backhaul Adaptation Protocol, BAP, layer, or one or more Backhaul Radio Link Channels between the first node and the second node.

19 Claims, 28 Drawing Sheets

Related U.S. Application Data filed on Apr. 17, 2020, provisional application No. 63/011,801, filed on Apr. 17, 2020.

(56)                 References Cited

U.S. PATENT DOCUMENTS

| | | | |
|---|---|---|---|
| 2018/0279262 A1* | 9/2018 | Babaei | H04L 1/1848 |
| 2018/0324642 A1 | 11/2018 | Yu et al. | |
| 2018/0352523 A1 | 12/2018 | Yang et al. | |
| 2018/0367288 A1 | 12/2018 | Vrzic et al. | |
| 2019/0082363 A1 | 3/2019 | Park et al. | |
| 2019/0215726 A1 | 7/2019 | Park et al. | |
| 2019/0254117 A1* | 8/2019 | Chen | H04L 47/34 |
| 2019/0349139 A1 | 11/2019 | Park et al. | |
| 2020/0084663 A1 | 3/2020 | Park et al. | |
| 2021/0022040 A1 | 1/2021 | Zhu et al. | |
| 2021/0051653 A1 | 2/2021 | Park et al. | |
| 2021/0321298 A1* | 10/2021 | Keskitalo | H04W 84/047 |
| 2022/0015172 A1 | 1/2022 | Xu et al. | |
| 2022/0174535 A1* | 6/2022 | Wu | H04L 1/08 |
| 2022/0217612 A1* | 7/2022 | Wang | H04W 28/0883 |
| 2022/0295341 A1* | 9/2022 | Wu | H04W 28/0278 |
| 2022/0394787 A1 | 12/2022 | Xu et al. | |
| 2023/0106809 A1* | 4/2023 | Wu | H04W 28/0284 |
| | | | 370/229 |

FOREIGN PATENT DOCUMENTS

| | | | |
|---|---|---|---|
| EP | 3 367 625 B1 | 6/2019 | |
| EP | 3 512 140 A1 | 7/2019 | |
| EP | 3 764 736 B1 | 12/2022 | |
| GB | 2586261 A | 2/2021 | |
| JP | 2007-274256 A | 10/2007 | |
| WO | 2019/192535 A1 | 10/2019 | |
| WO | 2020/033965 A1 | 2/2020 | |
| WO | 2020/060141 A1 | 3/2020 | |
| WO | 2020/064861 A1 | 4/2020 | |

OTHER PUBLICATIONS

Ericsson, "Up Aspects of Supporting NR-DC for IAB-nodes", vol. RAN WG3, No. Reno, NV, USA; May 13, 2019-May 17, 2019, May 13, 2019 (May 13, 2019), 3GPP Draft; R3-192436—Up Aspects of Supporting NR-DC for IAB-Nodes, 3rd Generation Partnership Project (3GPP), Mobile Competence Centre; 650, Route Des Lucioles; F-06921 Sophia-Antipolis Cedex, 5 pages.

3GPP 3GPP TS 38.340 V0. 2.1 (Feb. 2020), "3rd Generation Partnership Project; Technical Specification Group Radio Access Network; NR; Backhaul Adaptation Protocol (BAP) specification (Release 16)" 22 pages.

3GPP Ts 38.300, V16.0.0 (Dec. 2019) "3rd Generation Partnership Project; Technical Specification Group Radio Access Network; NR; NR and NG-RAN Overall Description; Stage 2 (Release 16)" 101 pages.

3GPP TS 37.340 V16.1.0 (Mar. 2020) "3rd Generation Partnership Project; Technical Specification Group Radio Access Network; Evolved Universal Terrestrial Radio Access (E-UTRA) and NR; Multi-connectivity; Stage 2 (Release 16)" 74 pages.

3 GPP TR 38.874 V16.0.0 (Dec. 2018) "3rd Generation Partnership Project; Technical Specification Group Radio Access Network; NR; Study on Integrated Access and Backhaul; (Release 16)" 111 pages.

3GPP TS 38.473 V16.1.0 "3rd Generation Partnership Project; Technical Specification Group Radio Access Network; NG-RAN; F1 application protocol (F1AP) (Release 16)" Mar. 20, 2020, 240 pages.

Qualcomm "New WID: Integrated Access and Backhaul for NR" 3GPP TSG RAN Meeting #82, RP-182882 (revision of RP-182810), Sorrento, Italy, Dec. 10-13, 2018, 7 pages.

3GPP TS 36.323 V16.2.0 (Sep. 2020) (56 pages).

3GPP TS 37.340 V16.3.0 (Sep. 2020) (83 pages).

3GPP TS 38.300 V16.3.0 (Sep. 2020) (148 pages).

3GPP TS 38.340 V16.2.0 (Sep. 2020) (22 pages).

3GPP TS 38.473 V15.8.0 (Dec. 2019) (222 pages).

3GPP TS 38.473 V16.3.1 (Oct. 2020) (455 pages).

Ericsson, "Backhaul Adaptation Protocol (BAP) Header Content", R2-1910483, 3GPP TSG-RAN WG2 Meeting #107, Prague, Czech Republic Aug. 26-30, 2019 (3 pages).

Ericsson, "(TP for NR-IAB BL CR for TS 38.473): Backhaul RLC Channel Mapping Configuration for IAB-nodes", R3-202308, 3GPP TSG-RAN WG3 Meeting #107bis-e Online, Apr. 20-30, 2020 (39 pages).

O. Teyeb, et al, "Integrated Access Backhauled Networks", IEEE Ericsson Research, Sweden (2019) (5 pages).

* cited by examiner a)

b)

c)

b)

c)

a)

a)

b)

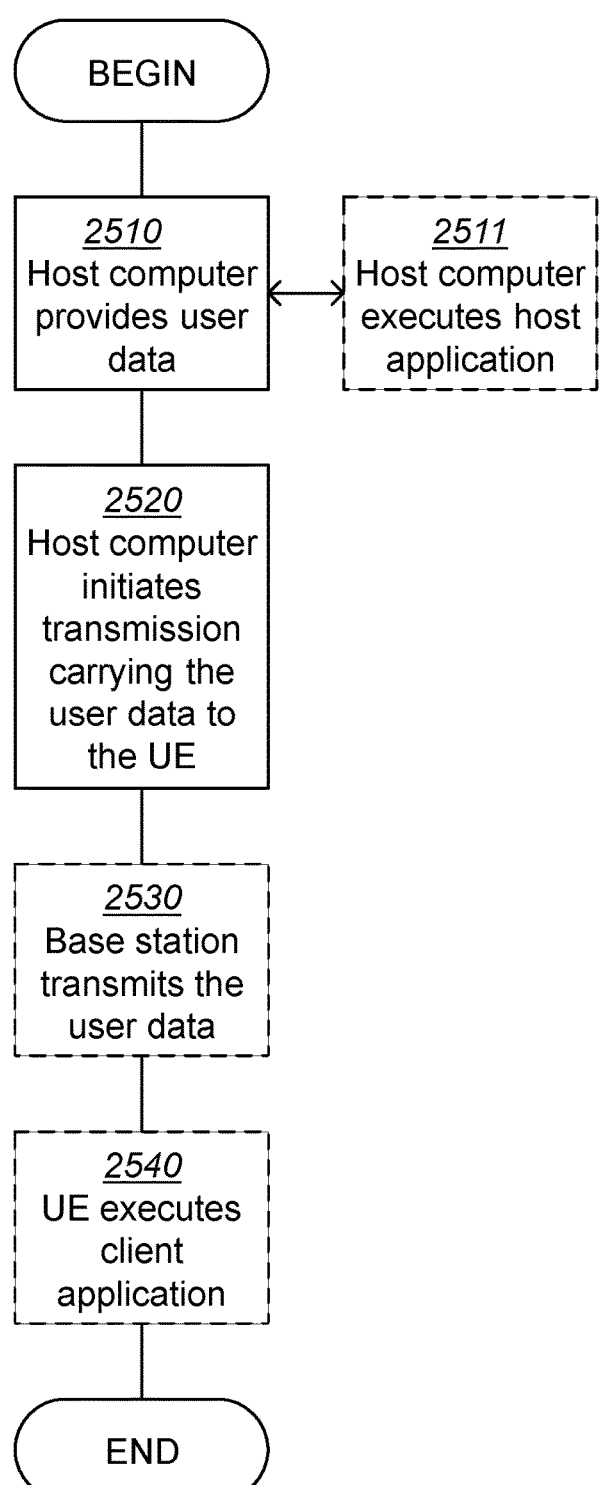
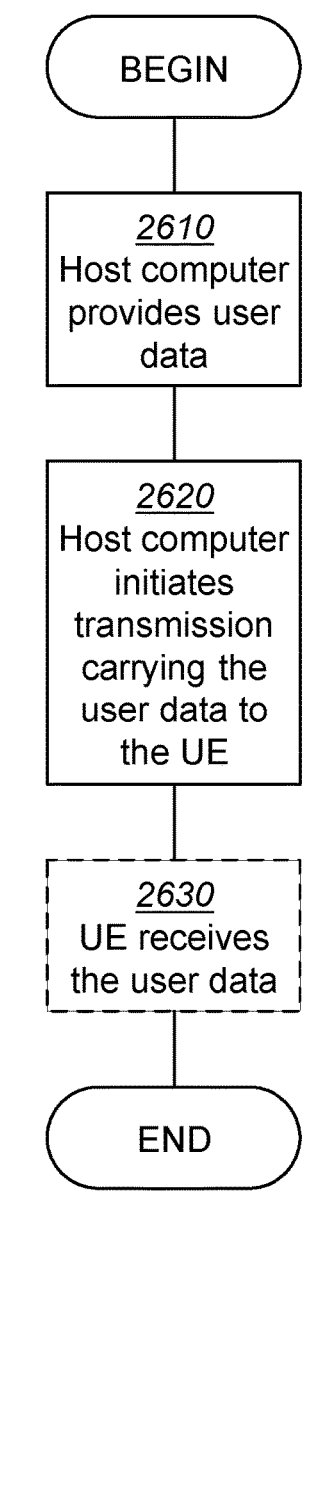
FIG. 25
FIG. 26

FIRST NODE, SECOND NODE AND METHODS PERFORMED THEREBY IN A COMMUNICATIONS NETWORK FOR HANDLING TRANSMISSION OF ONE OR MORE PACKETS FROM A SENDING NODE TO A RECEIVING NODE

CROSS REFERENCE TO RELATED APPLICATION(S)

This application is a 35 U.S.C. § 371 National Phase of PCT/SE2021/050348, filed Apr. 16, 2021, designating the United States, which claims the benefit of U.S. Provisional Application Nos. 63/011,778, 63/011,789, and 63/011,801 filed Apr. 17, 2020, the disclosures of which are incorporated herein in their entirety by reference.

TECHNICAL FIELD

The present disclosure relates generally to a first node and methods performed thereby for handling transmission of one or more packets from a sending node to a receiving node. The present disclosure also relates generally to a second node and methods performed thereby for handling transmission of the one or more packets from the sending node to the receiving node.

BACKGROUND

Nodes within a communications network may be wireless devices such as e.g., User Equipments (UEs), stations (STAs), mobile terminals, wireless terminals, terminals, and/or Mobile Stations (MS). Wireless devices are enabled to communicate wirelessly in a cellular communications network or wireless communication network, sometimes also referred to as a cellular radio system, cellular system, or cellular network. The communication may be performed e.g., between two wireless devices, between a wireless device and a regular telephone, and/or between a wireless device and a server via a Radio Access Network (RAN), and possibly one or more core networks, comprised within the communications network. Wireless devices may further be referred to as mobile telephones, cellular telephones, laptops, or tablets with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another terminal or a server.

Nodes may also be network nodes, such as radio network nodes, e.g., Transmission Points (TP). The communications network covers a geographical area which may be divided into cell areas, each cell area being served by a network node such as a Base Station (BS), e.g. a Radio Base Station (RBS), which sometimes may be referred to as e.g., gNB, evolved Node B ("eNB"), "eNodeB", "NodeB", "B node", or BTS (Base Transceiver Station), depending on the technology and terminology used. The base stations may be of different classes such as e.g. Wide Area Base Stations, Medium Range Base Stations, Local Area Base Stations and Home Base Stations, based on transmission power and thereby also cell size. A cell is the geographical area where radio coverage is provided by the base station at a base station site. One base station, situated on the base station site, may serve one or several cells. Further, each base station may support one or several communication technologies. The communications network may also be a noncellular system, comprising network nodes which may serve receiving nodes, such as wireless devices, with serving beams. In 3rd Generation Partnership Project (3GPP) Long Term Evolution (LTE), base stations, which may be referred to as eNodeBs or even eNBs, may be directly connected to one or more core networks. In the context of this disclosure, the expression Downlink (DL) may be used for the transmission path from the base station to the wireless device. The so-called 5th Generation (5G) system, from a radio perspective started to be standardized in 3GPP, and the so-called New Radio or Next Radio (NR) is the name for the radio interface. NR architecture is being discussed in 3GPP. In the current concept, gNB denotes NR BS, where one NR BS may correspond to one or more transmission/reception points. The expression Uplink (UL) may be used for the transmission path in the opposite direction i.e., from the wireless device to the base station.

Carrier Aggregation and Dual Connectivity in LTE and NR

General

There may be different ways to deploy a 5G network with or without interworking with LTE, also referred to as Evolved Universal Terrestrial Radio Access (E-UTRA), and evolved packet core (EPC), as depicted in FIG. 1. These different ways are depicted schematically in FIG. 1 as different Options, wherein Option 1 corresponds to standalone LTE connected to EPC, Option 2 corresponds to Standalone NR connected to SGCN, or NR-NR DC, Option 3 corresponds to LTE-NR DC connected to EPC (EN-DC), Option 4 corresponds to NR-LTE DC, connected to SGCN (NE-DC), Option 5 corresponds to LTE connected to SGCN (eLTE or LTE-5GC), and Option 7 corresponds to LTE-NR DC, connected to SGCN (NGEN-DC). In principle, NR and LTE may be deployed without any interworking, denoted by NR stand-alone (SA) operation, that is, an eNB may be connected to an EPC and a gNB in NR may be connected to a 5G core network (5GC), with no interconnection between the two, as depicted, respectively, in Option 1 and Option 2 in the figure. On the other hand, the first supported version of NR is the so-called Evolved Universal Terrestrial Radio Access Network (E-UTRAN)-NR Dual Connectivity (EN-DC), illustrated by Option 3. In such a deployment, dual connectivity between NR and LTE may be applied with LTE as the master and NR as the secondary node. The RAN node (gNB) supporting NR, may not have a control plane connection to the EPC core network, instead it may rely on the LTE as master node (MeNB). This is also referred to as "Non-standalone NR". It may be noted that in this case, the functionality of an NR cell may be limited and may be used for connected mode UEs as a booster and/or as a diversity leg, but an RRC_IDLE UE cannot camp on these NR cells.

With introduction of 5GC, other options may be also valid. As mentioned above, Option 2 supports a stand-alone NR deployment where a gNB may be connected to a 5GC. Similarly, LTE may also be connected to a 5GC using Option 5, also known as eLTE, E-UTRA/5GC, or LTE/5GC, and the node may be referred to as an ng-eNB. In these cases, both NR and LTE may be seen as part of the NG-RAN, and both the ng-eNB and the gNB may be referred to as NG-RAN nodes. It is worth noting that, Option 4 and option 7 are other variants of dual connectivity between LTE and NR which will be standardized as part of NG-RAN connected to 5GC, denoted by Multi-Radio Dual Connectivity (MR-DC). Option 6 and 8, where gNB may be connected to an EPC, with and without interconnectivity to LTE, may also be possible, although they seem to be less practical and hence they will not be pursued further in 3GPP.

As migration for these options may differ from different operators, it is possible to have deployments with multiple options in parallel in the same network, e.g., there may be a eNB base station supporting option 3, 5 and 7 in the same network, as an NR base station supporting 2 and 4.

Dual Connectivity in LTE/NR

E-UTRAN may support Dual Connectivity (DC) operation, whereby a multiple Rx/Tx UE in RRC_CONNECTED may be configured to utilize radio resources provided by two distinct schedulers, located in two eNBs connected via a non-ideal backhaul over the X2 interface, see 3GPP 36.300. eNBs involved in DC for a certain UE may assume two different roles: an eNB may either act as a Master node (MN) or as a Secondary node (SN). In DC, a UE may be connected to one MN and one SN.

In LTE DC, the radio protocol architecture that a particular bearer may use may depend on how the bearer is setup. Three bearer types may exist: Master Cell Group (MCG) bearer, Secondary Cell Group (SCG) bearer and split bearers. Radio Resource Control (RRC) may be located in the MN and Signaling Radio Bearers (SRBs) may always be configured as MCG bearer type, and therefore only use the radio resources of the MN. FIG. 2 is a schematic diagram illustrating an LTE DC User Plane (UP) depicting an MN 11, an SN 12 and an X2 interface 13. In LTE DC, the radio protocol architecture that a particular bearer may use may depend on how the bearer may be setup. Three bearer types may exist: Master Cell Group (MCG) bearer 14, Secondary Cell Group (SCG) bearer 15 and split bearers 16. RRC may be located in the MN, and Signaling Radio Bearers (SRBs) may be always configured as a MCG bearer type, and therefore only use the radio resources of the MN. FIG. 1 depicts how each of the MCG bearer 14 and SCG bearer 15 has a respective Packet Data Convergence Protocol (PDCP) entity 17 and Radio Link Controller (RLC) entity 18, each connected to a respective Medium Access Control (MAC) 19 entity in each of the MN and SN. The split bearer 16 has a PDCP entity in the MN 11, and is connected to each of the MAC entities 19 in the MN 11 and the SN 12, via, respectively, an RLC entity located in each of the MN 11 and the SN 12.

It may be noted that in DC, it may also be possible to support Carrier Aggregation (CA) in each cell group, namely, MCG and SCG. That is, the MCG may comprise more than one cell working in CA, and the SCG may also comprise more than one cell working in CA. The primary cell in the MCG may be known as the PCell, while the primary cell of the SCG may be known as the PSCell.

LTE-New Radio (NR) DC, also referred to as LTE-NR tight interworking, EN-DC in case the UE is connected to EPC or NGEN-DC, in case the UE is connected to 5GC, has been standardized in 3GPP rel-15. The major changes from LTE DC may be understood to be: a) the introduction of a split bearer from the SN, known as SCG split bearer, b) the introduction of a split bearer for RRC, split SRB1, split SRB2, and c) the introduction of a direct RRC from the SN, also referred to as SCG SRB or SRB3.

FIG. 3 and FIG. 4 show, respectively, the UP and Control Plane (CP) architectures for LTE-NR tight interworking.

FIG. 3 is a schematic diagram illustrating the UP architectures for LTE-NR tight interworking in the MN 21 and the SN 22. An SCG split bearer 23 is present in the SN 22, in addition to the split bearer in the MN 21, which is referred to as an MCG split bearer 24.

FIG. 4 is a schematic diagram illustrating the Control Plane (CP) architecture for LTE-NR tight interworking. An MN 31 operating on LTE, an SN 32 operating on NR, and a UE 33 supporting operation on LTE and NR are illustrated in the Figure, each with its respective protocol stack: RRC 34, PDCP 35, RLC 36, MAC 37 and the Physical layer (PHY) 38. Different signalling radio bearers may be used for carrying RRC messages. SRB0 39, SRB1 40 and SRB2 41, refer to the signalling radio bearers that may be used for carrying RRC messages. An RRC configuration may be sent directly by a configuring node via a direct SRB 42. RRC configurations may be encapsulated in another node's RRC message via Embedded RRC 43.

In EN-DC, the SN may sometimes be referred to as Secondary gNB (SgNB), where the gNB is an NR base station, and the MN as MeNB, in case the LTE is the master node and NR is the secondary node. In the other case, where an NR gNB is the master and an LTE is the secondary node, the corresponding terms may be SeNB and MgNB. If both nodes are NR, the terms MgNB and SgNB may be used.

Split RRC messages may be mainly used for creating diversity, and the sender may decide to either choose one of the links for scheduling the RRC messages, or it may duplicate the message over both links. In the downlink, the path switching between the MCG or SCG legs or duplication on both may be left to network implementation. On the other hand, for the UL, the network may configure the UE to use the MCG, SCG or both legs. The terms "leg" and "path" may be used interchangeably throughout this document.

Bearer Configurations

The UP and CP protocol stacks in NR are shown in FIG. 5 and FIG. 6, respectively.

When reconfiguring the UE 51, the network, e.g., via a gNB 52, may transmit an RRCReconfiguration message containing a RadioBearerConfig and a CellGroupConfig information element. The RadioBearerConfig may configure the Packet Data Convergence Protocol (PDCP) 53 and Service Data Adaptation Protocol (SDAP) 54 protocol layer for all data radio bearers (DRBs) and the PDCP protocol layer for all signaling radio bearers (SRBs). The CellGroupConfig may configure the Radio Link Control (RLC) 55, Medium Access Control (MAC) 56, and Physical Layer (PHY) 57 layer for all radio bearers (RBs).

FIG. 6 further depicts the RRC layer 58 at each of the UE 51 and the gNB 52, as well as the NAS 59 layer terminating at each of the UE 51 and an Access and Mobility Management Function (AMF) 60 node in the 5G core network.

In case of NR-DC, the RRCReconfiguration message may contain one or more RadioBearerConfig and one or more CellGroupConfig, namely radioBearerConfig and radioBearerConfig2 and masterCellGroup and secondaryCellGroup respectively.

Each RadioBearerConfig may contain a list of DRBs and/or SRBs which may be terminated in the respective node, as well as a configuration for the security algorithms to be used.

The CellGroupConfig, on the other hand, may contain configurations for one or more cells associated to the respective node, MN or SN. One of the cells may be denoted as a special cell, Primary Cell (PCell) for the MCG or Primary Secondary Cell (PSCell) for the SCG, which may be the primary cell used for communication. The other cells may be secondary cells (SCells) which may be monitored, in case any of them may be able to provide better radio conditions than the SpCell. The CellGroupConfig may also contain a list of RLC bearers which may be associated to a specific radio bearer with the parameter servedRadioBearer.

As may be seen in FIG. 7, DRBs may be terminated in either the Master node (MN) 70 or the Secondary node (SN) 71 and be transmitted via either the master cell group, via an MCG bearer 72, the secondary cell group, via an SCG bearer 73, or both, via a split bearer 74. Any combination of MN and SN terminated bearers as well as MCG, SCG and split bearers may be configured for a UE. For SRBs, SRB1 and SRB2 may be terminated in the MN and may be either MCG, or split bearers, whereas SRB3 may be terminated in the SN and may only be an SCG bearer. Although the concept shown here shows the system connected to 5GC, the same principles may be understood to apply to EN-DC connected to EPC. The schematic diagram of FIG. 7 further depicts how Quality of Service (QoS) flows 75 arriving at the SDAP layer 76 at each of the MN 71 and the SN 72, and how the each of the MCG bearer 73, SCG bearer 74 and Split bearer 75 cross each of the NR PDCP layer 77, RLC layer 78 and MAC layer 79 at each of the MN 71 and the SN 72, interconnecting between themselves over an Xn connection 80.

When the UE is configured with two RadioBearerConfigs and two CellGroupConfigs, each RLC bearer in either CellGroupConfig may be associated to a radio bearer terminating in either the MN or the SN. In case of split bearers, an RLC bearer in masterCellGroup and an RLC bearer in secondaryCellGroup may be configured with the same RB identity in the servedRadioBearer.

One or more cells may be associated to the MCG or SCG, and the secondary cells (SCells) in each cell group may be used to provide more radio resources to the UE.

Path Selection for Split DRBs

In LTE DC, split DRB operation in the UL may be controlled by two parameters: ul-DataSplitDRB-ViaSCG and ul-DataSplitThreshold, which may be configured for each DRB. The ul-DataSplitDRB-ViaSCG is a Boolean parameter, and if it is set to TRUE, the SCG path may be understood to be the preferred path for UL data transmission, while a value of FALSE may be understood to indicate to the UE that it should send the data via the MCG path. The ul-DataSplitThreshold may be understood to be a buffer size threshold and if the size of the data that is available to be sent at the UE's UL buffer exceeds this value, the UE may be allowed to push data to either the MCG or the SCG legs, whichever leg may provide a grant to it.

The handling of the path selection at the UE may be as captured in the PDCP specifications (TS 36.323) as follows:

For split bearers, when indicating the data available for transmission to a MAC entity for Buffer Status Report (BSR) triggering and Buffer Size calculation, the UE may be required to:

if ul-DataSplitThreshold is configured and the data available for transmission is larger than or equal to ul-DataSplitThreshold:

indicate the data available for transmission to both the MAC entity configured for SCG and the MAC entity configured for MCG;

else:

if ul-DataSplitDRB-ViaSCG is set to TRUE by upper layer:

indicate the data available for transmission to the MAC entity configured for SCG only;

if ul-DataSplitThreshold is configured, indicate the data available for transmission as 0 to the MAC entity configured for MCG;

else:

indicate the data available for transmission to the MAC entity configured for MCG only;

if ul-DataSplitThreshold is configured, indicate the data available for transmission as 0 to the MAC entity configured for SCG.

The same approach as in LTE has also been adopted in NR.

Packet Duplication

Reliability in wireless communication may be typically provided via retransmissions. However, there may be a latency penalty with retransmissions because a retransmission may triggered only be when the first transmission has failed or takes more than the expected time. Thus, for bearers that carry traffic of ultra-reliable low latency (URLLC) services and/or applications, usage of retransmissions may not the be optimal way of assuring reliability. An alternative that has been adopted in 3GPP in rel-15, both in LTE and NR, is Packet duplication, which may be understood to comprise sending the same packets, e.g., PDCP Protocol Data Units (PDUs), twice. That way, no extra latency may need to be used to assure reliability, as both the original and the duplicate packet may be transmitted simultaneously. The overhead in terms of the required capacity for duplication may be minimized by enabling duplication only when the quality of the link associated with that bearer is below a certain level, that is, there may be no need to duplicate packets if the link is in excellent conditions and no packet loss and/or delay is anticipated.

Sending both the duplicate and the original on the same link and carrier may be understood to not be desirable, as the main aim of duplication is to create diversity. There may be two different ways of doing so: Carrier Aggregation (CA) based duplication and Dual Connectivity (DC) base duplication.

CA level duplication may be understood to mean that different carriers may be used to send a duplicate version of the same PDCP PDU. An additional RLC entity and an additional logical channel may be added to the radio bearer to handle the duplicated PDCP PDUs. To ensure the original PDCP PDU and the corresponding duplicate are not be transmitted on the same carrier, logical channel mapping restrictions may be used in MAC, that is, each logical channel of the duplicated bearer may be associated with a given carrier, namely, PCell or SCell.

In DC level duplication, on the other hand, the PDCP PDU may be forwarded to both the MCG and SCG paths that comprise a split bearer. Naturally, DC level duplication may be understood to be applicable only for split DRBs and/or SRBs.

FIG. 8 illustrates several CA and DC duplication alternatives. Panel a) depicts SRB and DRB duplication for EN-DC, panel b) depicts SRB and DRB duplication for NE-DC, and panel c) depicts SRB and DRB duplication for NR-NR DC, according to existing methods. Each of the panels depicts how non-split SRBs/DRBs 81 and split SRBs/DRBs 82 at the MCG 83, and non-split SRBs/DRBs 84 at the SCG 85, cross each of the PDCP layer 86, RLC layer 87, MAC layer 88 and PHY layer 89 at each of the MCG 83 and the SCG 85. Also depicted in each of the panels is how three different PDUs: PDUa 90, PDUb 91, and PDUa 92 may or may not duplicate, as follows.

In EN-DC, CA duplication may be applied in the MN and in the SN, but MCG bearer CA duplication may be configured only in combination with E-UTRAN PDCP and MCG bearer CA duplication may be configured only if DC duplication is not configured for any split bearer.

In NGEN-DC, CA duplication may only be configured for SCG bearer. In NE-DC, CA duplication may only be configured for MCG bearer. In NR-DC, CA duplication may be configured for both MCG and SCG bearers.

PDCP duplication may be configured by RRC, and its initial status, e.g., activated and/or deactivated may also be signaled via RRC. A MAC Control Element (CE) to dynamically control PDCP data duplication, that is, to turn it on or off. A bitmap may be used to indicate per each RB if data duplication is activated or deactivated.

For the CU-DU split architecture where the gNB may be split between a central unit (CU) that terminates the RRC in CP and the PDCP, for both CP and UP, and the distributed unit (DU) that terminates the protocols below the PDCP, that is, RLC, MAC, PHY, enhancements may be made in the F1 protocol, that is, the interface between the CU and DU for the sake of duplication. For CA duplication, separate tunnels may be setup corresponding to the two logical channels associated with the two RLC bearers that may be used for the duplicated bearer. During bearer setup and/or modification, an indication may be included to indicate whether CA/DC duplication is configured for that bearer and the initial state of the duplication, that is, activated or inactivated. The DU may be understood to be the entity that may send the MAC Control Element (CE) for activating and/or deactivating duplication based on these indications that it may be getting from the CU.

Integrated Access Backhaul (IAB) Networks

Protocol and Architectural Aspects

3GPP is currently standardizing integrated access and wireless access backhaul in NR (IAB) in Rel-16 (RP-RP-182882).

The usage of short range mmWave spectrum in NR may be understood to create a need for densified deployment with multi-hop backhauling. However, optical fiber to every base station will be too costly and sometimes not even possible, e.g., at historical sites. The main IAB principle may be understood to be the use of wireless links for the backhaul, instead of fiber, to enable flexible and very dense deployment of cells without the need for densifying the transport network. Use case scenarios for IAB may include coverage extension, deployment of massive number of small cells and Fixed Wireless Access (FWA), e.g., to residential and/or office buildings. The larger bandwidth available for NR in mmWave spectrum may be understood to provide opportunity for self-backhauling, without limiting the spectrum to be used for the access links. On top of that, the inherent multi-beam and Multiple input multiple output (MIMO) support in NR may reduce cross-link interference between backhaul and access links allowing higher densification.

During the study item phase of the IAB work, a summary of the study item may be found in the technical report TR 38.874, it has been agreed to adopt a solution that leverages the Central Unit (CU)/Distributed Unit (DU) split architecture of NR, where the IAB node may be hosting a DU part that may be controlled by a central unit. The IAB nodes may also have a Mobile Termination (MT) part that they may use to communicate with their parent nodes.

The specifications for IAB strive to reuse existing functions and interfaces defined in NR. In particular, MT, gNB-DU, gNB-CU, User Plane Function (UPF), AMF and Session Management Function (SMF), as well as the corresponding interfaces NR Uu, between MT and gNB, F1, NG, X2 and N4 may be used as baseline for the IAB architectures. Modifications or enhancements to these functions and interfaces for the support of IAB will be explained in the context of the architecture discussion. Additional functionality such as multi-hop forwarding is included in the architecture discussion as it may be necessary for the understanding of IAB operation.

The Mobile-Termination (MT) function may be defined as a component of the IAB node. In the context of this study, MT may be referred to as a function residing on an IAB-node that may terminate the radio interface layers of the backhaul Uu interface toward the IAB-donor or other IAB-nodes.

FIG. 9 shows a high-level architectural view of an IAB network.

Particularly, FIG. 9 shows a reference diagram for IAB in standalone mode, which contains one IAB-donor 93 and multiple IAB-nodes 94. The IAB-donor 93 may be treated as a single logical node that may comprise a set of functions, such as gNB-DU 95, gNB-CU-CP 96, gNB-CU-UP 97 and potentially other functions 98. In a deployment, the IAB-donor 93 may be split according to these functions, which may all be either collocated or non-collocated as allowed by 3GPP NG-RAN architecture. IAB-related aspects may arise when such split is exercised. Also, some of the functions presently associated with the IAB-donor 93 may eventually be moved outside of the donor in case it becomes evident that they do not perform IAB-specific tasks. The IAB-donor 93 may be connected to a Core Network (CN) 99. A UE 100 may gain access to the network via one of the IAB-nodes 94 to which the IAB-donor 93 may provide a wireless backhaul link.

The baseline user plane and control plane protocol stacks for IAB are shown in FIG. 10 and FIG. 11, respectively, in each of a UE 101, an IAB-donor 102, a first IAB-node (IAB-node 1) 103, and an access IAB-node (IAB-node 2) 104. Each of the IAB-donor 102, the first IAB-node 103, and the access IAB-node 104 have a DU 105. Each of the first IAB-node 103 and the access IAB-node 104 have also an MT 106. The IAB-donor 102 has a CU-UP 107. The connections are depicted between the different protocols, in the different entities, either via UE's DRB 108, and/or a BH RLC channel 109 in FIG. 10. An IPv6 flow label and DSCP may indicate the BH RLC Channel.

As shown in FIG. 10, the chosen protocol stacks may reuse the current CU-DU split specification in rel-15, where the full user plane F1-U 110 (General Packet Radio Service Tunneling Protocol User Plane (GTP-U) 111/User Datagram Protocol (UDP) 112/Internet Protocol (IP) 113) may be terminated at the IAB node 104, as a normal DU, and, in FIG. 11, the full control plane F1-C (F1-AP 1101/Stream Control Transmission Protocol (SCTP) 1102/IP 1103) may also be terminated at the IAB node 104, as a normal DU. In the above cases, Network Domain Security (NDS) may have been employed to protect both UP and CP traffic, IPsec 114, in the case of UP, and Datagram Transport Layer Security (DTLS) 1104 in the case of CP. IPsec 113 may also be used for the CP protection instead of DTLS, in this case no DTLS layer would be used. FIG. 10 further depicts the SDAP 114, and FIG. 10 and FIG. 11 further depict the PDCP 115 and RLC 116, the Adapt 117, RLC 118, RRC 119 protocols at the indicated entities, and their interconnections. The connections are depicted between the different protocols, in the different entities, either via UE's SRB 1105, BH RLC channel 1106, Intra-donor D1-C 1107, and/or MT's SRB 1108 in FIG. 11, as indicated in each of panel a), panel b) and panel c).

At the 3GPP RAN2_105b is meeting, it was agreed to support the NR-DC framework for handling multi-connectivity to IAB nodes.

As shown in the schematic diagram of FIG. 12, currently in NR, dual connectivity may be supported by setting up multiple UE bearer contexts in the DUs 1201 that serve the UE 1202. These different UE contexts may be identified as part of F1-U, e.g., GTP tunnels 1203, to the DU serving the UE.

The dual connectivity aspects may be transparent to UE application layers, that is, the UE may just send and/or receive data from a DRB which may be configured as an MCG, SCG or split DRB. In case of the split DRB, the splitting point may be below PDCP 1204, and relying on various NR PDCP functions to handle re-ordering, re-transmission and duplication removal. Also depicted in FIG. 12 are the CU-UP 1205 and the CU-CP 1206, as well as their respective connections to the DUs 1201, an AMF/SMF 1207 node, a UPF 1208 via an NG-U tunnel 1209, and themselves, via an E1 interface 1210.

As agreed in 3GPP it may be possible to reuse the NR-DC framework for setting up multi-connectivity to IAB nodes.

For NR-DC to be used for IAB nodes, some changes to the user plane aspects may however be required. The reasons for this may be that: a) the IAB nodes may not terminate PDCP for F1-U traffic, b) similarly, the parent nodes to the IAB may not terminate F1-U for other IAB nodes, the forwarding may instead be handled by the Backhaul Adaptation Protocol (BAP) layer; c) the agreed architecture based on full F1-U support to the IAB node may not assume that there is any CU-UP function for traffic going to the IAB node, instead the DU may handle IP routing; and d) similarly, the IP connectivity for non-IAB NR DC may terminate in the UPF, which may not be in line with the agreed architecture for IAB network.

The user plane solutions for NR DC cannot be used in their current form to support multi-path connectivity to IAB nodes for F1-U traffic for several reasons, including lack of PDCP and CU-UP function for IAB nodes.

However, for the agreed architecture for IAB network, it may be possible to adopt a simplified version of NR DC for enabling multi-path communication, in line with existing architecture assumptions and avoid additional complexities such as tunneling in tunneling, assuming the following. First, that no split bearers may be supported. This simplification may make it possible to avoid introduction of CU-UP functionality and re-ordering functionality etc. Second, that each path may need to be associated with a separate BAP routing identifier. This simplification may make it possible to avoid GTP tunnels to the parent nodes, carrying GTP tunnels to IAB node. And third, that each path may need to be associated with its own IP address making the paths visible on the F1 application layer. This simplification may make it possible to set up paths through different Donor DUs.

With the assumptions above, it may be possible to support redundancy and rudimentary load balancing mechanism on the F1 application layer using features such as: Multipath SCTP and smart load balancing of UE GTP tunnels to different paths.

It may be possible to study more advanced load balancing mechanisms for IAB node in later releases.

For the user plane, it may be possible to support a simplified version of NR-DC for IAB nodes, where each path may be seen as a separate IP connection, which may be used by the application layer (F1-C/F1-U) for redundancy and rudimentary load balancing. This is discussed in 38.874 section 9.7.9.

When using NR-DC to support multi-connectivity for IAB nodes in Rel-16, the following assumptions may be made: i) only MCG, or SCG Backhaul (BH) bearers may be supported, no split BH bearers may be supported; ii) each separate connection to a given IAB node may need to be associated with a separate BAP identifier, e.g., address, path, addres+path; and iii) each separate connection may need to be associated with at least 1 separate IP address to support multiple connections to use different Donor DUs and allow selection of which connection to use by the end nodes (IAB node, Donor CU).

Procedure for Setting Up Multi-Connectivity

FIG. 13 shows the starting scenario, that is, prior to setting up DC to IAB Node 1. The IAB node 1 is connected via IAB node 2 and Donor DU 1 towards the Transport Network Layer (TNL). The Donor DU 1 may route any packets destined to the IP address 1 of the IAB node 1 over the wireless backhaul to IAB node 2. The routing may be based on a BAP identifier 1 associated with the IP address 1.

The Donor CU may determine, e.g., based on IAB node 1 RRC level measurements, IAB node capabilities etc. that the IAB node 1 may need to establish dual connectivity to IAB node 3. Existing NR-DC RRC procedure may be used to establish an SCG connection to the IAB node 3. As part of this message the Donor CU may configure: the BAP identifier for the SCG link to the IAB node 3, one or more Backhaul RLC channels between the IAB node 1 and IAB node 3, and a new BAP route for the new connection.

Once the new path is set up on the BAP, the IAB node 1 may be allocated a new IP address 2 for the new connection The result shown in FIG. 14 is that the IAB node 1 is dual-connected, where each path has a separate IP address and may be used for F1-C/U application layer redundancy.

An assumption may be that the Donor CU responsible for setting up DC to the IAB node may configure separate BAP identifiers for each connection, enabling allocation of separate IP addresses for each connection.

In case a child IAB node is connected to a parent IAB node which has support for multiple connections, as shown in FIG. 15 for IAB node 0, it may be possible for this child IAB node to also utilize these multiple connections. For this reason, it may be possible to assign such child IAB node multiple BAP identifiers. When the IAB node receives multiple BAP identifiers, it may request separate IP address for each BAP identifier.

An assumption may be that an IAB child node connected to one or more upstream IAB nodes that use NR-DC, may be allocated multiple BAP identifiers and IP addresses enabling it to utilize the multi-connectivity.

An IAB-node may need to multiplex the UE DRBs to the BH RLC-Channel. The following two options may be considered on bearer mapping in IAB-node.

Option 1. One-to-One Mapping Between UE DRB and BH RLC-Channel

In this option, depicted with one example in FIG. 16, each UE DRB may be mapped onto a separate BH RLC-channel, as depicted with the different patterns for the different channels. Further, each BH RLC-channel may be mapped onto a separate BH RLC-channel on the next hop. The number of established BH RLC-channels may be equal to the number of established UE DRBs.

Identifiers, e.g. for the UE and/or DRB, may be required, e.g., if multiple BH RLC-channels are multiplexed into a single BH logical channel. Which exact identifiers may be needed, and which of these identifier(s) may be placed within the adaptation layer header may depend on the architecture/protocol option.

Option 2. Many-to-One Mapping Between UE DRBs and BH RLC-Channel

For the many-to-one mapping, depicted with one example in FIG. 17, several UE DRBs may be multiplexed onto a single BH RLC-channel based on specific parameters such as bearer QoS profile. Other information such as hop-count may also be configured. The IAB-node may multiplex UE DRBs into a single BH RLC-channel even if they belong to different UEs. Furthermore, a packet from one BH RLC-channel may be mapped onto a different BH RLC-channel on the next hop. All traffic mapped to a single BH RLC-channel may receive the same QoS treatment on the air interface.

Since the BH RLC-channel may multiplex data from/to multiple bearers, and possibly even different UEs, each data block transmitted in the BH RLC-channel may need to contain an identifier of the UE, DRB, and/or IAB-node it may be associated with. Which exact identifiers may be needed, and which of these identifier(s) may be placed within the adaptation layer header may depend on the architecture/protocol option.

It has been agreed to support both N:1 and 1:1 mapping in rel-16.

For 1:1 bearer mapping, it has been agreed to use the IPv6 Flow Label field, where the donor DU may be configured to mapping IP packets that are marked with a given flow label to a particular Logical Channel IDentifier (LCID) on the first backhaul link between the donor DU and the first down-stream IAB node. For the case of N:1 mapping, the working assumption may be the Differentiated Service Code Point (DSCP) field in the IP header may be used for the mapping purpose, in order to support also IPv4 networks. However, there is a discussion whether to have a unified behavior, where the IPv6 Flow Label may be used for N:1 mapping as well. It is also being considered to use the combination of the flow label and the DSCP field to use for 1:1 mapping.
Current Assumption on BAP Routing Functionality Since BAP is a newly defined layer for IAB networks, 3GPP has made only the following agreements related to the BAP layer functionality: a) RAN2 confirms that routing and bearer mapping, e.g. mapping of BH RLC channels, may be BAP layer functions; b) RAN2 assumes that the TX part of the BAP layer may perform routing and "bearer mapping", and the RX part of the BAP layer may perform "bearer de-mapping"; c) RAN2 assumes that Service Data Units (SDUs) may be forwarded from the RX part of the BAP layer to the TX part of the BAP layer, for the next hop, for packets that are relayed by the IAB node; and d) it is For Further Study (FFS) how to model BAP layer protocol entities, e.g. whether separate for DU and MT or not, and how these may be configured, that is, via F1-AP or Radio Resource Control (RRC).

Furthermore, for the BAP routing, 3GPP made the following agreements:

The BAP routing Identifier (ID), carried in the BAP header, may consist of BAP address and BAP path ID; Encoding of the path ID in the header is FFS.

Each BAP address may define a unique destination, unique for IAB network of one donor-IAB, either an IAB access node, or the IAB donor;

Each BAP address may have one or multiple entries in the routing table to enable local route selection. Multiple entries may be for load balancing, re-routing at Radio Link Failure (RLF). For load balancing still FFS what may be decided locally and/or decided by the Donor;

Each BAP routing ID may have only one entry in the routing table;

The routing table may hold other information, e.g. priority level for entries with same BAP address, to support local selection. Configuration of this information may be optional.

Load balancing by routing by donor-IAB CU may be possible.

Local selection of path/route may be done at link failure, other cases FFS.

Existing methods for handling packets in a multi-hop integrated access and backhaul (IAB) deployment, based on the foregoing description, may lead to waste of radio resources, increased latency, waste of processing resources, and waste of energy resources.

SUMMARY

As part of the development of embodiments herein, one or more challenges with the existing technology will first be identified and discussed.

Duplication of packets in multi-hop networks according to existing methods, may lead to waste of radio resources, increased latency, waste of processing resources, and waste of energy resources. As a non-limiting example of a multi-hop network, IAB networks may be used herein.

In 3GPP, it has been discussed that IAB nodes may establish multiple connections to their parent node, either another IAB node or the donor DU. The setup of these multiple connections may be realized using the DC concept or by having multiple MTs at the IAB node. The backhaul links that may be connecting an IAB node with its parent(s) may be serving the end users' traffic and the PDCP of these bearers may be terminated at the UEs, not the IAB nodes. As such, even though an IAB node may have more than one link to its parents, the packets arriving at it cannot directly benefit from split bearer and duplication features of DC, as that may be understood to require PDCP termination at the IAB node for the sake of the end user traffic.

When supporting multi-connected IAB nodes, it may be desirable to support packet duplication over BH RLC channels for services requiring highly reliable low-latency delivery. However, no solutions have been introduced for supporting this so far.

It is an object of embodiments herein to improve the handling of handling transmission of one or more packets from a sending node to a receiving node in a communications network. It is a particular object of embodiments herein to improve the handling transmission of one or more packets from a sending node to a receiving node in a communications network comprising at least one intermediate node.

According to a first aspect of embodiments herein, the object is achieved by a method, performed by a first node. The method is for handling transmission of one or more packets from a sending node to a receiving node. The first node operates in a communications network. The communications network comprises at least one intermediate node between the sending node and the receiving node. The first node determines whether or not to duplicate the one or more packets between the first node and a second node comprised in the communications network. The first node then sends, based on a result of the determination, at least one of the one or more packets and the one or more duplicates, over a BAP layer, or one or more Backhaul Radio Link Channels between the first node and the second node.

According to a second aspect of embodiments herein, the object is achieved by a method, performed by the second node. The method is for handling transmission of the one or more packets from the sending node to the receiving node. The second node operates in the communications network. The communications network comprises at least one intermediate node between the sending node and the receiving node. The second node receives at least one of the one or more packets and one or more duplicates of the one or more packets, over the BAP layer, or the one or more Backhaul Radio Link Channels between the first node and the second node.

According to a third aspect of embodiments herein, the object is achieved by the first node. The first node is for handling transmission of the one or more packets from the sending node to the receiving node. The first node is configured to operate in the communications network. The communications network is configured to comprise at least one intermediate node between the sending node and the receiving node. The first node is further configured to determine whether or not to duplicate the one or more packets between the first node and the second node configured to be comprised in the communications network. The first node is also configured to send, based on a result of the determination, at least one of the one or more packets and the one or more duplicates, over the BAP layer, or the one or more Backhaul Radio Link Channels configured to be between the first node and the second node.

According to a fourth aspect of embodiments herein, the object is achieved by the second node. The second node is for handling transmission of the one or more packets from the sending node to the receiving node. The second node is configured to operate in the communications network. The communications network is configured to comprise at least one intermediate node between the sending node and the receiving node. The second node is further configured to receive the at least one of the one or more packets and the one or more duplicates of the one or more packets, over the BAP layer, or the one or more Backhaul Radio Link Channels configured to be between the first node and the second node.

By determining whether or not to duplicate the one or more packets between the first node and the second node and then sending the one or more packets and the one or more duplicates to the second node accordingly, the first node may be enabled to increase the reliability of the packet delivery, since if one of the BH links experiences a link problem or congestion and/or delays, the packet may be transported over the other BH link. This may be understood to also reduce the latency.

An access node, e.g., an Access IAB-DU, a donor or an intermediate node may be able to BAP duplicate. 'Intermediate' and 'access' may be understood as a role that a node, e.g., an IAB node, may play with respect to UEs, e.g., the wireless device. One node, e.g., IAB node, may be the access node to its connected UEs, e.g., the wireless device but may be an intermediate node to UEs of its child nodes, e.g., IAB nodes. Hence, as another advantage, the first node may be understood to enable that the duplication be performed anywhere along the connection, preferably at the point where a path may split, which may be understood to avoid unnecessary duplication, e.g., along the same path.

As a further advantage, by enabling to duplication at the intermediate nodes or at the access IAB node, the first node and/or the second node may be understood to also enable that UEs that may not be capable of packet duplication, in the UL and/or DL, to benefit from it.

Moreover, by determining whether or not to duplicate the one or more packets and then sending the one or more packets and the one or more duplicates to the second node accordingly, the first node may be enabled to dynamically decide whether duplication of the one or more packets may be necessary to increase the reliability of their transmission in the communications network based for example on the dynamic conditions of the link used by the first node to transmit the one or more packets. The first node may be enabled to then only trigger or proceed with the duplication if the duplication is either supported and/or activated over the BAP layer. Since the BAP layer may be present at every hop between the sending node and the receiving node, this may be understood to enable that the duplication over the BAP layer may be decided by any intermediate node in the communications network, in contrast to for example PDCP duplication. In case of multiple hops, the duplication at the BAP level may be understood to have the advantage that the network may pinpoint only the problematic hop(s) where duplication may need to be applied. This may be understood to be in contrast to, for example, in the case of PDCP level duplication, wherein the duplicate packets have to traverse all the hops, even if some of the hops may be currently experiencing excellent signal levels and duplication over those links may be just a waste of radio resource.

BRIEF DESCRIPTION OF THE DRAWINGS

Examples of embodiments herein are described in more detail with reference to the accompanying drawings, and according to the following description.

FIG. 25 is a flowchart depicting embodiments of a method in a communications system including a host computer, a base station and a user equipment, according to embodiments herein.

FIG. 26 is a flowchart depicting embodiments of a method in a communications system including a host computer, a base station and a user equipment, according to embodiments herein.

DETAILED DESCRIPTION

Certain aspects of the present disclosure and their embodiments may provide solutions to the challenges described in the Summary section or other challenges. There are, proposed herein, various embodiments which address one or more of the issues disclosed herein.

As a brief overview, embodiments herein may be understood to relate to enhancements to reliability for multi-connected IAB nodes, e.g., relays, by using duplication at the Backhaul Adaptation Protocol layer.

As a simplified overview, embodiments herein may provide mechanisms for packet duplication in the backhaul links of an IAB network either in the source node, e.g., a Donor CU-UP or access IAB node, or in intermediate nodes, e.g., intermediate IAB nodes or Donor DU. Embodiments herein may also provide mechanisms for removing duplications either in the end node, e.g., Donor CU-UP or access IAB node, or in the UE.

Embodiments herein may utilize BAP-level duplication, where intermediate nodes that may have multiple parents, for the upstream case, e.g., using DC or CA connectivity to one parent, or multiple children, for the downstream case, may duplicate a packet received from the ingress side.

Duplicate detection may be employed by the PDCP of the end nodes, UE PDCP or Donor CU PDCP, or a new mechanism may be introduced in the BAP layer, e.g., BAP sequence number, that may be used to remove the duplicates at the BAP layer, even before the packet may have reached the end node.

In general, embodiments herein may therefore be understood to be related to 5G NR, IAB, multipath connectivity, F1.C, mapping, and/or IAB-donor-CU.

Some of the embodiments contemplated will now be described more fully hereinafter with reference to the accompanying drawings, in which examples are shown. In this section, the embodiments herein will be illustrated in more detail by a number of exemplary embodiments. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art. It should be noted that the exemplary embodiments herein are not mutually exclusive. Components from one embodiment may be tacitly assumed to be present in another embodiment and it will be obvious to a person skilled in the art how those components may be used in the other exemplary embodiments. Note that although terminology from LTE/5G has been used in this disclosure to exemplify the embodiments herein, this should not be seen as limiting the scope of the embodiments herein to only the aforementioned system. Other wireless systems with similar features, may also benefit from exploiting the ideas covered within this disclosure.

Figure 1:
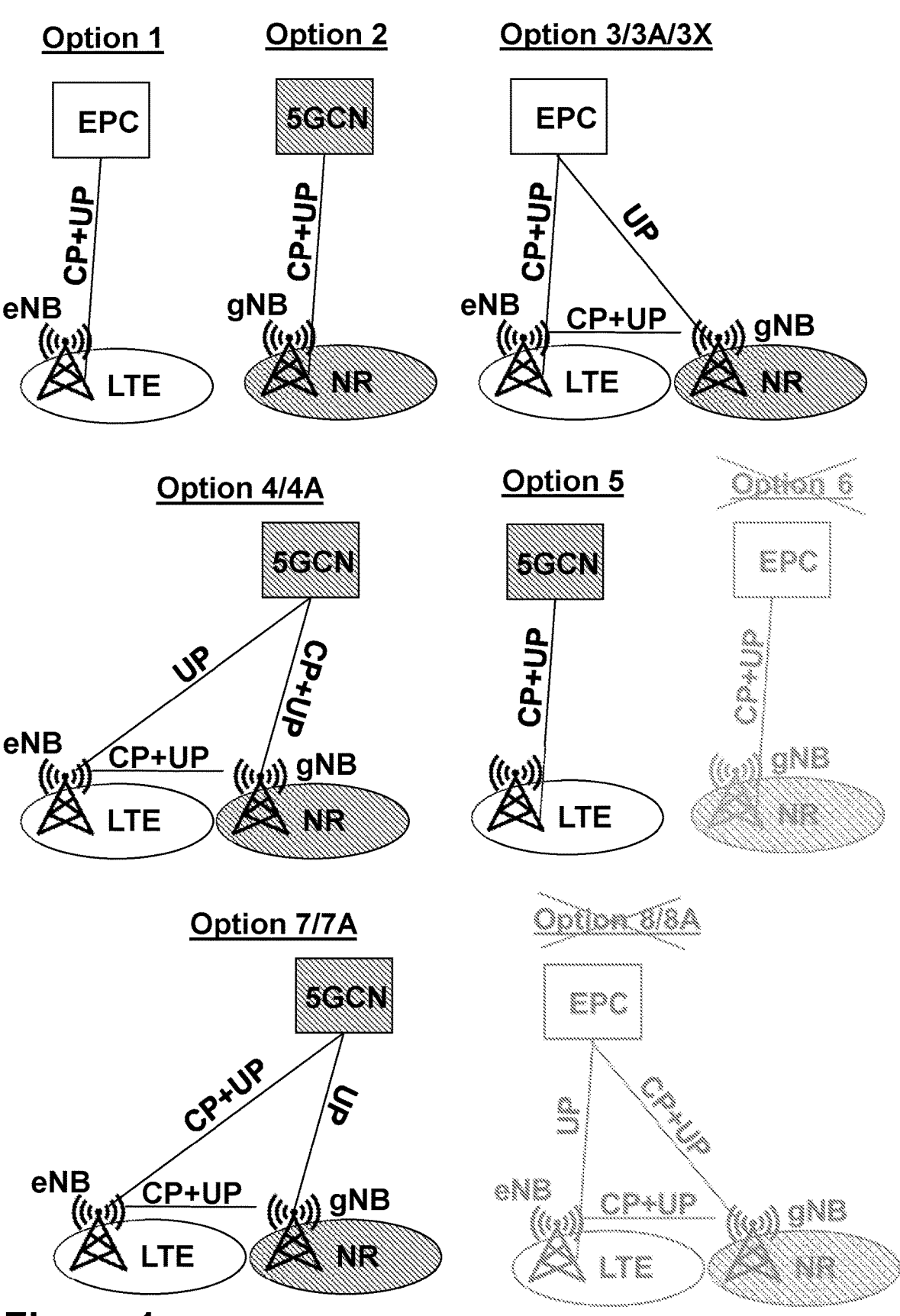
FIG. 1 is a schematic diagram illustrating examples of LTE and NR interworking options, according to existing methods.
Figure 2:
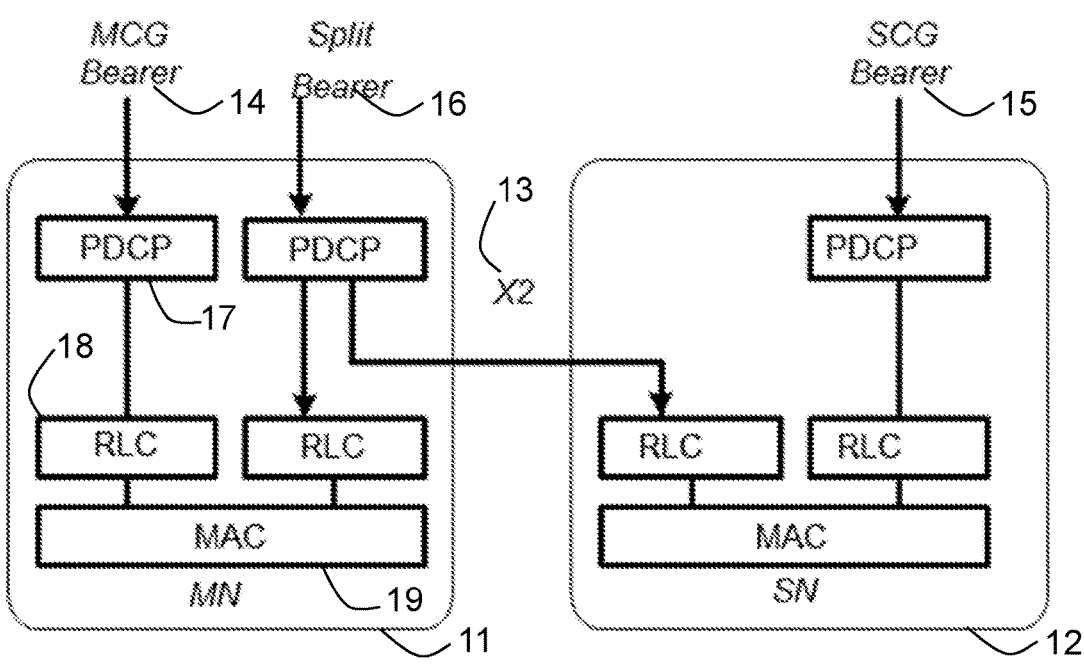
FIG. 2 is a schematic diagram illustrating an example of a LTE DC User Plane (UP), according to existing methods.
Figure 3:
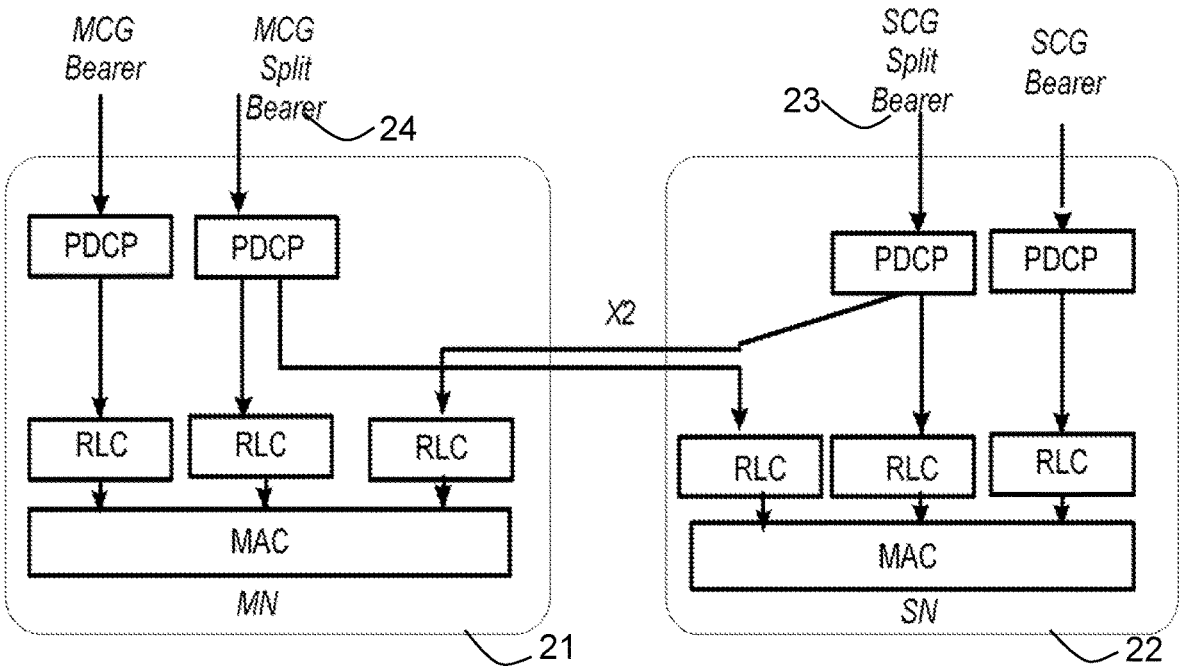
FIG. 3 is a schematic diagram illustrating an example of LTE-NR tight interworking (UP), according to existing methods.
Figure 4:
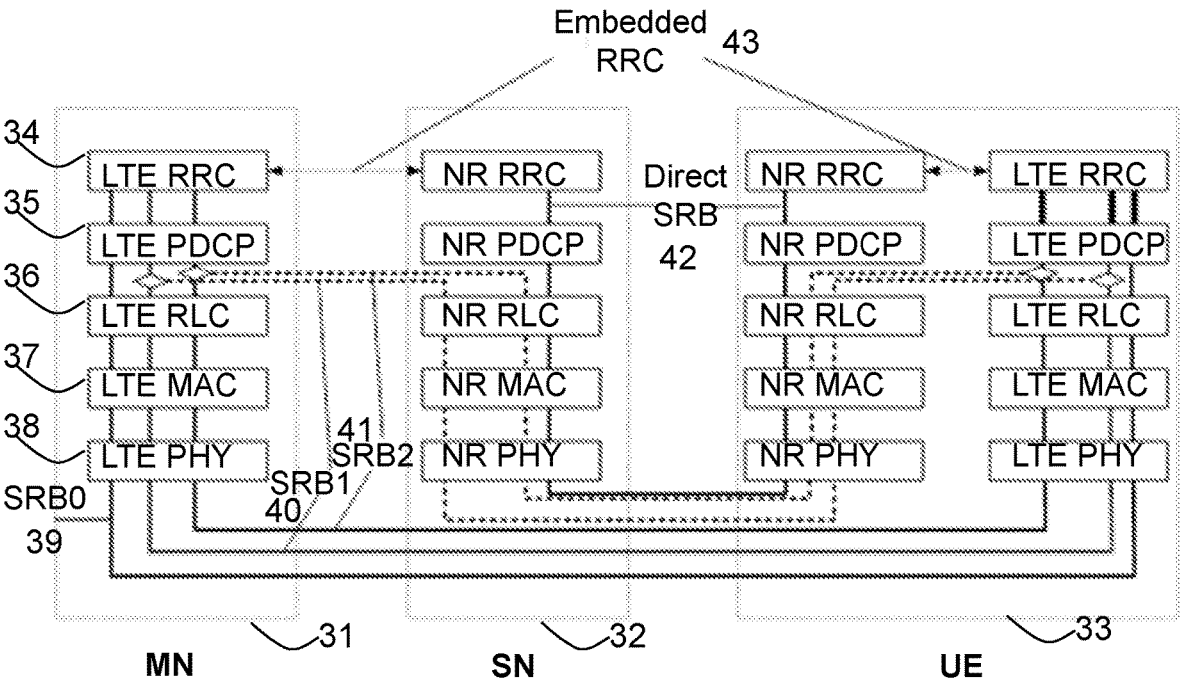
FIG. 4 is a schematic diagram illustrating an example of LTE-NR tight interworking (CP), according to existing methods.
Figure 5:
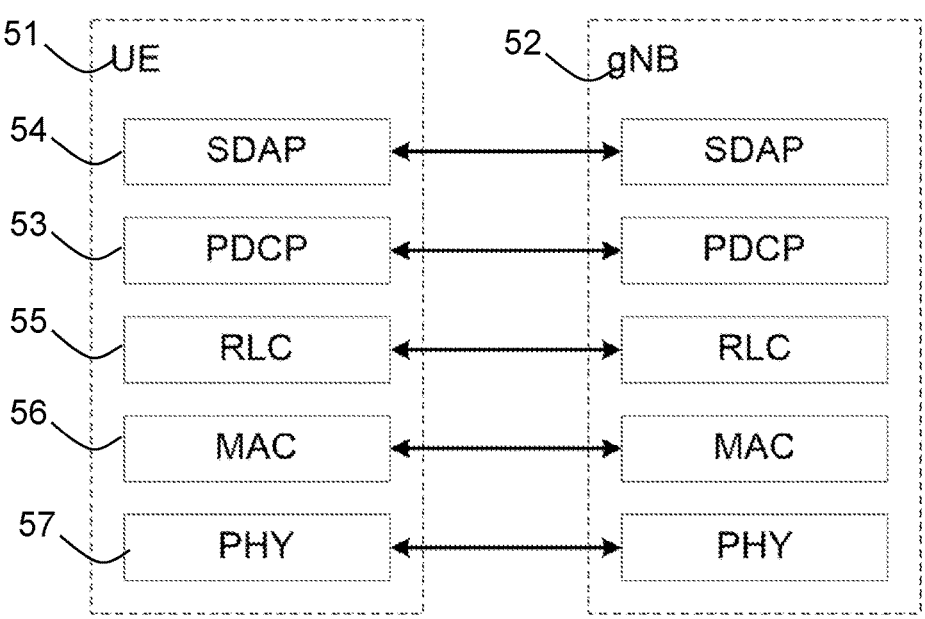
FIG. 5 is a schematic diagram illustrating an example of a User Plane Protocol Stack, according to existing methods.
Figure 6:
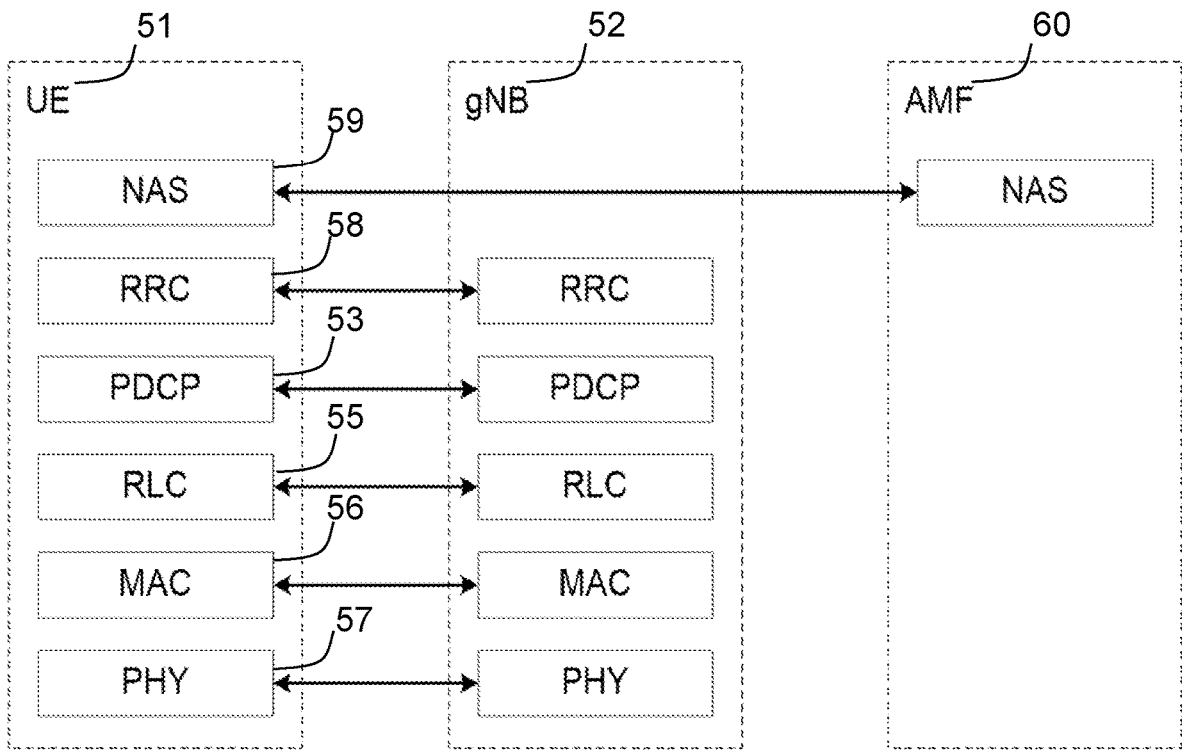
FIG. 6 is a schematic diagram illustrating an example of a Control Plane Protocol Stack, according to existing methods.
Figure 7:
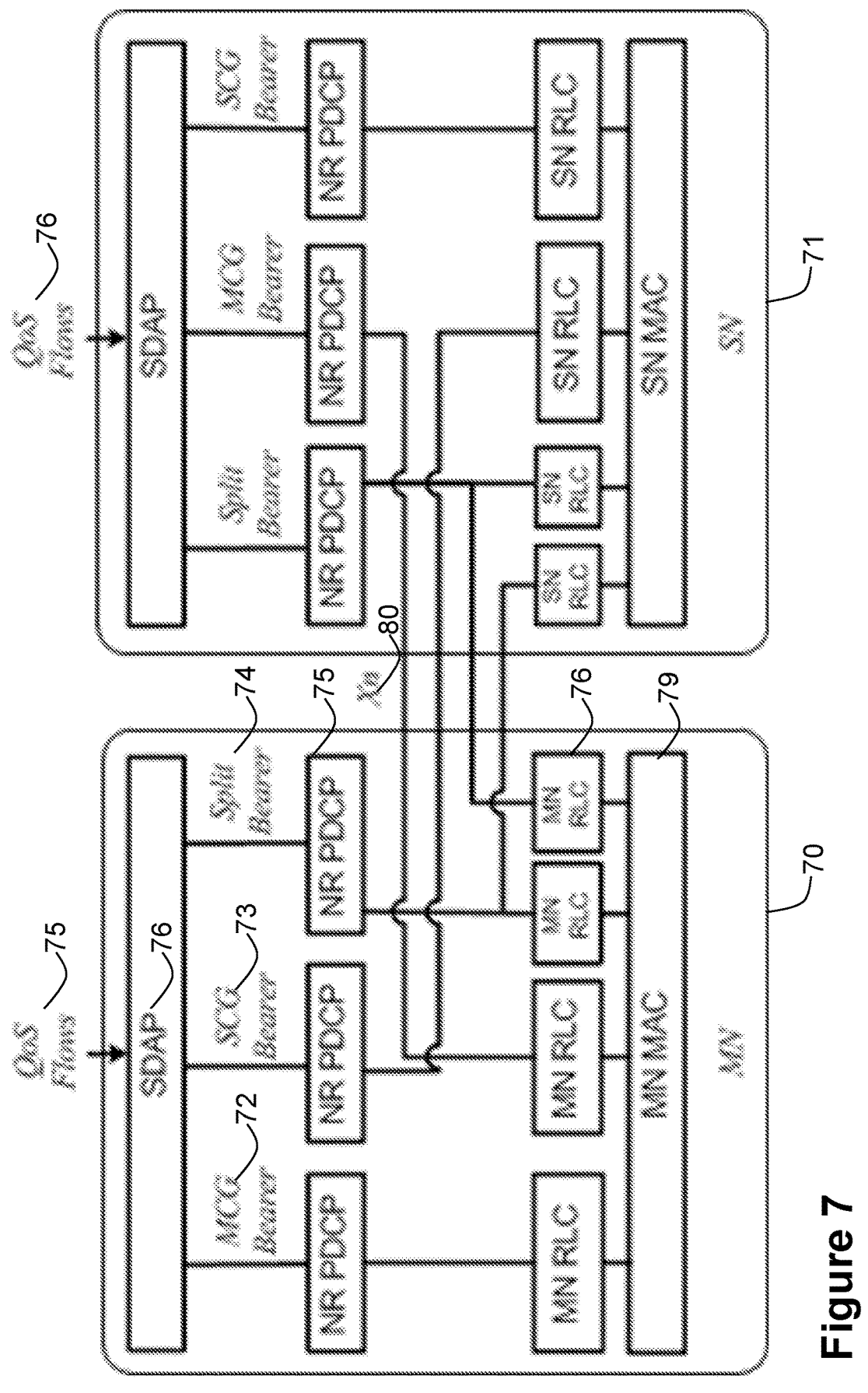
FIG. 7 is a schematic diagram illustrating an example of a network side protocol termination options for MCG, SCG and split bearers in MR-DC with 5GC (NGEN-DC, NE-DC and NR-DC), according to existing methods.
Figure 8:
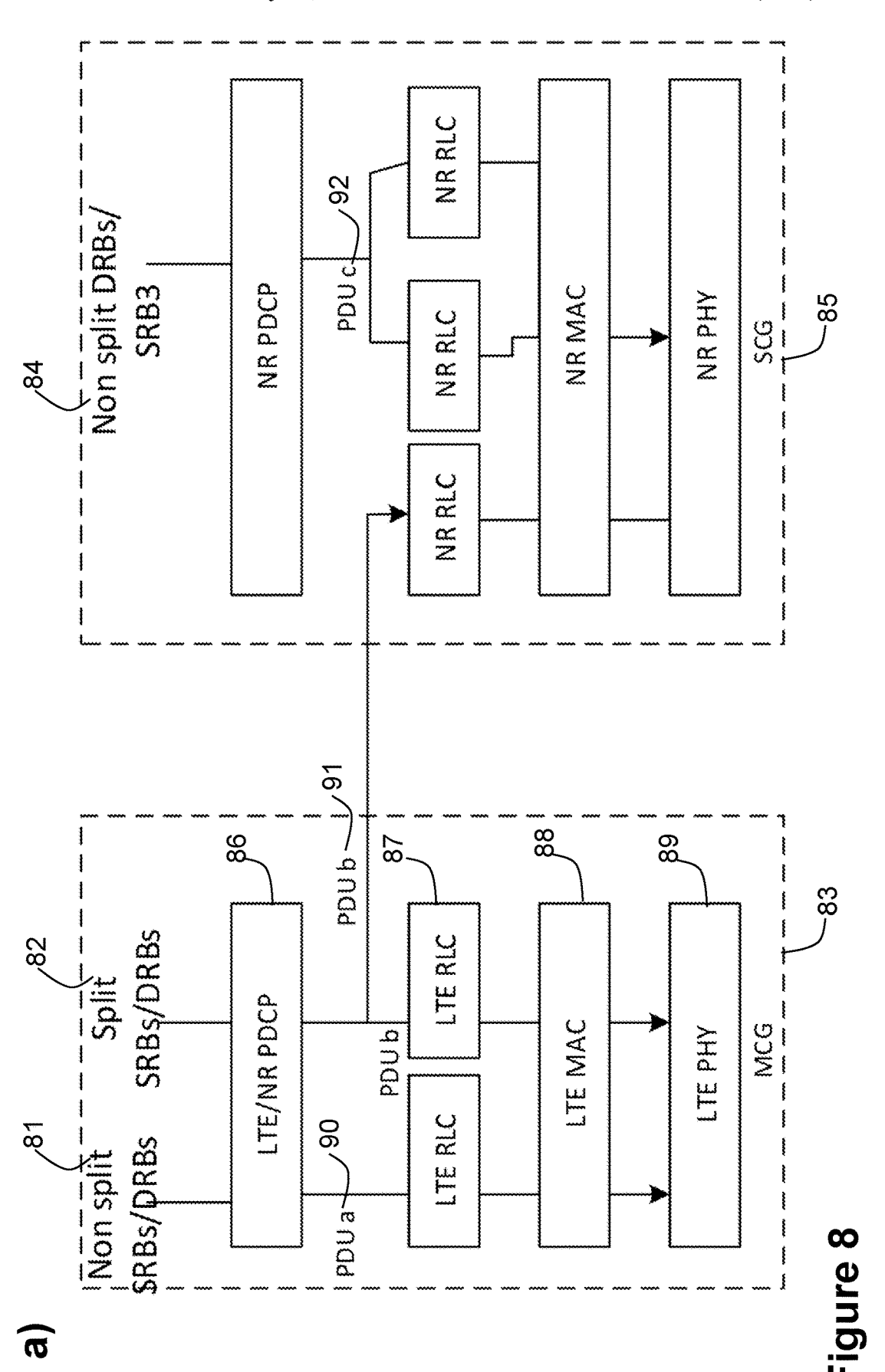
FIG. 8 is a schematic diagram illustrating an example of CA level and DC level packet duplication of SRBs and DRBs alternatives a) SRB and DRB duplication for EN-DC, b) SRB and DRB duplication for NE-DC, and c) SRB and DRB duplication for NR-NR DC, according to existing methods.
Figure 8:
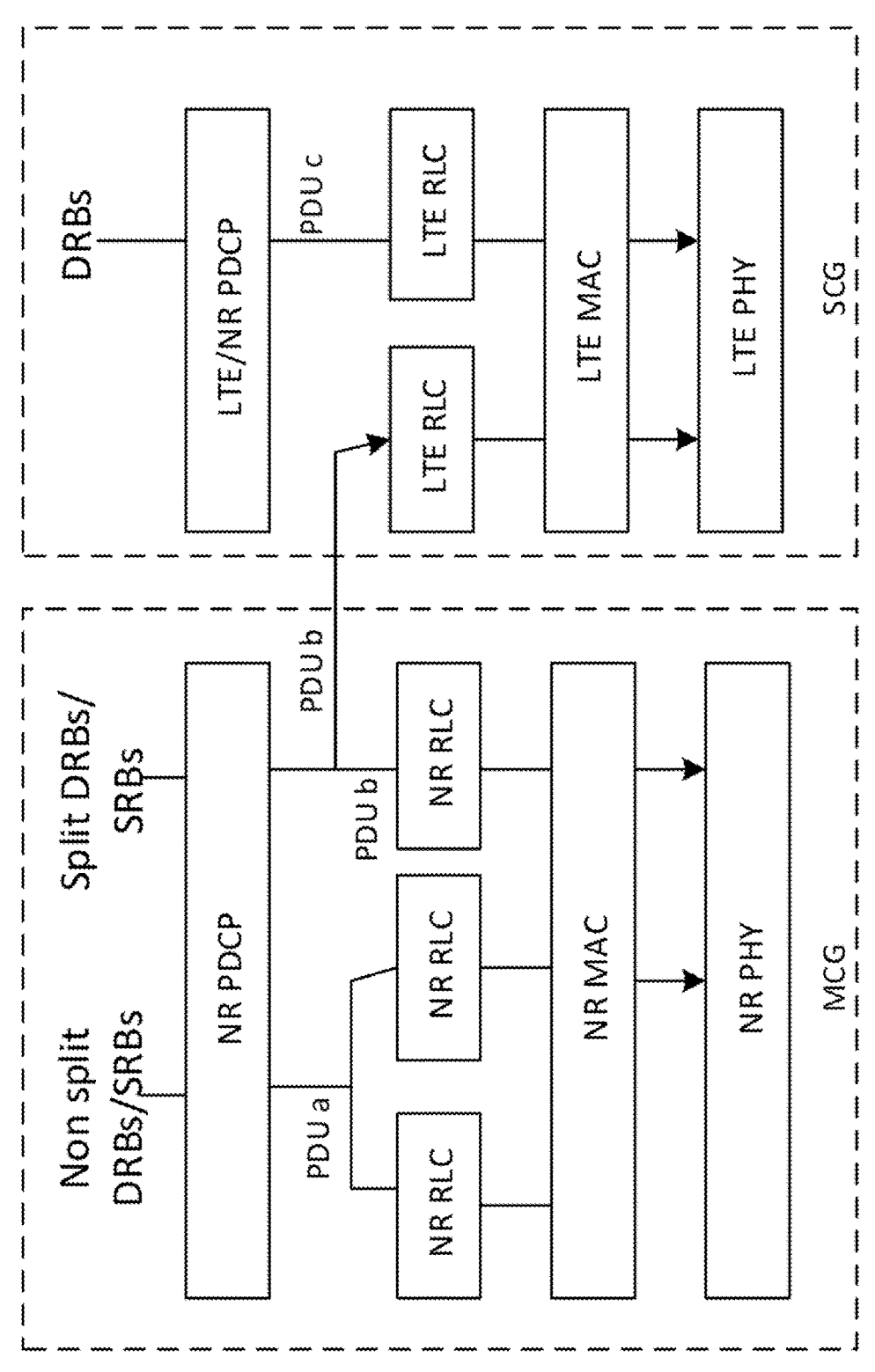
Figure 8:
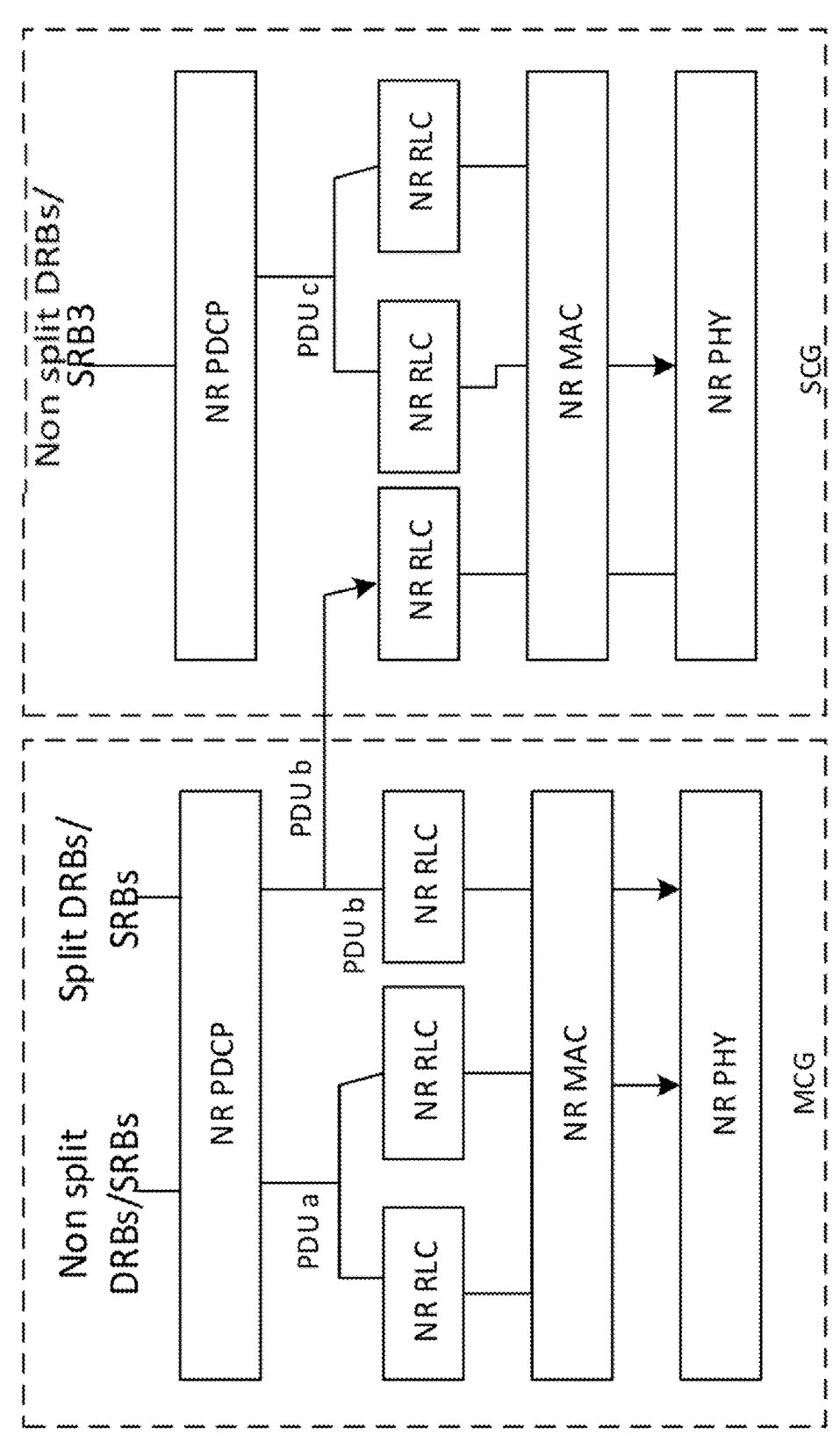
Figure 9:
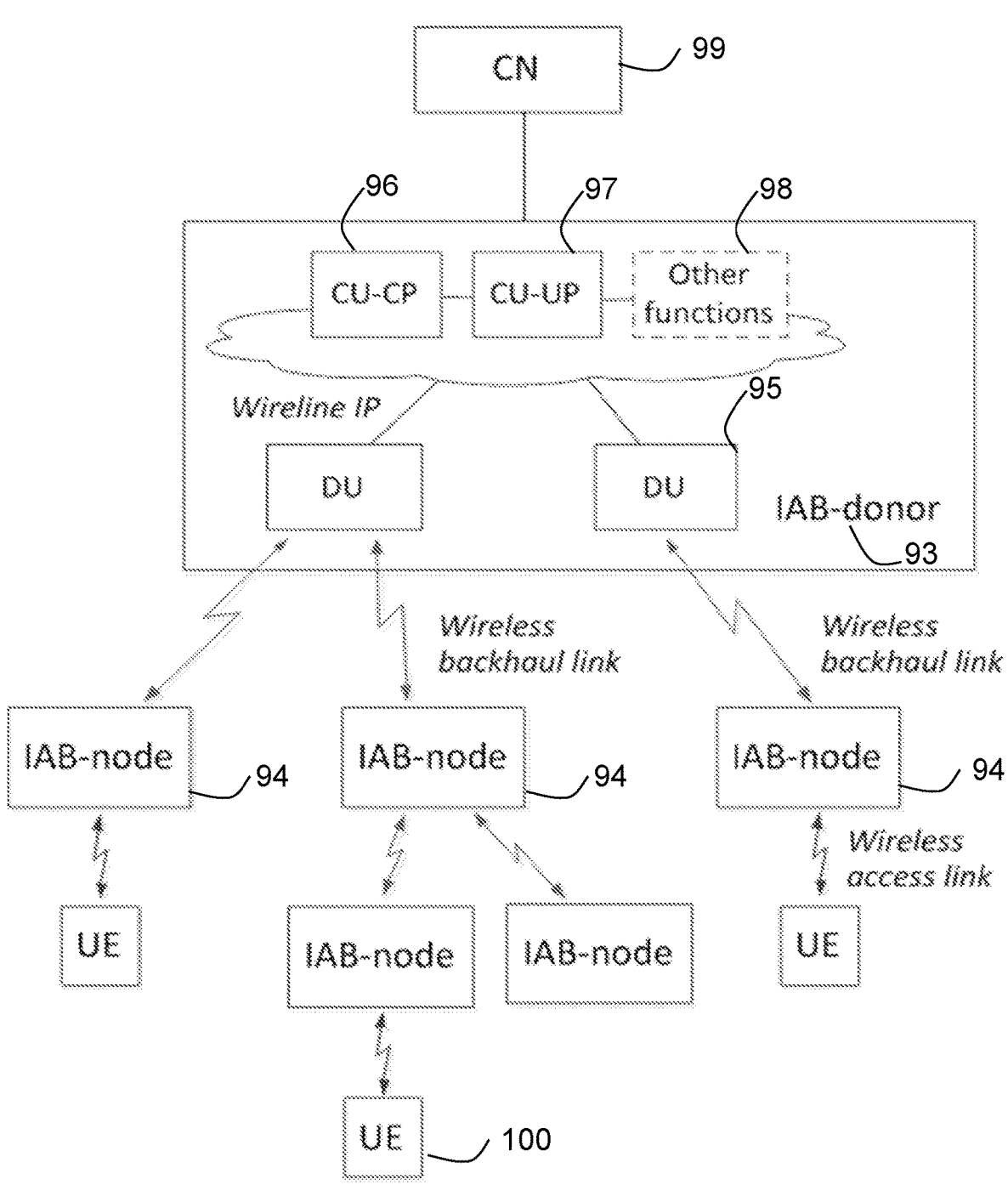
FIG. 9 is a schematic diagram illustrating an example of a reference diagram for IAB-architectures, TR 38.874, v. 16.0.0, according to existing methods.
Figure 10:
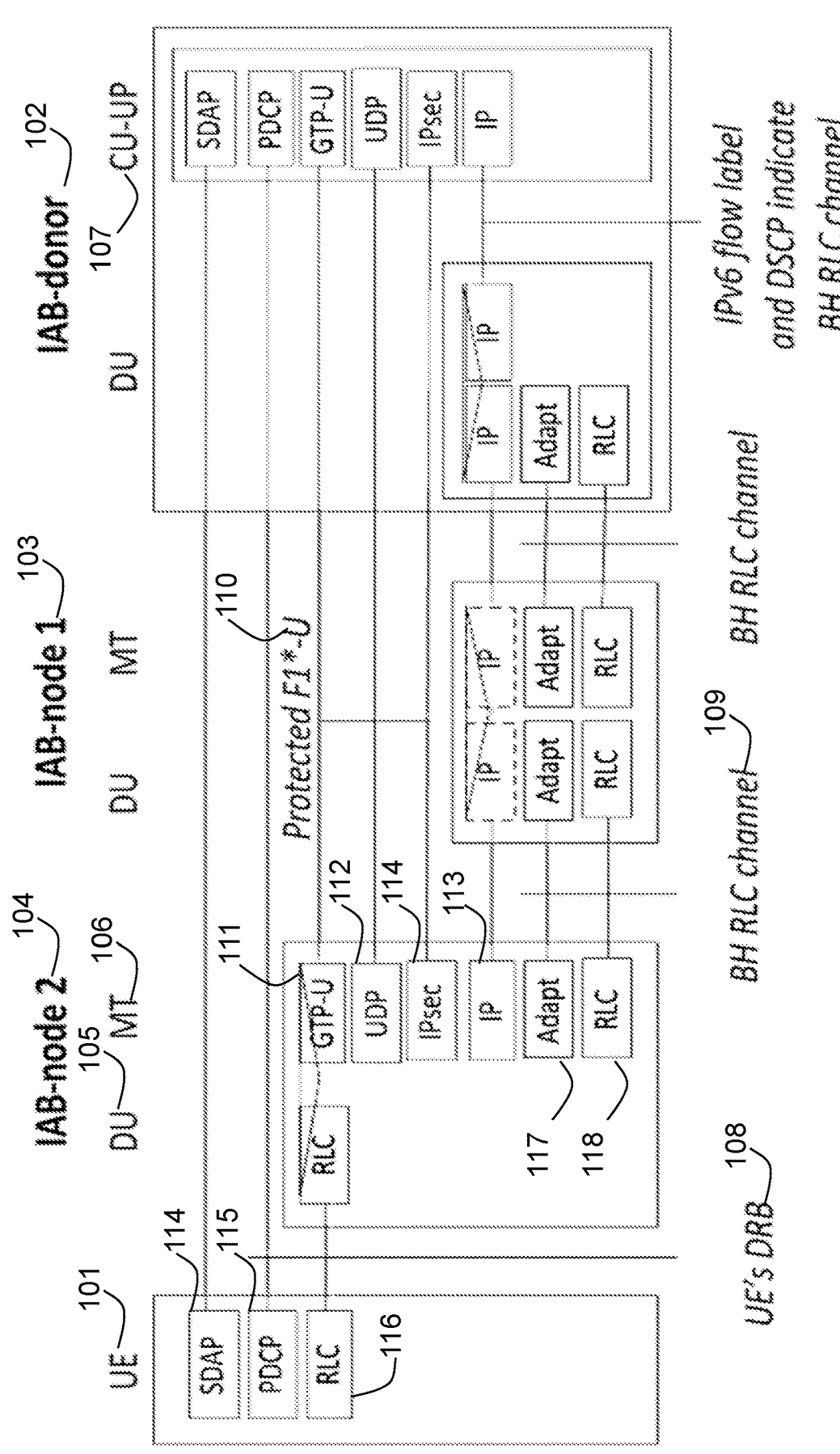
FIG. 10 is a schematic diagram illustrating an example of a baseline User Plane (UP) Protocol stack for IAB in rel-16, according to existing methods.
Figure 11:
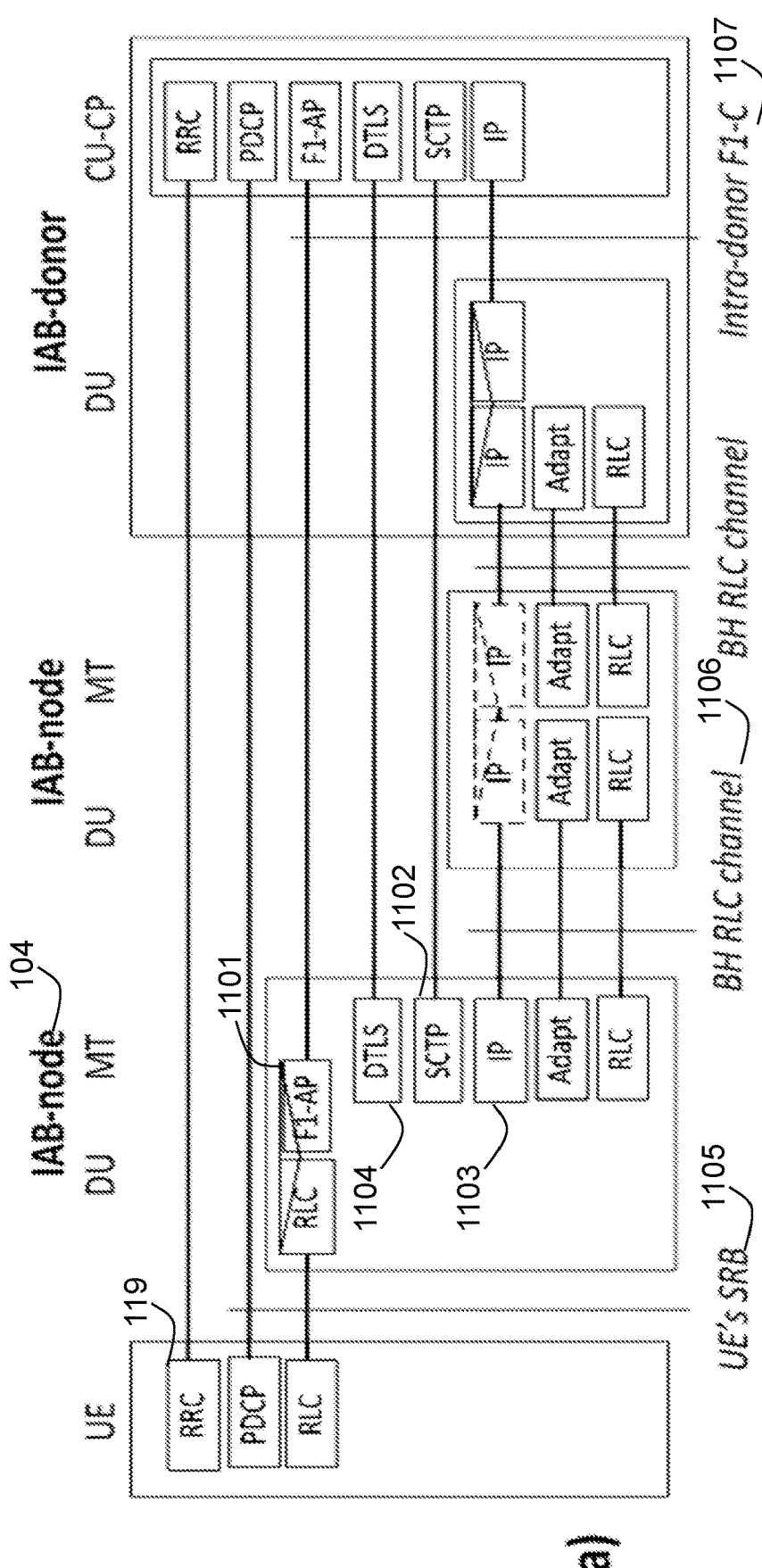
FIG. 11 is a schematic diagram illustrating an example of a baseline control plane (CP) Protocol stack for IAB in rel-16, according to existing methods.
Figure 11:
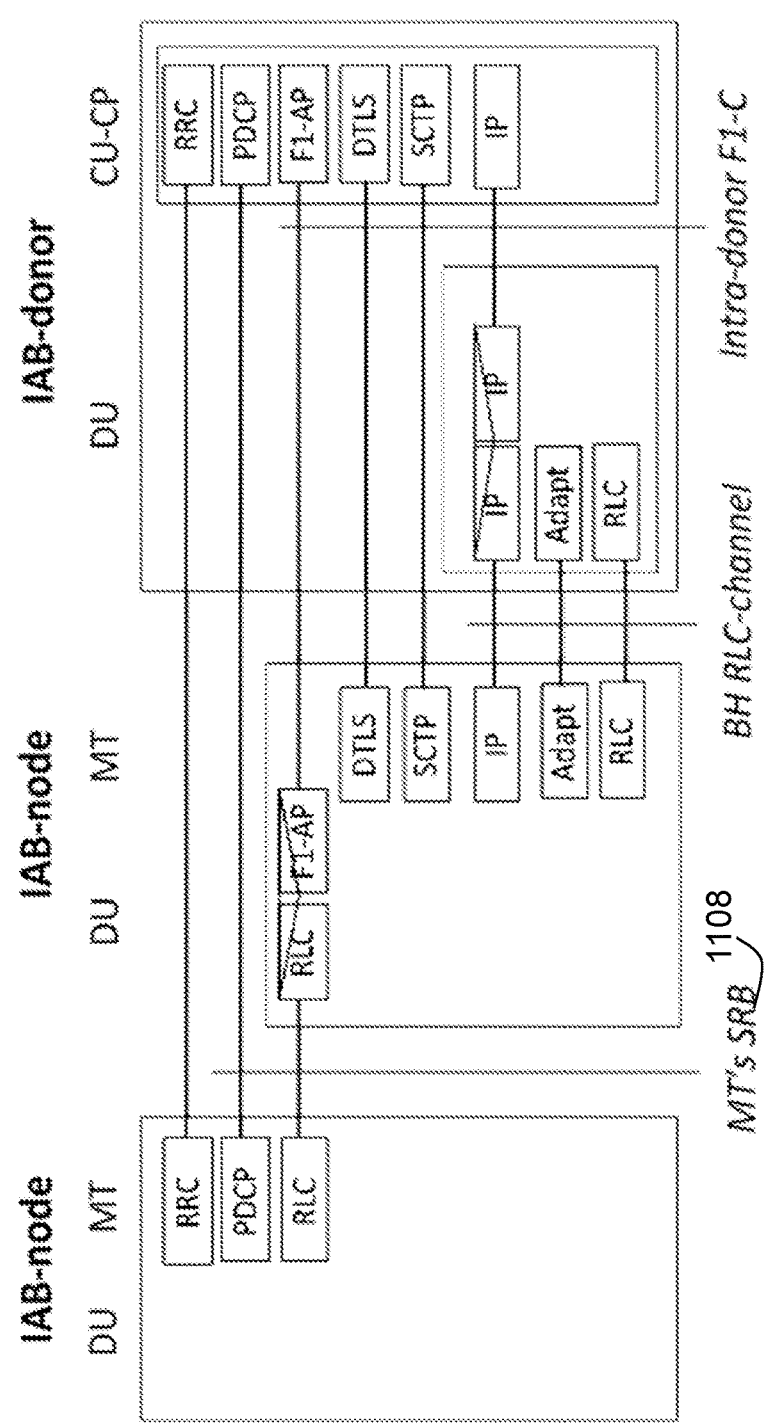
Figure 11:
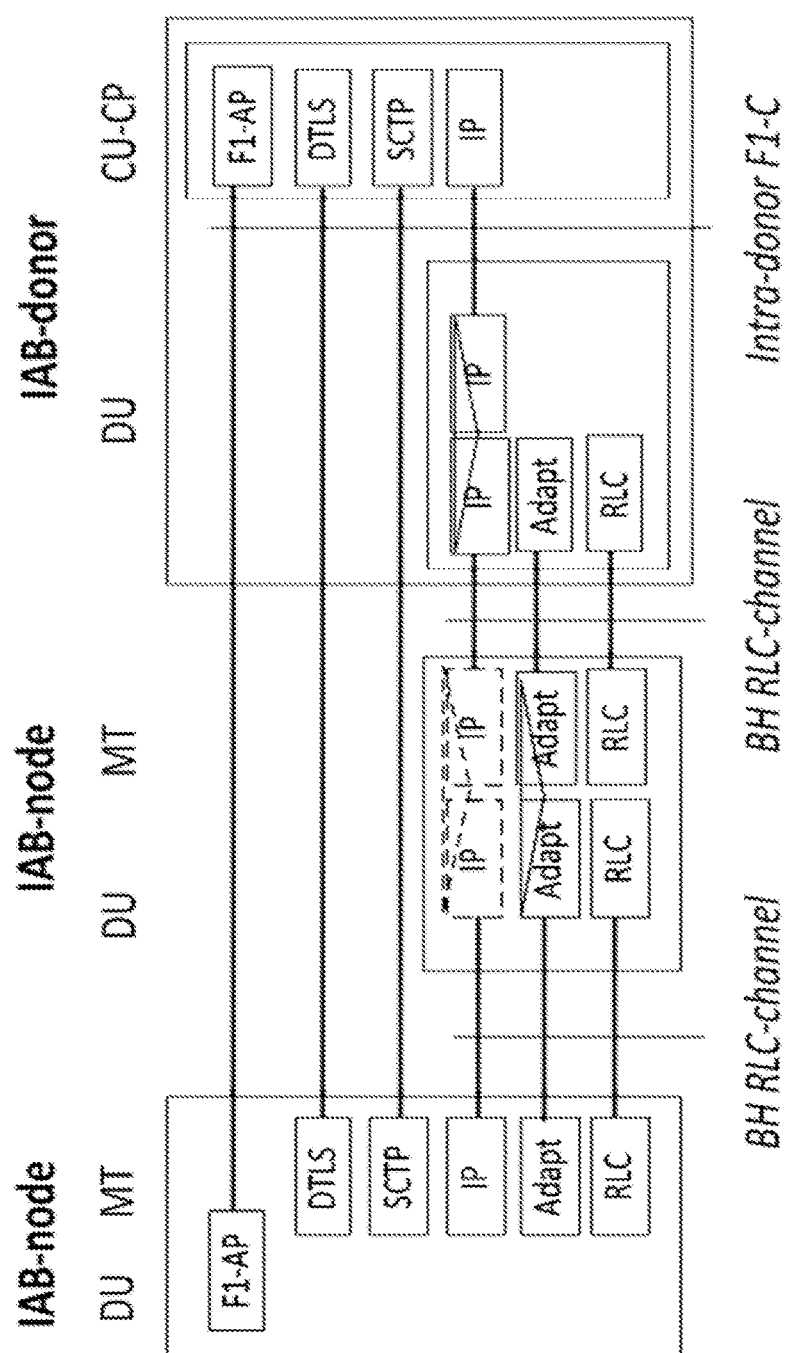
Figure 12:
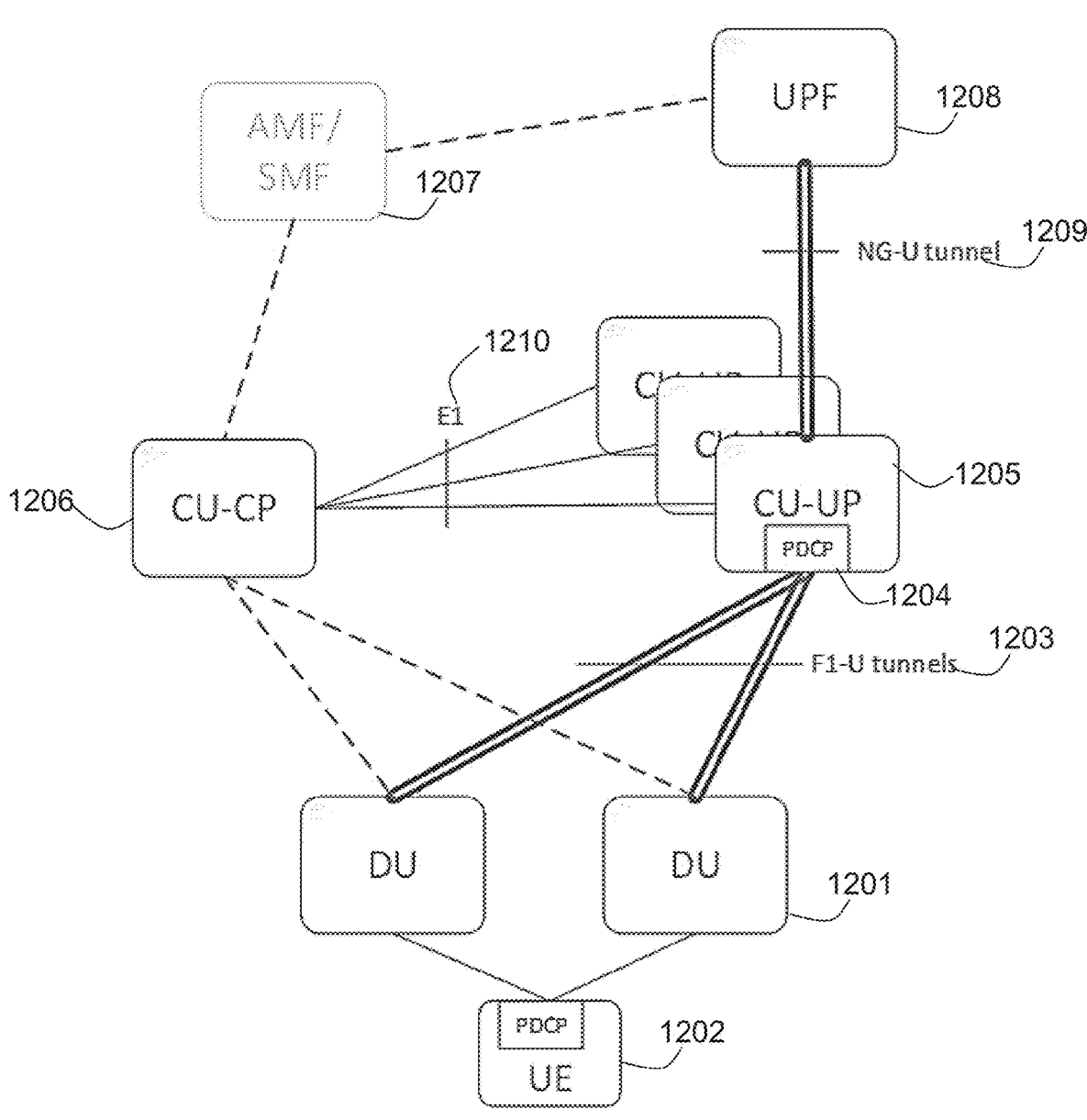
FIG. 12 is a schematic diagram illustrating an example of support for NR DC to UEs, according to existing methods.
Figure 13:
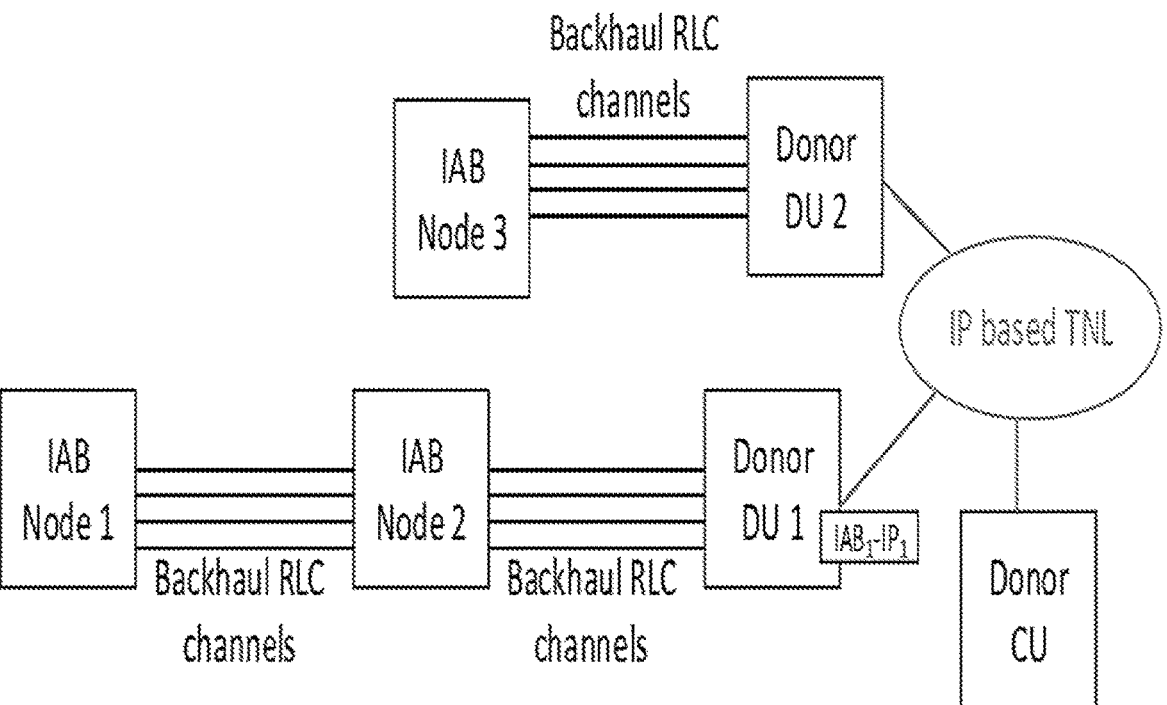
FIG. 13 is a schematic diagram illustrating an example of an IAB network, prior to setting up dual connectivity, according to existing methods.
Figure 14:
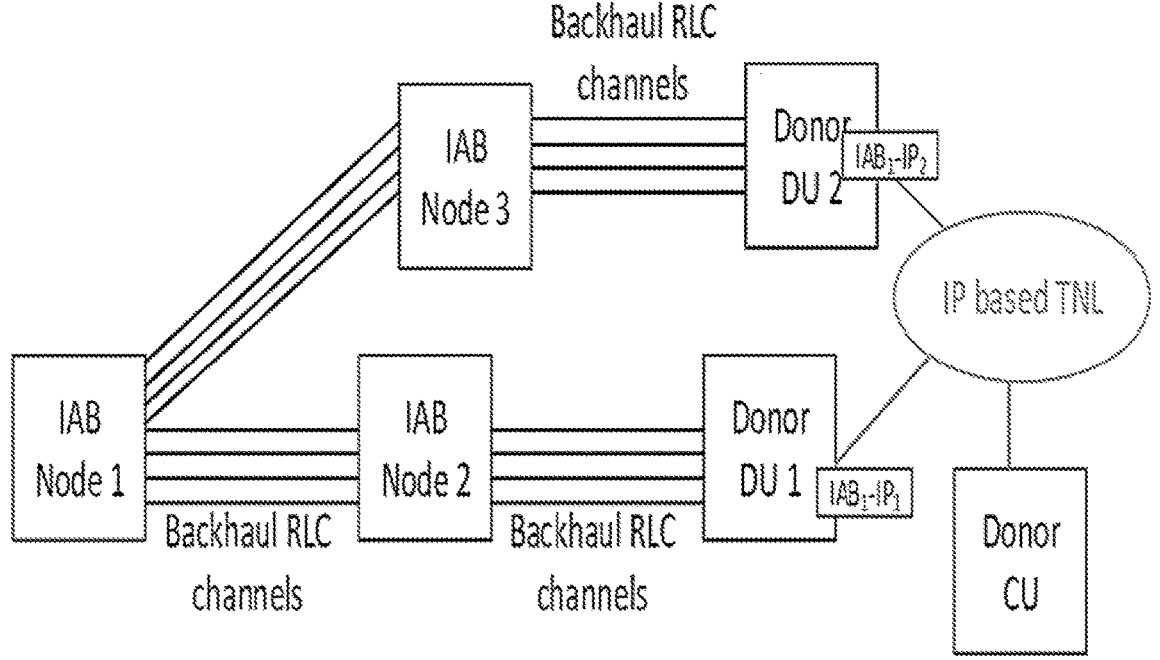
FIG. 14 is a schematic diagram illustrating an example of a Dual Connectivity setup for IAB Node 1, according to existing methods.
Figure 15:
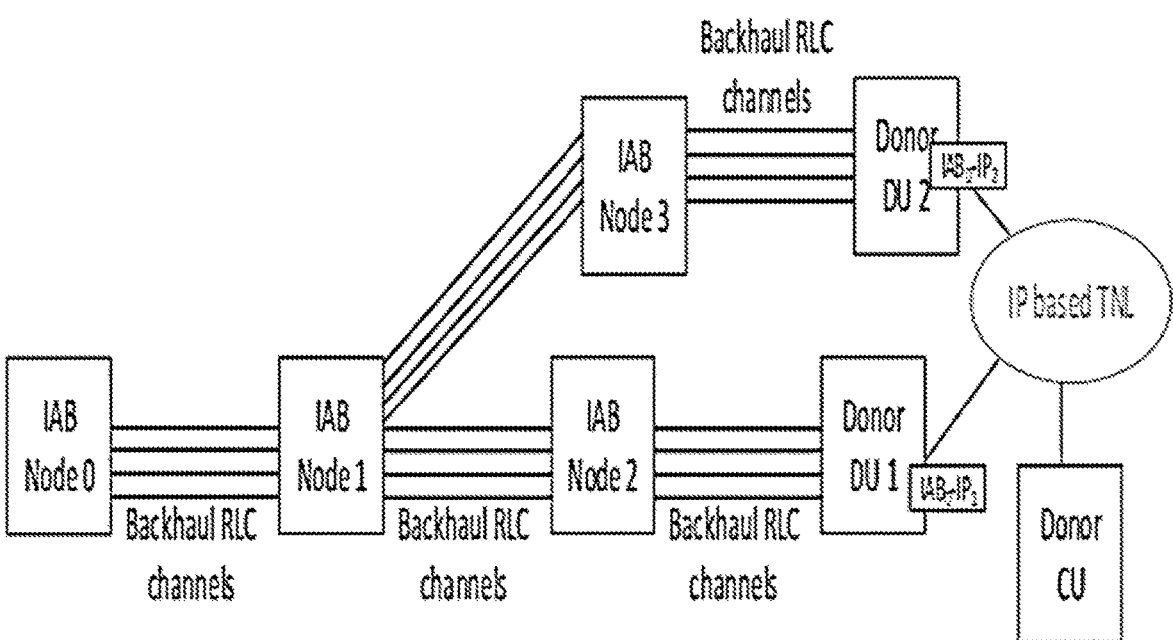
FIG. 15 is a schematic diagram illustrating an example of child IAB-node connected to a parent node supporting multi-connection, according to existing methods.
Figure 16:
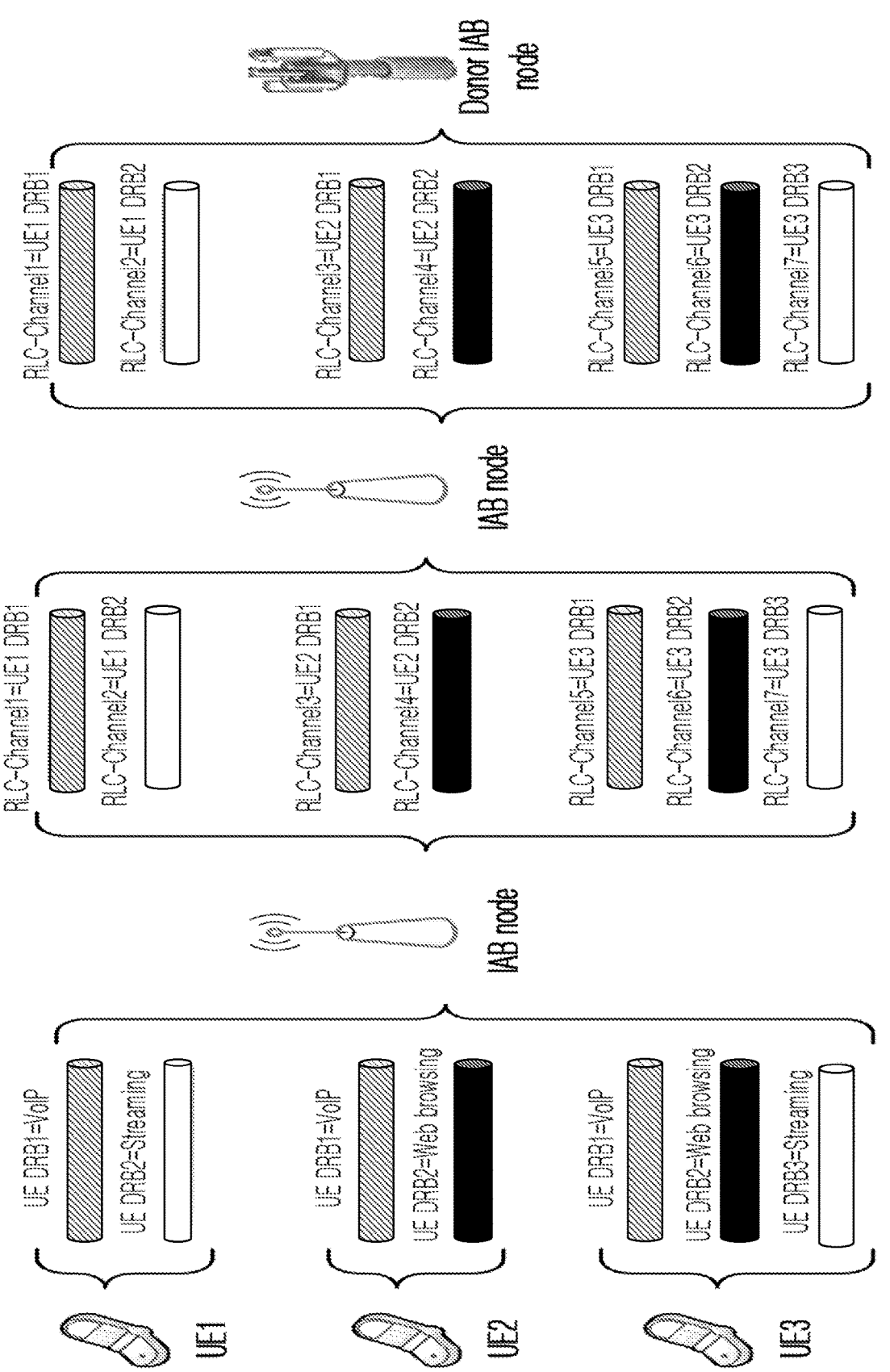
FIG. 16 is a schematic diagram illustrating an example of one-to-one mapping between UE DRB and BH RLC-Channel, according to existing methods.
Figure 17:
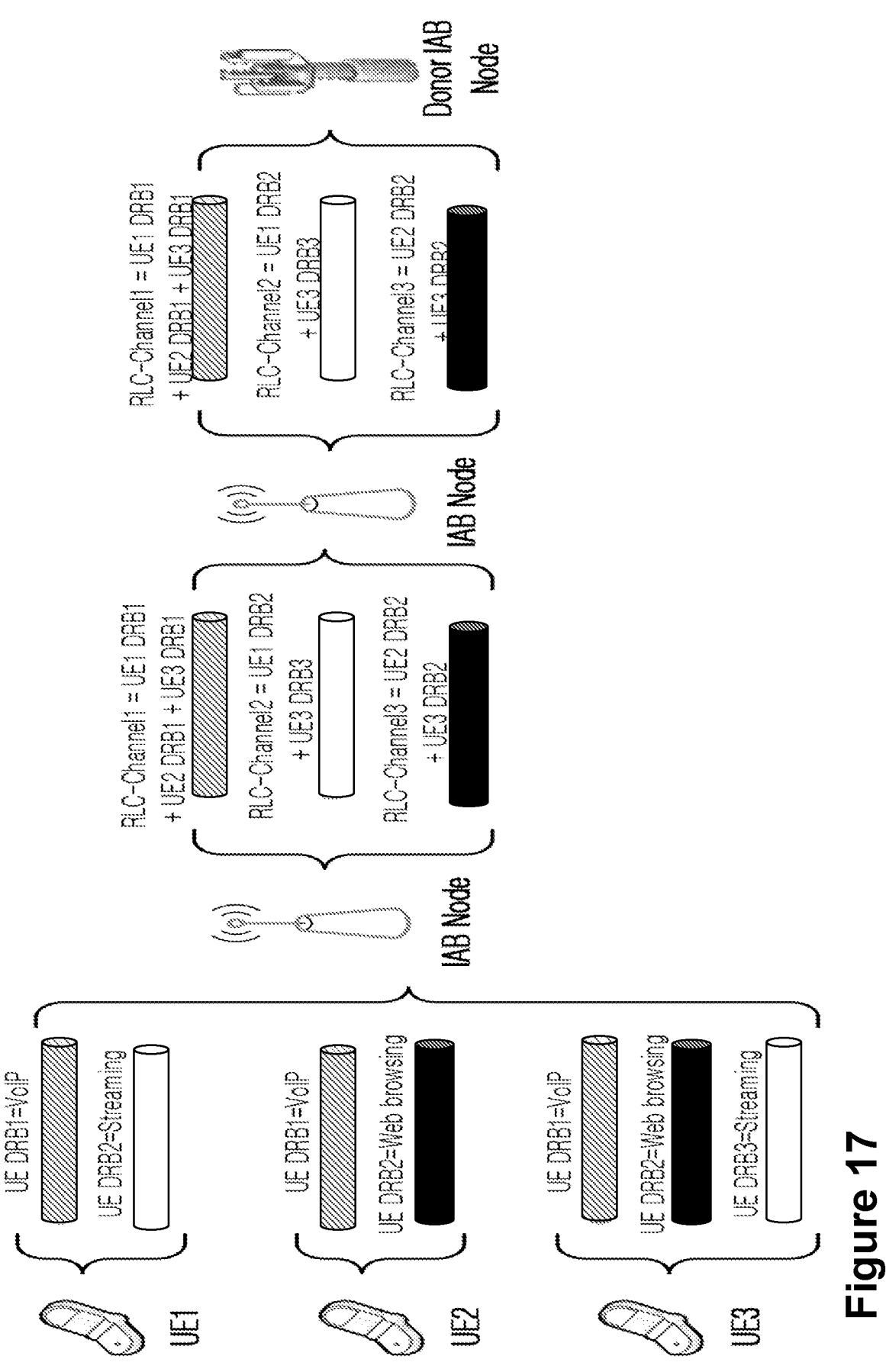
FIG. 17 is a schematic diagram illustrating an example of many-to-one mapping between UE DRBs and BH RLC-channel, according to existing methods.
Figure 18:
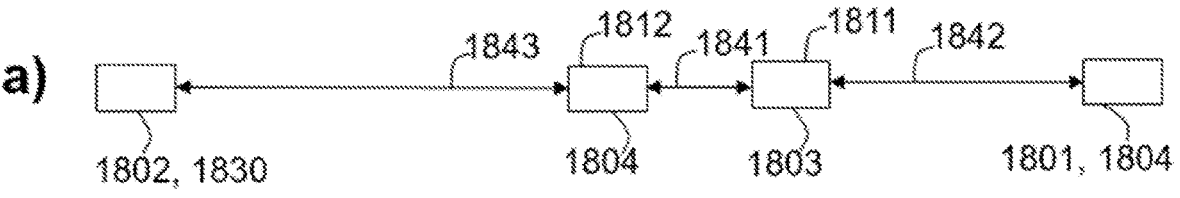
FIG. 18 is a schematic diagram illustrating a communications network, according to embodiments herein.
Figure 18:
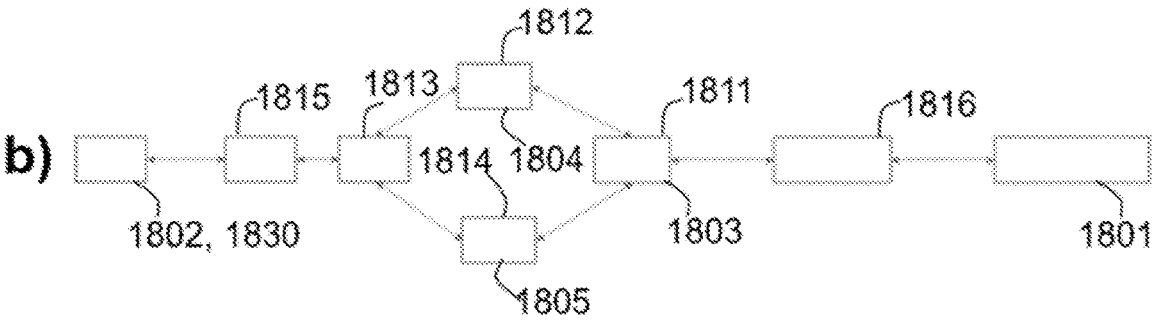
Figure 18:
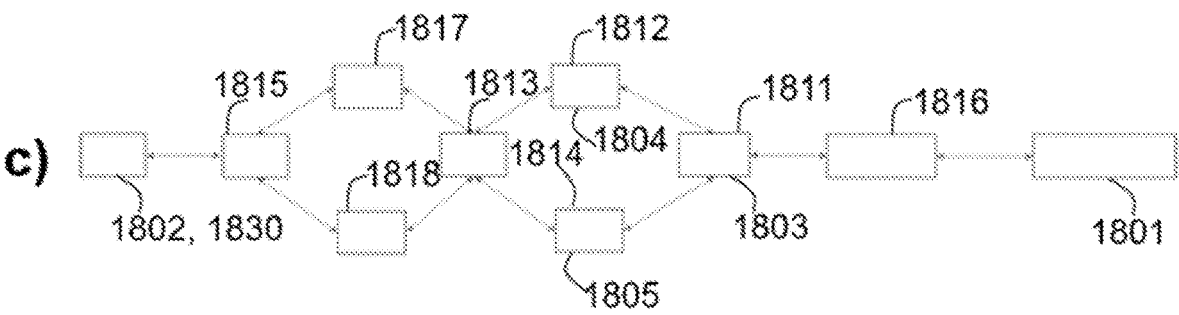
Figure 18:
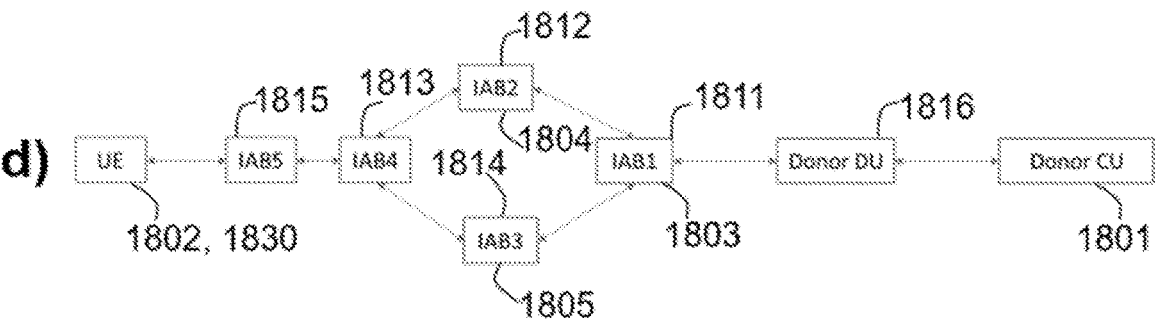
Figure 18:
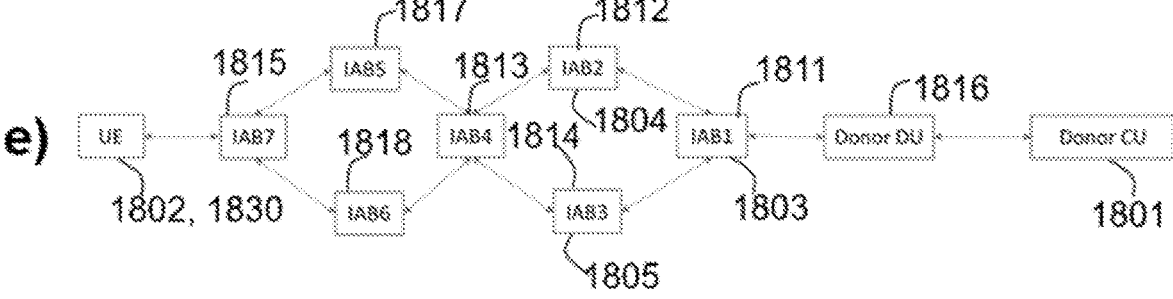
Figure 18:
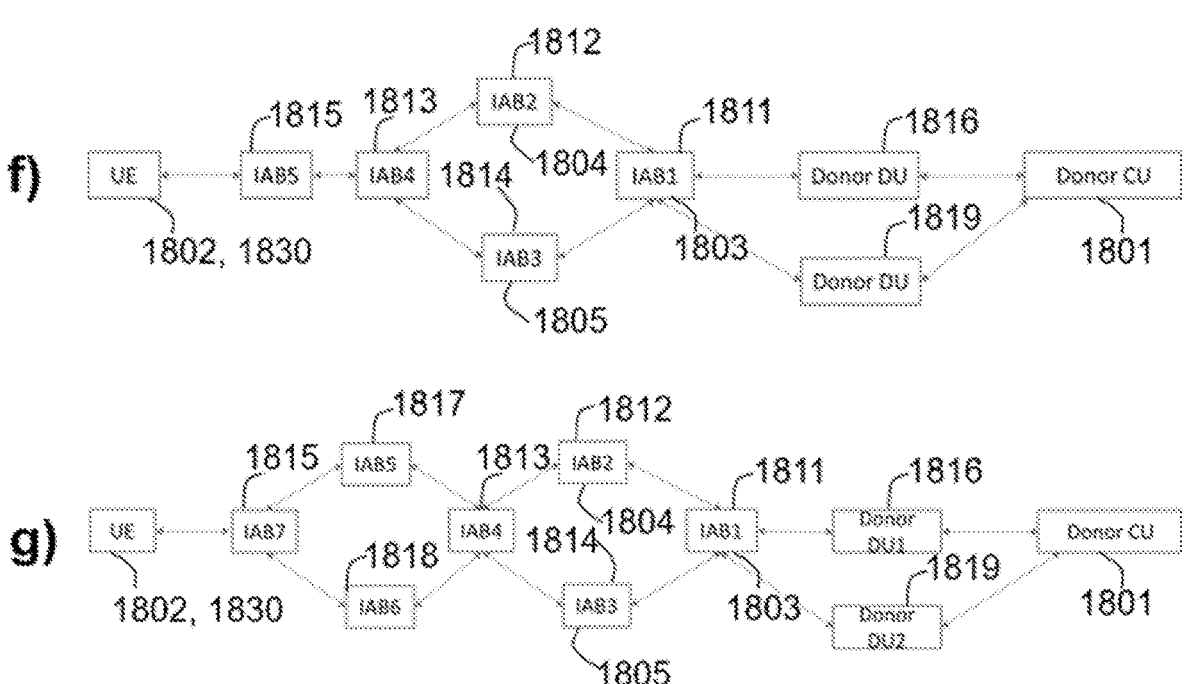

FIG. 18 depicts seven non-limiting examples of a communications network 1800, which may be a wireless communications network, sometimes also referred to as a wireless communications system, cellular radio system, or cellular network, in which embodiments herein may be implemented. The communications network 1800 may typically be a 5G system, 5G network, NR-U or Next Gen System or network, Long-Term Evolution (LTE) system, or a combination of both. The communications network 1800 may alternatively be a younger system than a 5G system. The communications network 1800 may support technologies such as, particularly, LTE-Advanced/LTE-Advanced Pro, e.g., LTE Frequency Division Duplex (FDD), LTE Time Division Duplex (TDD), LTE Half-Duplex Frequency Division Duplex (HD-FDD), LTE operating in an unlicensed band. The communications network 1800 may support yet other technologies such as, for example, License-Assisted Access (LAA), Narrow Band Internet of Things (NB-IoT), Machine Type Communication (MTC), MulteFire, Wideband Code Division Multiplexing Access (WCDMA), Universal Terrestrial Radio Access (UTRA) TDD, Global System for Mobile communications (GSM) network, Enhanced Data for GSM Evolution (EDGE) network, GSM/EDGE Radio Access Network (GERAN) network, Ultra-Mobile Broadband (UMB), network comprising of any combination of Radio Access Technologies (RATs) such as e.g., Multi-Standard Radio (MSR) base stations, multi-RAT base stations etc., any 3rd Generation Partnership Project (3GPP) cellular network, WiFi networks, Worldwide Interoperability for Microwave Access (WiMax). In particular embodiments, such as those depicted in panels d), e), f) and g), the communications network 1800 may be an Integrated Access and Backhaul (IAB) network. Thus, although terminology from 5G/NR and LTE may be used in this disclosure to exemplify embodiments herein, this should not be seen as limiting the scope of the embodiments herein to only the aforementioned systems.

The communications network 1800 comprises a plurality of nodes, whereof a sending node 1801, a receiving node 1802, and at least one intermediate node 1803 between the sending node 1801 and the receiving node 1802 are depicted in the non-limiting examples of FIG. 18. The sending node 1801 may be understood as a node in the communications network 1800 that may send or may need to send, or send at a future time point, one or more packets, and/or one or more messages to or towards the receiving node 1802. The sending may be performed in the UL or in the DL. In some embodiments, at least one of the sending node 1801 and the receiving node 1802 may be a device, e.g., a wireless device, such as the wireless device 1830 described below. In some embodiments, at least one of the sending node 1801 and the receiving node 1802, may be a network node. In particular, the one of the sending node 1801 and the receiving node 1802 that may be a network node may be a donor node within the communications network 1800. The donor node may be understood to be, e.g., a node having a connection, e.g., a wired backhaul connection, to a core network node of the communications network 1800, which is not depicted in FIG. 18 to simplify the Figure. In some particular embodiments, at least one of the sending node 1801 and the receiving node 1802 may be a CU of a donor node, e.g., an IAB-Donor CU. In other particular embodiments, at least one of the sending node 1801 and the receiving node 1802 may be a DU or the donor node, e.g., an IAB-Donor DU. The communications network 1800 may also comprise one or more next hop nodes 1804, 1805. The one or more next hope nodes 1804, 1805 may be understood to be one hop away from a given node, which may be provided as a reference.

The communications network 1800 comprises other nodes, whereof a first node 1811, and a second node 1812 and are depicted in the non-limiting examples of FIG. 18. In some of the examples, since the communications network 1800 may have different deployments in different examples, as illustrated in a non-limiting manner in panels a)-g), the communications network 1800 may also comprise one or more of: a third node 1813, a fourth node 1814, a fifth node 1815, a sixth node 1816, a seventh node 1817, an eighth node 1818 and/or a ninth node 1819. 'Intermediate' and 'access' may be understood as a role that a node, e.g., an IAB node, may play with respect to UEs, e.g., the wireless device 1830 described below. One node, e.g., IAB node, may be the access node to its connected UEs, e.g., the wireless device 1830, but may be an intermediate node to UEs of its child nodes, e.g., IAB nodes. A similar remark may be made with respect to the sending node 101, the receiving node 102 and the one or more next hop nodes 1804, 1805. These may be understood as roles that the nodes, or the wireless device 1830 described later, in the communications network 1800 may play. Hence, for example, as illustrated in the non-limiting examples of FIG. 18, some of the nodes and/or the wireless device 1830 may have two different reference numbers. One of the reference numbers may be understood to identify the node or the wireless device 1830, and the other number may be understood to identify the role that particular node or wireless device 1830 may be playing in a particular example, with respect to a route the one or more packets may follow in a particular occasion. Any of the at least one intermediate node 1803 and the one or more next hop nodes 1804, 1805 may be any of the first node 1811, the second node 1812, the third node 1813, the fourth node

1814, the fifth node 1815, the sixth node 1816, the seventh node 1817, the eighth node 1818 and the ninth node 1819. In particular examples, the second node 1812 may be e.g., any of the one or more next hop nodes 1804, 1805, e.g., another intermediate node.

Any of the first node 1811, the second node 1812, the third node 1813, the fourth node 1814, the fifth node 1815, the sixth node 1816, the seventh node 1817, the eighth node 1818 and the ninth node 1819 may be a radio network node, such as a radio base station, base station or a transmission point, or any other network node with similar features capable of serving a user equipment, such as a wireless device or a machine type communication device, in the communications network 1800. For example, any of the first node 1811, the second node 1812, the third node 1813, the fourth node 1814, the fifth node 1815, the sixth node 1816, the seventh node 1817, the eighth node 1818 and the ninth node 1819 may be a gNB, an eNB, an eNodeB, or an Home Node B, an Home eNode B. Any of the first node 1811, the second node 1812, the third node 1813, the fourth node 1814, the fifth node 1815, the sixth node 1816, the seventh node 1817, the eighth node 1818 and the ninth node 1819 may be of different classes, such as, e.g., macro base station (BS), home BS or pico BS, based on transmission power and thereby also cell size. In some embodiments, any of the first node 1811, the second node 1812, the third node 1813, the fourth node 1814, the fifth node 1815, the sixth node 1816, the seventh node 1817, the eighth node 1818 and the ninth node 1819 may be implemented as one or more distributed nodes, such as virtual nodes in the cloud, and they may perform their functions entirely on the cloud, or partially, in collaboration with one or more radio network nodes.

As depicted in the non-limiting examples of FIG. 18, the communications network 1800 may comprise a multi-hop deployment, wherein one of the first node 1811, the second node 1812, the third node 1813, the fourth node 1814, the fifth node 1815, the sixth node 1816, the seventh node 1817, the eighth node 1818 and the ninth node 1819 may be a donor node. Any of the first node 1811, the second node 1812, the third node 1813, the fourth node 1814, the fifth node 1815, the sixth node 1816, the seventh node 1817, the eighth node 1818 and the ninth node 1819 not being a donor node, may be a relay node. In some particular embodiments, such as those depicted in panels d), e), f) and g) any of the first node 1811, the second node 1812, the third node 1813, the fourth node 1814, the fifth node 1815, the sixth node 1816, the seventh node 1817, the eighth node 1818 and the ninth node 1819 may be an IAB node, which may be a stationary relay/IAB node or a mobile relay/IAB node. In some examples, the scenario depicted in panels f) and g) may not apply.

It may be understood that the communications network 1800 may comprise more nodes, and more or other multi-hop arrangements, which are not depicted in FIG. 18 to simplify the Figure.

Any of the first node 1811, the second node 1812, the third node 1813, the fourth node 1814, the fifth node 1815, the sixth node 1816, the seventh node 1817, the eighth node 1818, and the ninth node 1819, with respect to the sending node 1801, the receiving node 1802, the at least one intermediate node 1803 and the one or more next hop nodes 1804, 1805 may be independent nodes or may be co-localized, or be part of the same network node. The one of the sending node 1801 and the receiving node 1802 being a donor node, may be considered in some examples as a tenth node, having a similar description to that provided for any of the first node 1811, the second node 1812, the third node 1813, the fourth node 1814, the fifth node 1815, the sixth node 1816, the seventh node 1817, the eighth node 1818 and the ninth node 1819.

At least one of the first node 1811, the second node 1812, the third node 1813, the fourth node 1814, the fifth node 1815, the sixth node 1816, the seventh node 1817, the eighth node 1818 and the ninth node 1819 may be a node providing access to the communications network 1800 to one of the sending node 1801 and the receiving node 1802, e.g., to the wireless device 1830. That is, at least one of the first node 1811, the second node 1812, the third node 1813, the fourth node 1814, the fifth node 1815, the sixth node 1816, the seventh node 1817, the eighth node 1818 and the ninth node 1819 may be an access node.

In FIG. 18, for illustrative purposes only and in a non-limiting way, the sending node 1801 is depicted as a wireless device, e.g., the wireless device 1830, the receiving node 1802 is depicted as a donor node, the first node 1811 is depicted as the at least one intermediate node 1803, the second node 1812 is depicted as another intermediate node 1812, the one or more next hop nodes 1804, 1805, are depicted as other intermediate nodes, and the fifth node 1815 is depicted as the access node in some examples.

The communications network 1800 covers a geographical area which may be divided into cell areas, wherein each cell area may be served by any of the first node 1811, the second node 1812, the third node 1813, the fourth node 1814, the fifth node 1815, the sixth node 1816, the seventh node 1817, and the eighth node 1818, although, any of the first node 1811, the second node 1812, the third node 1813, the fourth node 1814, the fifth node 1815, the sixth node 1816, the seventh node 1817, the eighth node 1818 and the ninth node 1819 may serve one or several cells. In the non-limiting example of FIG. 18, the cells are not depicted to simplify the Figure.

An access node, e.g., an Access IAB-DU, and a donor may be able to BAP duplicate. An intermediate node may be able to BAP duplicate.

A wireless device 1830, or more, may be located in the wireless communication network 1800. The wireless device 1830, e.g., a 5G UE, may be a wireless communication device which may also be known as e.g., a UE, a mobile terminal, wireless terminal and/or mobile station, a mobile telephone, cellular telephone, or laptop with wireless capability, just to mention some further examples. The wireless device 1830 may be, for example, portable, pocket-storable, hand-held, computer-comprised, or a vehicle-mounted mobile device, enabled to communicate voice and/or data, via the RAN, with another entity, such as a server, a laptop, a Personal Digital Assistant (PDA), or a tablet, Machine-to-Machine (M2M) device, device equipped with a wireless interface, such as a printer or a file storage device, modem, or any other radio network unit capable of communicating over a radio link in a communications system. The wireless device 1830 comprised in the communications network 1800 is enabled to communicate wirelessly in the communications network 1800. The communication may be performed e.g., via a RAN, and possibly the one or more core networks, which may be comprised within the communications network 1800.

The first node 1811 may be configured to communicate in the communications network 1800 with the second node 1812 over a first link 1841. The first node 1811 may be configured to communicate in the communications network 1800 with the one or more next hop nodes 1804, 1805 over a second link 1842. The second node 1812 may be configured to communicate in the communications network 1800 with the wireless device 1830 over a third link 1843.

Each of the first link 1841, the second link 1842, and the third link 1843 may be, e.g., a radio link. Any two given nodes in the communications network 1800 may communicate with each other with a respective link. These links are not numbered in panels b)-g) to avoid overcrowding the Figure and facilitate the readability of the Figure.

A connection between any two given nodes in the communications network may follow one or more paths. For example, a packet may follow different paths in the communications network 1800 between any two given nodes.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In general, the usage of "first", "second", "third", "fourth", "fifth", . . . , "tenth", etc. herein may be understood to be an arbitrary way to denote different elements or entities and may be understood to not confer a cumulative or chronological character to the nouns they modify, unless otherwise noted, based on context.

Several embodiments are comprised herein. It should be noted that the examples herein are not mutually exclusive. Components from one embodiment may be tacitly assumed to be present in another embodiment and it will be obvious to a person skilled in the art how those components may be used in the other exemplary embodiments.

More specifically, the following are embodiments related to a first node, such as the first node 1811, e.g., a first network node such as an IAB node, and embodiments related to a second node, such as the second node 1812, e.g., a second network node such as another IAB node.

General

For the discussion in the following sections, examples may be provided of embodiments herein, wherein the IAB deployment scenarios depicted in FIG. 18 d) and/or e) may be considered, which correspond, respectively, to Scenario-I (one Donor DU, access IAB node single connected), and Scenario-II (one Donor DU, access IAB node multiple connected).

The terms "downstream" and "downlink (DL)" are used interchangeably.

The terms "upstream" and "uplink (UL)" are used interchangeably.

The terms "backhaul (BH) RLC channel" and "backhaul (BH) bearers" and "backhaul (BH) logical channel" are used interchangeably.

The term "access IAB node" may refer to the IAB node that may be directly serving the wireless device 1830, e.g., a UE, and "intermediate IAB node" may refer to any IAB node between the donor DU and the access IAB node.

In the description below, "duplication" may be used to refer to sending the original and a copy. However, the methods of embodiments herein may be equally applicable if more than one copy is to be sent, e.g., for services that may require extreme reliability and latency.

Although it is not described for the sake of brevity, there is nothing that prevents packet duplication at the UE bearer level to work in conjunction with duplication at the BH RLC channel level, e.g., packet duplication may be enabled at the UE and also at the BH RLC channel level as per the methods of embodiments herein, resulting in 3 copies of the original packet being transmitted between the CU-UP and access IAB node, and 1 copy of the original packet being transmitted between the UE and access IAB node).

Unless otherwise specified, the term CU may be understood to cover both the control and data plane, i.e. CU-CP and CU-UP.

The descriptions below may assume that an IAB that has multiple connectivity may realize that multiple connectivity via DC or having multiple MTs. However, duplication may be realized over a BH RLC channel, even if there is only one parent node, by using carrier aggregation.

Some embodiments herein may be further described with some non-limiting examples.

In the following description, any reference to a/the/any intermediate IAB-node, or simply "IAB-node", described as e.g., indicating duplication may be understood to equally refer the first node 1811; any reference to a/the/any UE may be understood to equally refer the wireless device 1830.

The embodiments herein may be understood to relate to BAP-based duplication.

Figure 19:
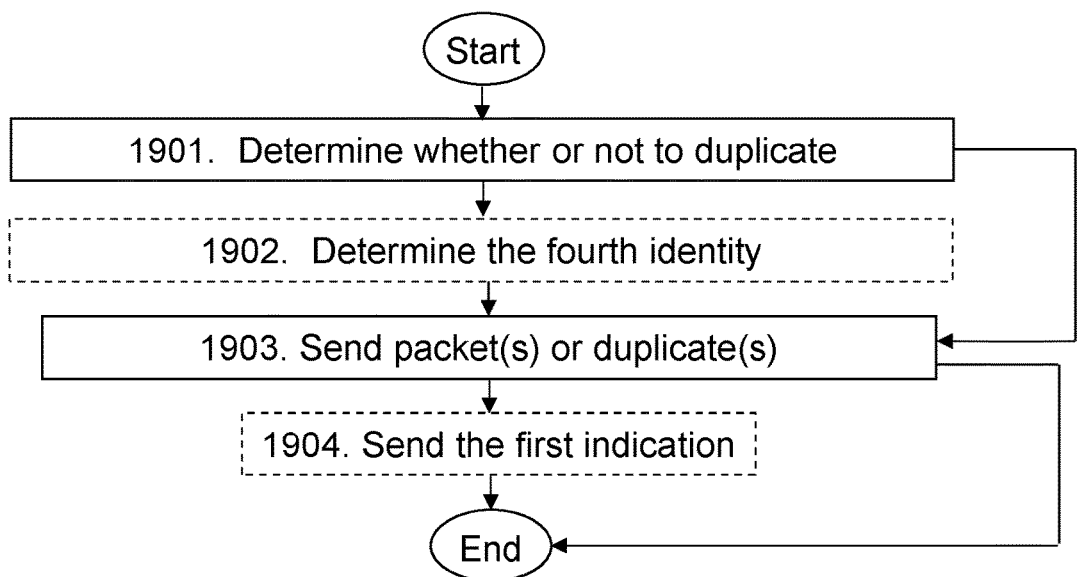
FIG. 19 depicts a flowchart of a method in a first node, according to embodiments herein.

Embodiments of a method, performed by the first node 1811, will now be described with reference to the flowchart depicted in FIG. 19. The method may be understood to be for handling transmission of one or more packets from the sending node 1801 to the receiving node 1802. The first node 1811 operates in the communications network 1800. The communications network 1800 comprises the at least one intermediate node 1803 between the sending node 1801 and the receiving node 1802. The communications network 1800 may be a multi-hop deployment. In some embodiments, the communications network 1800 may be an Integrated Access and Backhaul (IAB) network.

The method may comprise one or more of the following actions. In some embodiments all the actions may be performed. In other embodiments, one or more actions may be performed. One or more embodiments may be combined, where applicable. All possible combinations are not described to simplify the description. Some actions may be performed in a different order than that shown in FIG. 19. In FIG. 19, actions which may be optional in some examples are depicted with dashed boxes.

Action 1901

During the course of communications in the communications network 1800, one or more packets may be transmitted from the sending node 1801 to the receiving node 1802. The first node 1811 may be one of: the sending node 1801, a node providing access to the communications network 1800 to one of the sending node 1801 and the receiving node 1802, a donor Control Unit (CU), a donor Distributed unit (DU) and the at least one intermediate node 1803 between the sending node 1801 and the receiving node 1802. The first node 1811 or the second node 1812 may therefore need to process the one or more packets to send them or forward them to or towards the receiving node 1802. Within this context, and in order to increase the reliability of the transmission of the one or more packets in the communications network 1800, in this Action 1901, the first node 1811 may determine whether or not to duplicate the one or more packets between the first node 1811 and the second node 1812 comprised in the communications network 1800. The second node 1812 may be, e.g., one or more next hop nodes 1804, 1805 in the communications network 1800 towards the receiving node 1802. In some embodiments, the first node 1811 may be configured to be a CU.

Determining may be understood as calculating or deriving.

Regarding the selection of packets to be duplicated, there may be several options. The simplest approach may be that all packets may be duplicated. However, this may lead to a lot of unnecessary traffic because the reliability requirement for different services or for CP vs UP traffic may be drastically different. The IAB nodes may be configured with a behavior to decide which traffic to duplicate or not.

According to the foregoing, some examples of the behavior the IAB nodes may be configured with to decide which traffic to duplicate or not may be as follows.

In some embodiments, the determining in this Action 1901 of whether or not to duplicate may be based on at least one of: a) an attribute, explicit or derived, of the one or more packets, b) a first identity of the sending node 1801, c) a second identity of the receiving node 1802, d) a third identity of the second node 1812, e.g., the one or more next hop nodes 1804, 1805, and e) an indication that the one or more packets are to be duplicated. Each of these options will be further explained next.

Wth regards to option a), in some embodiments, the attribute may be one of the following. According to a first option, the attribute may be a backhaul logical channel associated with the one or more packets. According to this option, only the traffic associated with certain backhaul logical channels may be eligible for duplication, e.g., LCIDs that may be associated to URLLC services, SRBs, F1-AP messages, etc . . .

According to a second option, the attribute may be a first identifier of a path associated with the one or more packets. According to this option, only the traffic associated with certain path IDs, e.g., BAP Path ID carried in the BAP header, may be eligible for duplication.

According to a third option, the attribute may be a second identifier of a Backhaul Adaptation Protocol routing associated with the one or more packets. According to this option, only the traffic associated with certain BAP Routing IDs, e.g., BAP address plus BAP Path ID carried in the BAP header, may be eligible for duplication According to a fourth option, the attribute may be a Quality of Service (QoS) associated with the one or more packets. That is, according to this option, only traffic associated with certain QoS may be eligible for duplication.

According to a fifth option, the attribute may be a delay of the one or more packets. That is, according to this option, only delayed traffic may be eligible for duplication.

According to a sixth option, the attribute may be a traffic type associated with the one or more packets. According to this option, only the downlink traffic associated with all or certain Control Plane traffic type(s) and/or all or certain type(s) of User Plane traffic and/or all or certain type(s) of non-User Plane traffic may be duplicated. On uplink, all or certain non-UP traffic type(s) and/or all or certain User Plane traffic type(s) and/or all or certain Control Plane traffic type(s) may be duplicated According to a seventh option, the attribute may be a Radio Link Control (RLC) mode associated with the one or more packets. According to this option, only the traffic associated with a BH RLC CH configured to work in a certain RLC mode, e.g., Acknowledged Mode (AM) or Unacknowledged Mode (UM), may be duplicated.

According to option b), for example, at the access node, only uplink traffic from certain UEs may be duplicated.

According to option c), only the traffic belonging to a certain destination IAB node, e.g., BAP address carried in the BAP header, may be eligible for duplication. In another example, on the downlink, the donor DU may duplicate packets destined towards one or more UEs, not directly attached to the donor DU.

According to option d), only the traffic towards a certain next-hop node may be duplicated, and duplicates forwarded over another next-hop node(s).

According to option e), any individual packet designated as 'to be duplicated', for whatever reason, may be duplicated.

Any packet may be determined to be duplicated based on a combination of the above examples.

It may be understood to be important to ensure that the IAB nodes forwarding the duplicates may be preconfigured with the information such as next-hop node for the given destination BAP address for both DL and UL directions. At the IAB nodes executing the duplication, it may be indicated whether a routing table entry may refer to a duplicate route or to a route of original packet, in order to avoid racing conditions during routing table updates or during packet forwarding when duplication is not activated. Also, the IAB node(s) duplicating and forwarding the different copies of the packets via different next hop links may be configured/ know that the next nodes may correctly pass packets toward the intended destination node.

In some situations, the IAB nodes may not be preconfigured with the forwarding information for the duplicates that these nodes may receive. In that case, the nodes may need to make an independent decision of whether and/or where to forward the duplicates, for example, if IAB1 in Scenario-I has no information whether IAB2 may be able to properly pass packets destined for IAB5 but forward duplicates to IAB2, while IAB2 routing tables may not be preconfigured with information about the next hop node for destination node IAB5, there may be several criteria based on which IAB nodes may be able to handle duplicates, that is, second copies of packets, for example according to any of the following options.

In some embodiments, the determining in this Action 1901 of whether or not to duplicate may further comprise determining whether or not to remove one or more duplicates of the one or more packets prior to transmitting, that is, sending, the one or more packets. In other words, the first node 1811 may delete and/or drop the duplicates for which the IAB nodes may not have next hop node information in their routing table.

In some embodiments, the determining in this Action 1901 of whether or not to duplicate may be based on the existence of a single or multiple paths between the first node 1811 and the receiving node 1802.

In some embodiments, the determining in this Action 1901 of whether or not to duplicate may be based on the existence of a single or multiple paths between the second node 1812 and the next hop node.

For example, the first node 1811 may forward the duplicates only when the IAB nodes have only one outgoing link or next-hop node, otherwise the first node 1811 may decide to delete and/or drop the packets. In another example, the first node 1811 may forward the duplicates only when the IAB nodes have only one outgoing link or next-hop node and the IAB nodes are less loaded, otherwise the first node 1811 may decide to delete and/or drop the packets. In yet another example, the first node 1811 may forward the duplicates only on the link that is least loaded and/or has best measurement report when the IAB nodes have more than one outgoing link or next-hop node.

By determining whether or not to duplicate the one or more packets between the first node 1811 and the second node 1812 in this Action, the first node 1811 may be enabled to enable to increase the reliability of the packet delivery, since if one of the BH links experiences a link problem or congestion and/or delays, the packet may be transported over the other BH link. This may be understood to also reduce the latency.

An access node, e.g., an Access IAB-DU, a donor or an intermediate node may be able to BAP duplicate. 'Intermediate' and 'access' may be understood as a role that a node, e.g., an IAB node, may play with respect to UEs, e.g., the wireless device 1830. One node, e.g., IAB node, may be the access node to its connected UEs, e.g., the wireless device 1830 but may be an intermediate node to UEs of its child nodes, e.g., IAB nodes. Hence, as another advantage, the first node 1811 may be understood to enable that the duplication be performed anywhere along the connection, preferably at the point where a path may split, which may be understood to avoid unnecessary duplication, e.g., along the same path.

As a further advantage, by enabling to duplication at the intermediate nodes or at the access IAB node, the first node 1811 may be understood to also enable that UEs that may not be capable of packet duplication, in the UL and/or DL, to benefit from it.

Moreover, by determining whether or not to duplicate the one or more packets in this Action, the first node 1811 may be enabled to dynamically decide whether duplication of the one or more packets may be necessary to increase the reliability of their transmission in the communications network 1800 based for example on the dynamic conditions of the link used by the first node 1811 to transmit the one or more packets. An access node, e.g., an Access IAB-DU, a donor or an intermediate node may be able to BAP duplicate. 'Intermediate' and 'access' may be understood as a role that a node, e.g., an IAB node, may play with respect to UEs, e.g., the wireless device 1830. One node, e.g., IAB node, may be the access node to its connected UEs, e.g., the wireless device 1830 but may be an intermediate node to UEs of its child nodes, e.g., IAB nodes. The first node 1811 may be enabled to then only trigger or proceed with the duplication if the duplication is either supported and/or activated over the BAP layer. Since the BAP layer may be present at every hop between the sending node 1801 and the receiving node 1802, this may be understood to enable that the duplication over the BAP layer may be decided by any intermediate node in the communications network 1800, in contrast to for example PDCP duplication. In case of multiple hops, the duplication at the BAP level may be understood to have the advantage that the network may pinpoint only the problematic hop(s) where duplication may need to be applied. This may be understood to be in contrast to, for example, in the case of PDCP level duplication, wherein the duplicate packets have to traverse all the hops, even if some of the hops may be currently experiencing excellent signal levels and duplication over those links may be just a waste of radio resources.

Action 1902

The IAB nodes may be preconfigured with bearer mapping, that is, with the information about which backhaul RLC channels to use for the duplicates. For example, IAB1 in Scenario-I may be preconfigured and/or know which egress backhaul RLC channel(s) to use for forwarding the duplicates to IAB3. The duplicates may either share BH RLC channel(s) with other regular, not duplicated, traffic or some BH RLC channel(s), e.g., with high priority level, may be configured to be used only by the duplicates. This latter case may be beneficial for traffic which may be originally mapped 1:1 on all the links towards the destination node, and the duplicates for this traffic may also need to be treated in 1:1 fashion.

When the first node 1811 may not be preconfigured with ingress-egress bearer mapping for duplicates, the bearer mapping may be executed e.g., in one of the following ways.

In this Action 1902, the first node 1811 may determine an identity, e.g., a fourth identity, of the second node 1812, e.g., the one or more next hop nodes 1804, 1805. The determining in this Action 1902 of the fourth identity being based on at least one of the following options. According to a first option, the first node 1811 may determine the fourth identity based on whether or not the first node 1811 has information on the second node 1812, e.g., the one or more next hop nodes 1804, 1805. That is, the first node 1811 may perform this Action 1902 when the IAB node may not be preconfigured with ingress-egress bearer mapping for duplicates. In some examples, the first node 1811, e.g., the IAB node executing the duplication, may examine the destination BAP address of the packet to be duplicated, search its forwarding table for routing entries for the same destination BAP address, but with a different next-hop node, and map the duplicate to a BH RLC CH towards this another next-hop node. The BH RLC CH used for the duplicate packet may be any of the BH RLC CHs towards this another next-hop node.

According to a second option, the first node 1811 may determine the fourth identity based on, a number of outgoing links of the second node 1812, e.g., the one or more next hop nodes 1804, 1805. In some examples, the first node 1811 may forward the duplicates only when the IAB nodes have only one outgoing link.

According to a third option, the first node 1811 may determine the fourth identity based on a load of the second node 1812, e.g., the one or more next hop nodes 1804, 1805. In some examples, the first node 1811 may forward the duplicates only when the IAB nodes have only one outgoing link or next-hop node and the IAB nodes are less loaded.

According to a fourth option, the first node 1811 may determine the fourth identity based on, and a quality of a respective link between the first node 1811 and the second node 1812, e.g., the one or more next hop nodes 1804, 1805. In some examples, the first node 1811 may forward the duplicates only on the link that is least loaded and/or has best measurement report when the IAB nodes have more than one outgoing link or next-hop node.

By determining the fourth identity in this Action 1902, the first node 1811 may be enabled to execute the bearer mapping to route the one or more packets and/or the one or more duplicates, even when the first node 1811 may not be preconfigured with ingress-egress bearer mapping for duplicates.

Action 1903

The first node 1811 may then send at least one of the one or more packets and the one or more duplicates Particularly, in this Action 1903, the first node 1811 sends, based on a result of the determination, at least one of the one or more packets and the one or more duplicates, over a Backhaul Adaptation Protocol (BAP) layer, or one or more Backhaul Radio Link Channels between the first node 1811 and the second node 1812, e.g., the one or more next hop nodes 1804, 1805.

Sending may be understood as e.g., transmitting or forwarding. The first node 1811 may be understood to send the at least one of the one or more packets and the one or more duplicates to the second node 1812.

In some embodiments, the BAP layer and/or the one or more Backhaul Radio Link Channels may exclude a link between the wireless device 1830 and a node providing access to the communications network 1800 to the wireless device 1830.

In one group of examples of embodiments herein, the duplication may be performed at the BAP layer in one of the IAB nodes along the path to the wireless device 1830, e.g., a UE. The BAP-level duplication may be executed in an access IAB node, intermediate IAB nodes or donor DU. For example, for the scenario-I depicted in FIG. 18 d), IAB node 4 may duplicate UL packets and send them towards IAB3 and IAB2, while in the DL, IAB1 may duplicate DL packets and send them towards IAB3 and IAB2.

Intermediate IAB nodes that have the possibility to use multiple paths may duplicate the packets. The 'multiple paths' may be simultaneous connections to multiple parents or even a connection to one parent but employing CA in the UL direction, or simultaneous connection to multiple children in the DL direction. If the donor DU or the access IAB node have a chance to duplicate, they may do it themselves. A node that may have executed BAP-level duplication of a packet may ensure the avoidance of series of duplications of the packet at subsequent hops. Consequently, this may also enable other subsequent IAB nodes with multiple connections to forward the original packet, that is, the first copy, and duplicates, that is, the second copy, via different links.

By the first node 1811 sending at least one of the one or more packets and the one or more duplicates, over the BAP layer, or the one or more Backhaul Radio Link Channels in this Action 1903, the first node 1811 may be enabled to achieve the advantages described in relation to Action 1901.

Action 1904

In this Action 1904, the first node 1811 sends, to the second node 1812, e.g., the one or more next hop nodes 1804, 1805, another indication, e.g., a first indication indicating to send the one or more packets and the one or more duplicates towards the receiving node 1802 via different links.

Sending may be understood as e.g., transmitting or forwarding.

In some examples, the first indication may be, e.g., a BAP level sequence number that may be introduced so that sending duplicates on all the hops may be avoided. For example, for the Scenario-I in FIG. 18 d), duplicate detection for DL packets may be performed at IAB4 and duplicate detection for UL packets may be performed at IAB1.

By the first node 1811 sending the first indication to the second node 1812 in this Action 1904, the first node 1811 may enable that the second node 1812 detects whether a particular packet is a duplicate or not, and thereby enable that the second node 1812 may send the duplicates on different links than the original packets. Sending of duplicates on all the hops may thereby be avoided, and therefore the reliability of the network may be supported by ensuring that original packets and their duplicates follow different links.

Figure 20:
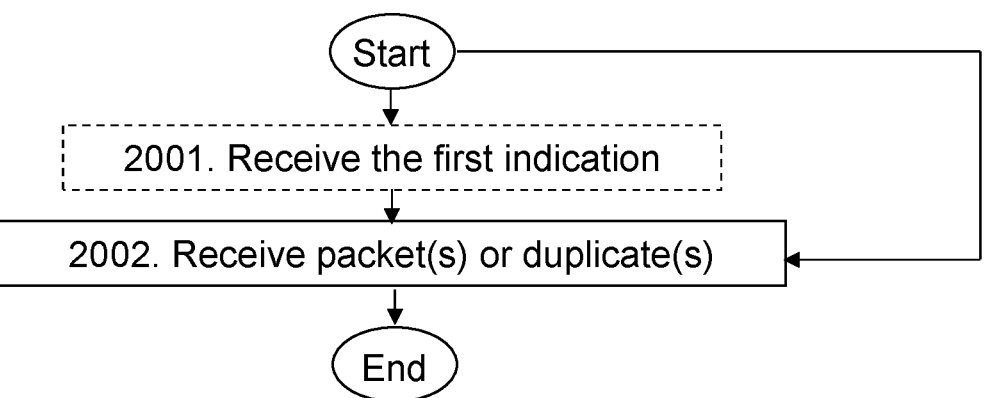
FIG. 20 depicts a flowchart of a method in a second node, according to embodiments herein.

Embodiments of a method, performed by the second node 1812, will now be described with reference to the flowchart depicted in FIG. 20. The method may be understood to be for handling the transmission of the one or more packets from the sending node 1801 to the receiving node 1802. The second node 1812 operates in the communications network 1800. The communications network 1800 comprises at least one intermediate node 1803 between the sending node 1801 and the receiving node 1802.

The communications network 1800 may be a multi-hop deployment. In some embodiments, the communications network 1800 may be an Integrated Access and Backhaul (IAB) network.

The second node 1812 may be, e.g., one or more next hop nodes 1804, 1805 in the communications network 1800 towards the receiving node 1802.

The method may comprise one or more of the following actions.

In some embodiments all the actions may be performed. In other embodiments, one or more actions may be performed. It should be noted that the examples herein are not mutually exclusive. Several embodiments are comprised herein. Components from one embodiment may be tacitly assumed to be present in another embodiment and it will be obvious to a person skilled in the art how those components may be used in the other exemplary embodiments. One or more embodiments may be combined, where applicable. All possible combinations are not described to simplify the description. Some actions may be performed in a different order than that shown in FIG. 20. In FIG. 20, actions which may be optional in some examples are depicted with dashed boxes. In some examples, Action 2001 may be performed. In other examples, any of Action 2002 may be performed.

The detailed description of some of the following corresponds to the same references provided above, in relation to the actions described for the first node 1811 and will thus not be repeated here to simplify the description, however, it applies equally. For example, in some embodiments, the first node 1811 may be one of: the sending node 1801, the node providing access to the communications network 1800 to one of the sending node 1801 and the receiving node 1802, a donor Distributed unit (DU) and the at least one intermediate node 1803 between the sending node 1801 and the receiving node 1802. In some embodiments, the first node 1811 may be configured to be a CU.

Action 2001

In this Action 2001, the second node 1812 may receive the first indication from the first node 1811. The first indication may indicate to send the one or more packets and the one or more duplicates towards the receiving node 1802 via different links.

The receiving in this Action 2001 may be implemented, for example, via the first link 1841.

Action 2002

In this Action 2002, the second node 1812 receives at least one of the one or more packets and one or more duplicates of the one or more packets, over the BAP layer, and/or the one or more Backhaul Radio Link Channels between the first node 1811 and the second node 1812, e.g., the one or more next hop nodes 1804, 1805.

The receiving in this Action 2001 may be implemented, for example, via the first link 1841.

In some embodiments, the receiving in this Action 2002 may be based on at least one of: i) the number of outgoing links of the second node 1812, e.g., the one or more next hop nodes 1804, 1805, ii) the load of the second node 1812, e.g., the one or more next hop nodes 1804, 1805, and iii) the quality of the respective link between the first node 1811 and the second node 1812, e.g., the one or more next hop nodes 1804, 1805.

The receiving in this Action 2002 may be based on at least one of: a) the attribute, explicit or derived, of the one or more packets, b) the first identity of the sending node 1801, c) the second identity of the receiving node 1802, d) the third identity of the second node 1812, e.g., the one or more next hop nodes 1804, 1805, and e) the indication that the one or more packets are to be duplicated.

In some embodiments, the attribute may be one of: i) the backhaul logical channel associated with the one or more packets, ii) the first identifier of the path associated with the one or more packets, iii) the second identifier of a Backhaul Adaptation Protocol routing associated with the one or more packets, iv) the QoS associated with the one or more packets, v) the delay of the one or more packets, vi) the traffic type associated with the one or more packets, and vii) the Radio Link Control mode associated with the one or more packets.

The receiving in this Action 2002 may, in some embodiments, be based on the existence of a single or multiple paths between the first network node 1811 and the receiving node 1802.

In some embodiments, the receiving 2002 may be based on the existence of a single or multiple paths between the second node 112 and the next hop node.

The proposed mechanisms in embodiments herein may be implemented in the cloud environment.

Certain embodiments disclosed herein may provide one or more of the following technical advantage(s), which may be summarized as follows.

As a first advantage, by supporting duplication over BH RLC channels, embodiments herein may be understood to enable to increase the reliability of the packet delivery, since if one of the BH links experiences a link problem or congestion and/or delays, the packet may be transported over the other BH link. This may be understood to also reduce the latency.

As another advantage, embodiments herein may be understood to enable that the duplication be performed anywhere along the connection, preferably at the point where a path may split, which may be understood to avoid unnecessary duplication, e.g., along the same path.

As a further advantage, by enabling to duplication at the intermediate nodes or at the access IAB node, embodiments herein may be understood to also enable that UEs that may not be capable of packet duplication, in the UL and/or DL, to benefit from it.

In case of multiple hops, the duplication at the BAP level may be understood to have the advantage that the network may pinpoint only the problematic hop(s) where duplication may need to be applied. This may be understood to be in contrast to, for example, in the case of PDCP level duplication, wherein the duplicate packets have to traverse all the hops, even if some of the hops may be currently experiencing excellent signal levels and duplication over those links may be just a waste of radio resources.

Figure 21:
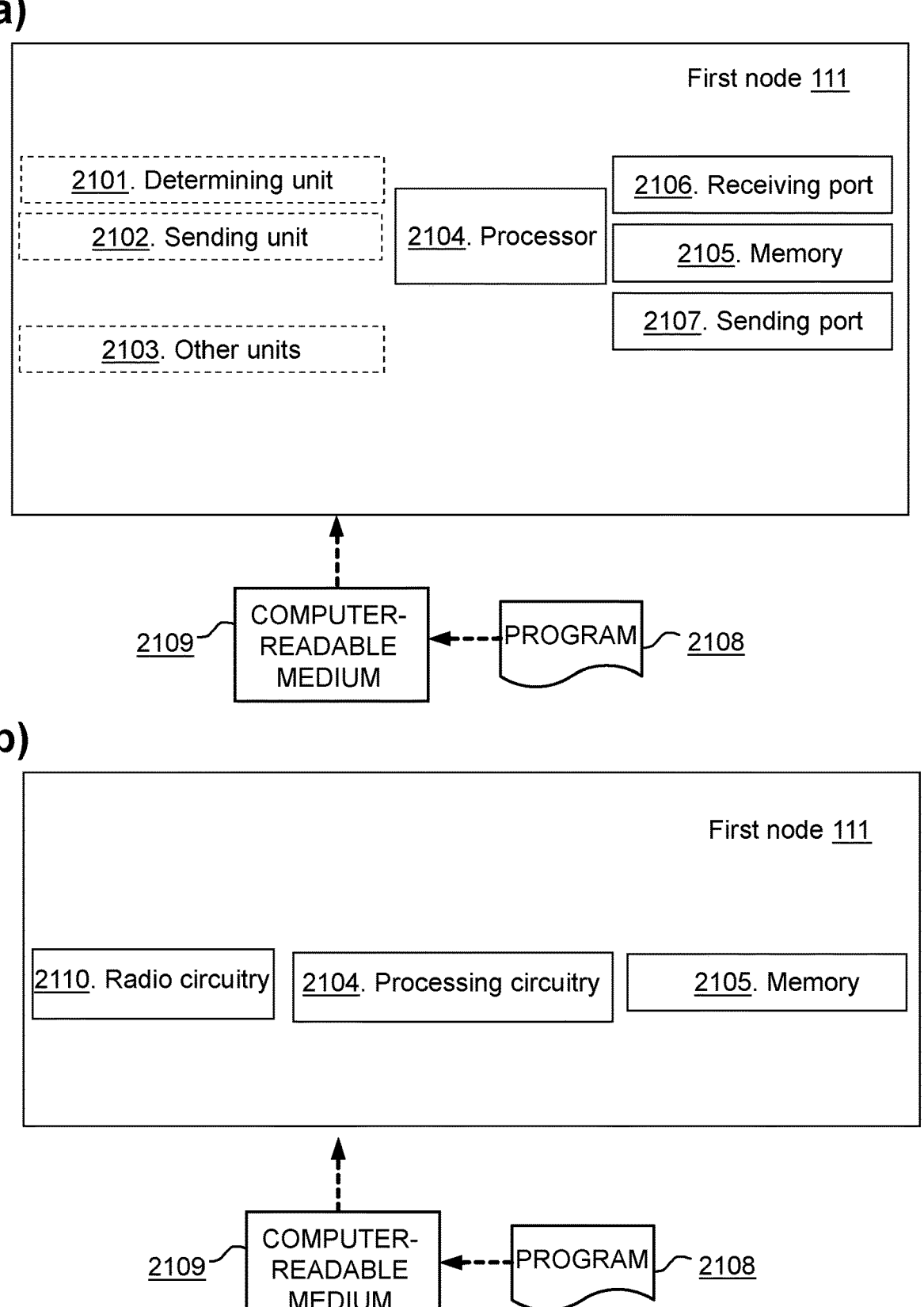
FIG. 21 is a schematic block diagram illustrating two non-limiting examples, a) and b), of a first node, according to embodiments herein.

FIG. 21 depicts two different examples in panels a) and b), respectively, of the arrangement that the first node 1811 may comprise. In some embodiments, the first node 1811 may comprise the following arrangement depicted in FIG. 21*a*. The first node 1811 may be understood to be for handling transmission of one or more packets from the sending node 1801 to the receiving node 1802. The first node 1811 is configured to operate in the communications network 1800. The communications network 1800 is configured to comprise at least one intermediate node 1803 between the sending node 1801 and the receiving node 1802.

In some embodiments, the communications network 1800 may be configured to be an IAB network.

Several embodiments are comprised herein. Components from one embodiment may be tacitly assumed to be present in another embodiment and it will be obvious to a person skilled in the art how those components may be used in the other exemplary embodiments. The detailed description of some of the following corresponds to the same references provided above, in relation to the actions described for the first node 1811 and will thus not be repeated here. For example, the first node 1811 may be configured to be one of: the sending node 1801, the node configured to provide access to the communications network 1800 to one of the sending node 1801 and the receiving node 1802, the donor DU, and the at least one intermediate node 1803 between the sending node 1801 and the receiving node 1802. In some embodiments, the first node 1811 may be configured to be a CU.

In FIG. 21, optional units are indicated with dashed boxes.

The first node 1811 is configured to perform the determining of Action 1901, e.g. by means of a determining unit 2101 within the first node 1811, configured to determine whether or not to duplicate the one or more packets between the first node 1811 and the second node 1812 configured to be comprised in the communications network 1800.

The first node 1811 is configured to perform the sending of Action 1903, e.g. by means of a sending unit 2102 within the first node 1811, configured to send, based on the result of the determination, at least one of the one or more packets and the one or more duplicates, over the BAP layer, or the one or more Backhaul Radio Link Channels configured to be between the first node 1811 and the second node 1812.

In some embodiments, the first node 1811 may be configured to perform the determining of Action 1902, e.g. by means of the determining unit 2101 within the first node 1811, configured to determine the fourth identity of the second node 1812. The determining of the fourth identity may be configured to be based on at least one of: i) whether or not the first node 1811 has information on the second node 1812, ii) the number of outgoing links of the second node 1812, iii) the load of the second node 1812, and iv) the quality of the respective link between the first node 1811 and the second node 1812.

In some embodiments, the determining of whether or not to duplicate may be further configured to comprise determining whether or not to remove one or more duplicates of the one or more packets prior to sending the one or more packets.

In some embodiments, the determining of whether or not to duplicate may be configured to be based on at least one of: a) the attribute, explicit or derived, of the one or more packets, b) the first identity of the sending node 1801, c) the second identity of the receiving node 1802, d) the third identity of the second node 1812, and e) the indication that the one or more packets are to be duplicated.

In some embodiments, the attribute may be configured to be one of: i) the backhaul logical channel configured to be associated with the one or more packets, ii) the first identifier of the path configured to be associated with the one or more packets, iii) the second identifier of the BAP routing configured to be associated with the one or more packets, iv) the QoS configured to be associated with the one or more packets, v) the delay of the one or more packets, vi) the traffic type configured to be associated with the one or more packets, and vii) the Radio Link Control mode configured to be associated with the one or more packets.

In some embodiments, the determining of whether or not to duplicate may be configured to be based on the existence of a single or multiple paths between the first node 1811 and the receiving node 1802.

In some embodiments, the first node 1811 may be configured to perform the sending of Action 1904, e.g. by means of the sending unit 2102 within the first node 1811, configured to send, to the second node 1812, the first indication configured to indicate to send the one or more packets and the one or more duplicates towards the receiving node 1802 via different links.

Other units 2103 may be comprised in the first node 1811.

The embodiments herein in the first node 1811 may be implemented through one or more processors, such as a processor 2104 in the first node 1811 depicted in FIG. 21*a*, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the first node 1811. One such carrier may be in the form of a CD ROM disc. It is however feasible with other data carriers such as a memory stick. The computer program code may furthermore be provided as pure program code on a server and downloaded to the first node 1811.

The first node 1811 may further comprise a memory 2105 comprising one or more memory units. The memory 2105 is arranged to be used to store obtained information, store data, configurations, schedulings, and applications etc. to perform the methods herein when being executed in the first node 1811.

In some embodiments, the first node 1811 may receive information from, e.g., any of the second node 1812, the third node 1813, the fourth node 1814, the fifth node 1815, the sixth node 1816, the seventh node 1817, the eighth node 1818 and the ninth node 1819, the sending node 1801, the receiving node 1802, the at least one intermediate node 1803, the one or more next hop nodes 1804, 1805, and/or the wireless device 1830, the host computer 2410, or any of the other nodes, through a receiving port 2106. In some embodiments, the receiving port 2106 may be, for example, connected to one or more antennas in first node 1811. In other embodiments, the first node 1811 may receive information from another structure in the communications network 1800 through the receiving port 2106. Since the receiving port 2106 may be in communication with the processor 2104, the receiving port 2106 may then send the received information to the processor 2104. The receiving port 2106 may also be configured to receive other information.

The processor 2104 in the first node 1811 may be further configured to transmit or send information to e.g., any of the second node 1812, the third node 1813, the fourth node 1814, the fifth node 1815, the sixth node 1816, the seventh node 1817, the eighth node 1818 and the ninth node 1819, the sending node 1801, the receiving node 1802, the at least one intermediate node 1803, the one or more next hop nodes 1804, 1805, and/or the wireless device 1830, the host computer 2410, or any of the other nodes, or another structure in the communications network 1800, through a sending port 2107, which may be in communication with the processor 2104, and the memory 2105.

Those skilled in the art will also appreciate that the units 2101-2103 described above may refer to a combination of analog and digital circuits, and/or one or more processors configured with software and/or firmware, e.g., stored in memory, that, when executed by the one or more processors such as the processor 2104, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different units 2101-2103 described above may be a processor 2104 of the first node 1811, or may be implemented as one or more applications running on one or more processors such as the processor 2104.

Thus, the methods according to the embodiments described herein for the first node 1811 may be respectively implemented by means of a computer program 2108 product, comprising instructions, i.e., software code portions, which, when executed on at least one processor 2104, cause the at least one processor 2104 to carry out the actions described herein, as performed by the first node 1811. The computer program 2108 product may be stored on a computer-readable storage medium 2109. The computer-readable storage medium 2109, having stored thereon the computer program 2108, may comprise instructions which, when executed on at least one processor 2104, cause the at least one processor 2104 to carry out the actions described herein, as performed by the first node 1811. In some embodiments, the computer-readable storage medium 2109 may be a non-transitory computer-readable storage medium, such as a CD ROM disc, or a memory stick. In other embodiments, the computer program 2108 product may be stored on a carrier containing the computer program 2108 just described, wherein the carrier is one of an electronic signal, optical signal, radio signal, or the computer-readable storage medium 2109, as described above.

The first node 1811 may comprise a communication interface configured to facilitate communications between the first node 1811 and other nodes or devices, e.g., any of the second node 1812, the third node 1813, the fourth node 1814, the fifth node 1815, the sixth node 1816, the seventh node 1817, the eighth node 1818 and the ninth node 1819, the sending node 1801, the receiving node 1802, the at least one intermediate node 1803, the one or more next hop nodes 1804, 1805, and/or the wireless device 1830, the host computer 2410, or any of the other nodes. The interface may, for example, include a transceiver configured to transmit and receive radio signals over an air interface in accordance with a suitable standard.

In other embodiments, the first node 1811 may comprise the following arrangement depicted in FIG. 21*b*. The first node 1811 may comprise a processing circuitry 2104, e.g., one or more processors such as the processor 2104, in the first node 1811 and the memory 2105. The first node 1811 may also comprise a radio circuitry 2110, which may comprise e.g., the receiving port 2106 and the sending port 2107. The processing circuitry 2104 may be configured to, or operable to, perform the method actions according to FIG. 19 and/or FIGS. 24-28, in a similar manner as that described in relation to FIG. 21*a*. The radio circuitry 2110 may be configured to set up and maintain at least a wireless connection with any of the second node 1812, the third node 1813, the fourth node 1814, the fifth node 1815, the sixth node 1816, the seventh node 1817, the eighth node 1818 and the ninth node 1819, the sending node 1801, the receiving node 1802, the at least one intermediate node 1803, the one or more next hop nodes 1804, 1805, and/or the wireless device 1830, the host computer 2410, or any of the other nodes. Circuitry may be understood herein as a hardware component.

Hence, embodiments herein also relate to the first node 1811 operative to operate in the communications network 1800. The first node 1811 may comprise the processing circuitry 2104 and the memory 2105, said memory 2105 containing instructions executable by said processing circuitry 2104, whereby the first node 1811 is further operative to perform the actions described herein in relation to the first node 1811, e.g., in FIG. 19 and/or FIGS. 24-28.

Figure 22:
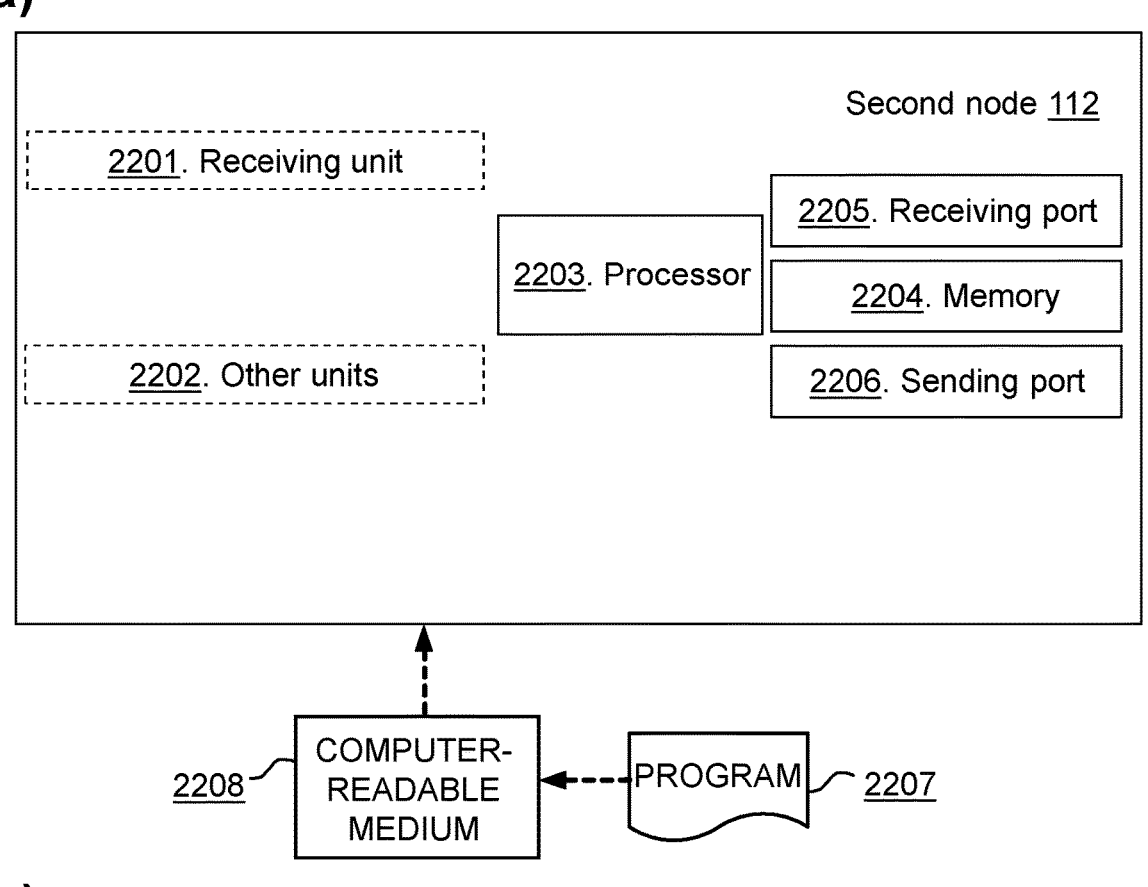
FIG. 22 is a schematic block diagram illustrating two non-limiting examples, a) and b), of a second node, according to embodiments herein.
Figure 22:
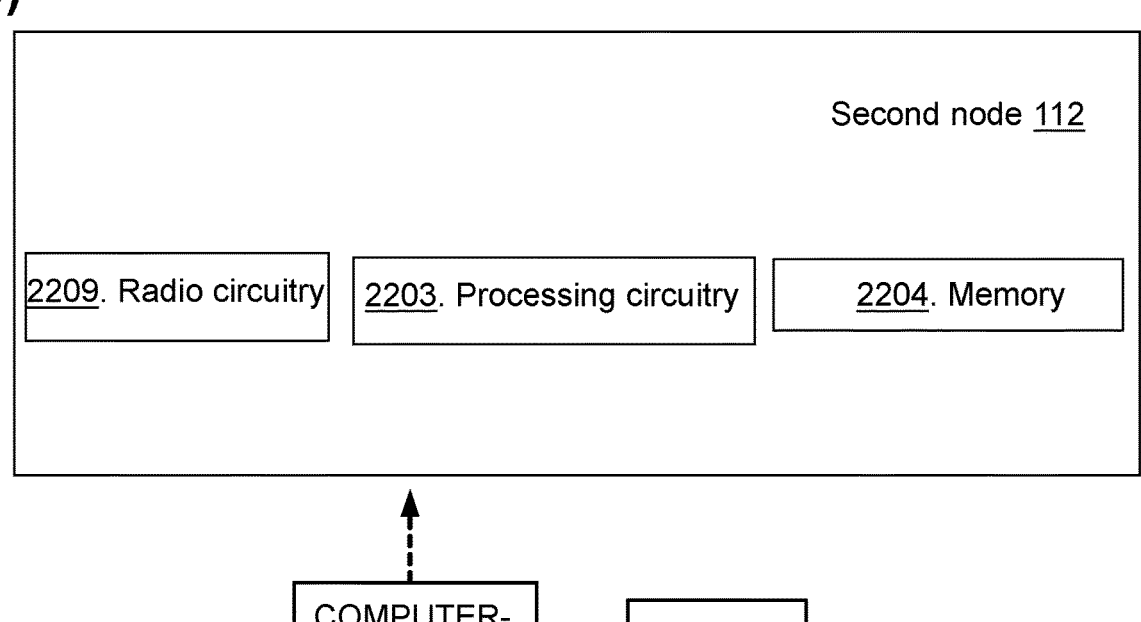

FIG. 22 depicts two different examples in panels a) and b), respectively, of the arrangement that the second node 1812 may comprise. In some embodiments, the second node 1812 may comprise the following arrangement depicted in FIG. 22*a*. The second node 1812 may be understood to be for handling transmission of one or more packets from the sending node 1801 to the receiving node 1802. The second node 1812 is configured to operate in the communications network 1800. The communications network 1800 is configured to comprise at least one intermediate node 1803 between the sending node 1801 and the receiving node 1802.

In some embodiments, the communications network 1800 may be configured to be an IAB network.

Several embodiments are comprised herein. Components from one embodiment may be tacitly assumed to be present in another embodiment and it will be obvious to a person skilled in the art how those components may be used in the other exemplary embodiments. The detailed description of some of the following corresponds to the same references provided above, in relation to the actions described for the first node 1811 and the second node 1812 and will thus not be repeated here. For example, in some embodiments, the first node 1811 may be configured to be one of: the sending node 1801, the node configured to provide access to the communications network 1800 to one of the sending node 1801 and the receiving node 1802, the donor DU, and the at least one intermediate node 1803 between the sending node 1801 and the receiving node 1802. In some embodiments, the first node 1811 may be configured to be a CU.

In FIG. 22, optional units are indicated with dashed boxes.

The second node 1812 is configured to perform the receiving of Action 2002, e.g. by means of a receiving unit 2201 within the second node 1812, configured to receive the at least one of the one or more packets and one or more duplicates of the one or more packets, over the BAP layer, the or one or more Backhaul Radio Link Channels configured to be between the first node 1811 and the second node 1812.

In some embodiments, the receiving may be configured to be based on at least one of: i) the number of outgoing links of the second node 1812, ii) the load of the second node 1812, and iii) the quality of the respective link between the first node 1811 and the second node 1812

In some embodiments, the receiving may be configured to be based on at least one of: a) the attribute, explicit or derived, of the one or more packets, b) the first identity of the sending node 1801, c) the second identity of the receiving node 1802, d) the third identity of the second node 1812, and e) the indication that the one or more packets are to be duplicated.

In some embodiments, the attribute may be configured to be one of: i) the backhaul logical channel configured to be associated with the one or more packets, ii) the first identifier of the path configured to be associated with the one or more packets, iii) the second identifier of the BAP routing configured to be associated with the one or more packets, iv) the QoS configured to be associated with the one or more packets, v) the delay of the one or more packets, vi) the traffic type configured to be associated with the one or more packets, and vii) the Radio Link Control mode configured to be associated with the one or more packets.

In some embodiments, the receiving may be configured to be based on the existence of a single or multiple paths between the first node 1811 and the receiving node 1802.

In some embodiments, the second node 112 may be configured to perform the receiving of Action 2001, e.g., by means of the receiving unit 2201, configured to receive, from the first node 1811, the first indication to send the one or more packets and the one or more duplicates towards the receiving node 1802 via different links.

Other units 2202 may be comprised in the second node 112.

The embodiments herein in the second node 1812 may be implemented through one or more processors, such as a processor 2203 in the second node 1812 depicted in FIG. 22*a*, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the second node 1812. One such carrier may be in the form of a CD ROM disc. It is however feasible with other data carriers such as a memory stick. The computer program code may furthermore be provided as pure program code on a server and downloaded to the second node 1812.

The second node 1812 may further comprise a memory 2204 comprising one or more memory units. The memory 2204 is arranged to be used to store obtained information, store data, configurations, schedulings, and applications etc. to perform the methods herein when being executed in the second node 1812.

In some embodiments, the second node 1812 may receive information from, e.g., any of the first node 1811, the third node 1813, the fourth node 1814, the fifth node 1815, the sixth node 1816, the seventh node 1817, the eighth node 1818 and the ninth node 1819, the sending node 1801, the receiving node 1802, the at least one intermediate node 1803, the one or more next hop nodes 1804, 1805, and/or the wireless device 1830, the host computer 2410, or any of the other nodes, through a receiving port 2205. In some embodiments, the receiving port 2205 may be, for example, connected to one or more antennas in the second node 1812. In other embodiments, the second node 1812 may receive information from another structure in the communications network 1800 through the receiving port 2205. Since the receiving port 2205 may be in communication with the processor 2203, the receiving port 2205 may then send the received information to the processor 2203. The receiving port 2205 may also be configured to receive other information.

The processor 2203 in the second node 1812 may be further configured to transmit or send information to e.g., any of the first node 1811, the third node 1813, the fourth node 1814, the fifth node 1815, the sixth node 1816, the seventh node 1817, the eighth node 1818 and the ninth node 1819, the sending node 1801, the receiving node 1802, the at least one intermediate node 1803, the one or more next hop nodes 1804, 1805, and/or the wireless device 1830, the host computer 2410, or any of the other nodes, or another structure in the communications network 1800, through a sending port 2206, which may be in communication with the processor 2203, and the memory 2204.

Those skilled in the art will also appreciate that the units 2201-2202 described above may refer to a combination of analog and digital circuits, and/or one or more processors configured with software and/or firmware, e.g., stored in memory, that, when executed by the one or more processors such as the processor 2203, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different units 2201-2202 described above implemented as a processor, such as the processor 2203, or as one or more applications running on one or more processors such as the processor 2203.

Thus, the methods according to the embodiments described herein for the second node 1812 may be respectively implemented by means of a computer program 2207 product, comprising instructions, i.e., software code portions, which, when executed on at least one processor 2203, cause the at least one processor 2203 to carry out the actions described herein, as performed by the second node 1812. The computer program 2207 product may be stored on a computer-readable storage medium 2208. The computer-readable storage medium 2208, having stored thereon the computer program 2207, may comprise instructions which, when executed on at least one processor 2203, cause the at least one processor 2203 to carry out the actions described herein, as performed by the second node 1812. In some embodiments, the computer-readable storage medium 2208 may be a non-transitory computer-readable storage medium, such as a CD ROM disc, or a memory stick. In other embodiments, the computer program 2207 product may be stored on a carrier containing the computer program 2207 just described, wherein the carrier is one of an electronic signal, optical signal, radio signal, or the computer-readable storage medium 2208, as described above.

The second node 1812 may comprise a communication interface configured to facilitate communications between the second node 1812 and other nodes or devices, e.g., any of the first node 1811, the third node 1813, the fourth node 1814, the fifth node 1815, the sixth node 1816, the seventh node 1817, the eighth node 1818 and the ninth node 1819, the sending node 1801, the receiving node 1802, the at least one intermediate node 1803, the one or more next hop nodes 1804, 1805, and/or the wireless device 1830, the host computer 2410, or any of the other nodes, or another structure. The interface may, for example, include a transceiver configured to transmit and receive radio signals over an air interface in accordance with a suitable standard.

In other embodiments, the second node 1812 may comprise the following arrangement depicted in FIG. 22*b*. The second node 1812 may comprise a processing circuitry 2203, e.g., one or more processors such as the processor 2203, in the second node 1812 and the memory 2204. The second node 1812 may also comprise a radio circuitry 2209, which may comprise e.g., the receiving port 2205 and the sending port 2206. The processing circuitry 2203 may be configured to, or operable to, perform the method actions according to FIG. 20 and/or FIGS. 24-28, in a similar manner as that described in relation to FIG. 22*a*. The radio circuitry 2209 may be configured to set up and maintain at least a wireless connection with any of the first node 1811, the third node 1813, the fourth node 1814, the fifth node 1815, the sixth node 1816, the seventh node 1817, the eighth node 1818 and the ninth node 1819, the sending node 1801, the receiving node 1802, the at least one intermediate node 1803, the one or more next hop nodes 1804, 1805, and/or the wireless device 1830, the host computer 2410, or any of the other nodes. Circuitry may be understood herein as a hardware component.

Hence, embodiments herein also relate to the second node 1812 operative to operate in the communications network 1800. The second node 1812 may comprise the processing circuitry 2203 and the memory 2204, said memory 2204 containing instructions executable by said processing circuitry 2203, whereby the second node 1812 is further operative to perform the actions described herein in relation to the second node 1812, e.g., in FIG. 20 and/or FIGS. 24-28.

As used herein, the expression "at least one of:" followed by a list of alternatives separated by commas, and wherein the last alternative is preceded by the "and" term, may be understood to mean that only one of the list of alternatives may apply, more than one of the list of alternatives may apply or all of the list of alternatives may apply. This expression may be understood to be equivalent to the expression "at least one of:" followed by a list of alternatives separated by commas, and wherein the last alternative is preceded by the "or" term.

When using the word "comprise" or "comprising" it shall be interpreted as non-limiting, i.e. meaning "consist at least of".

A processor may be understood herein as a hardware component.

The embodiments herein are not limited to the above described preferred embodiments. Various alternatives, modifications and equivalents may be used. Therefore, the above embodiments should not be taken as limiting the scope of the invention.

Examples related to, embodiments herein:

More specifically, the following are embodiments related to a first node, such as the first node 1811, e.g., a first network node such as an IAB node, and embodiments related to a second node, such as the second node 1812, e.g., a second network node such as another IAB node.

The first node 1811 embodiments relate to FIG. 19, FIG. 21 and FIGS. 23-28.

A method, performed by a node, such as the first node 1811 is described herein. The method may be understood to be for handling transmission of one or more packets, e.g., from a sending node 1801 to a receiving node 1802. The first node 1811 may operate in the communications network 1800. The communications network 1800 may comprise at least one intermediate node 1803 between the sending node 1801 and the receiving node 1802. The communications network 1800 may be a multi-hop deployment. In some embodiments, the communications network 1800 may be an Integrated Access Backhaul (IAB) network.

The method may comprise one or more of the following actions.

In some embodiments all the actions may be performed. In other embodiments, one or more actions may be performed. One or more embodiments may be combined, where applicable. All possible combinations are not described to simplify the description. Some actions may be performed in a different order than that shown in FIG. 19. In FIG. 19, actions which may be optional in some examples are depicted with dashed boxes. In some examples, Action 1901 may be performed. In other examples, any of Action 1902, Action 1903 and/or Action 1904 may be performed.

Determining 1901 whether or not to duplicate the one or more packets. The first node 1811 may be configured to perform this determining 1901 action, e.g. by means of a determining unit 21801 within the first node 1811, configured to perform this action.

Determining may be understood as calculating, or deriving.

The determining in this Action 1901 may comprise determining whether or not to duplicate the one or more packets between the first network node 1811 and a second node 1812 comprised in the communications network 1800. The second node 1812 may be, e.g., one or more next hop nodes 1804, 1805 in the communications network 1800 towards the receiving node 1802.

In some embodiments, the method may comprise one or more of the following actions:

Sending/transmitting 1903 at least one of the one or more packets and the one or more duplicates. The first node 1811 may be configured to perform this transmitting 1903 action, e.g. by means of a sending unit 21802 within the first node 1811, configured to perform this action.

Sending may be understood as e.g., transmitting or forwarding.

The transmitting/sending in this Action 1903 may be based on a result of the determination.

The transmitting/sending in this Action 1903 may be over a Backhaul Adaptation Protocol (BAP) layer, and/or one or more Backhaul Radio Link Channels between the first node 1811 and second node 1812, e.g., the one or more next hop nodes 1804, 1805.

In some embodiments, the BAP layer and/or the one or more ne or more Backhaul Radio Link Channels may exclude a link between the wireless device 130 and a node providing access to the communications network 1800 to the wireless device 130.

In some embodiments, the first node 1811 may be one of: the sending node 1801, a node providing access to the communications network 1800 to one of the sending node 1801 and the receiving node 1801, a donor data unit DU, and the at least one intermediate node 1803 between the sending node 1801 and the receiving node 1802.

Determining 1902 an identity, e.g., a fourth identity, of the second node 1812, e.g., the one or more next hop nodes 1804, 1805. The first node 1811 may be configured to perform this determining 1902 action, e.g. by means of the determining unit 21801 within the first node 1811, configured to perform this action.

The determining 1902 of the fourth identity may be based on at least one of:

whether or not the first node 1811 has information on the second node 1812, e.g., the one or more next hop nodes 1804, 1805, a number of outgoing links of the second node 1812, e.g., the one or more next hop nodes 1804, 1805, a load of the second node 1812, e.g., the one or more next hop nodes 1804, 1805, and a quality of a respective link between the first node 1811 and the second node 1812, e.g., the one or more next hop nodes 1804, 1805.

In some embodiments, the determining 1901 of whether or not to duplicate may further comprise determining whether or not to remove one or more duplicates of the one or more packets, e.g., prior to sending/transmitting the one or more packets.

In some embodiments, the determining 1901 of whether or not to duplicate may be based on at least one of:

an attribute, explicit or derived, of the one or more packets, a first identity of the sending node 1801, a second identity of the receiving node 1802, a third identity of the second node 1812, e.g., the one or more next hop nodes 1804, 1805, and an indication that the one or more packets are to be duplicated.

In some embodiments, the attribute may be one of:

a backhaul logical channel associated with the one or more packets, a first identifier of a path associated with the one or more packets, a second identifier of a Backhaul Adaptation Protocol routing associated with the one or more packets, a Quality of Service (QoS) associated with the one or more packets, a delay of the one or more packets, a traffic type associated with the one or more packets, and a Radio Link Control (RLC) mode associated with the one or more packets.

In some embodiments, the determining 1901 of whether or not to duplicate may be based on the existence of a single or multiple paths between the first network node 1811 and the receiving node 1802.

In some embodiments, the determining 1901 of whether or not to duplicate may be based on the existence of a single or multiple paths between the second node 1812 and the next hop node.

Sending 1904 another indication, e.g., a first indication. The first node 1811 may be configured to perform this sending 1904 action, e.g. by means of the sending unit 21802 within the first node 1811, configured to perform this action.

The sending in this Action 1904 may be e.g., to the second node 1812, e.g., the one or more next hop nodes 1804, 1805.

The first indication may indicate to send the one or more packets and the one or more duplicates towards the receiving node 1802 via different links.

Other units 21804 may be comprised in the first node 1811.

The first node 1811 may also be configured to communicate user data with a host application unit in a host computer 2410, e.g., via another link such as 2450.

In FIG. 21, optional units are indicated with dashed boxes.

The first node 1811 may comprise an interface unit to facilitate communications between the first node 1811 and other nodes or devices, e.g., any of the second node 1812, the third node 113, the fourth node 114, the fifth node 115, the sixth node 116, the seventh node 117, the eighth node 118 and the ninth node 119, the sending node 1801, the receiving node 1802, the at least one intermediate node 1803, the one or more next hop nodes 1804, 1805, the wireless device 130, the host computer 2410, and/or any of the other nodes. In some particular examples, the interface may, for example, include a transceiver configured to transmit and receive radio signals over an air interface in accordance with a suitable standard.

Figure 24:
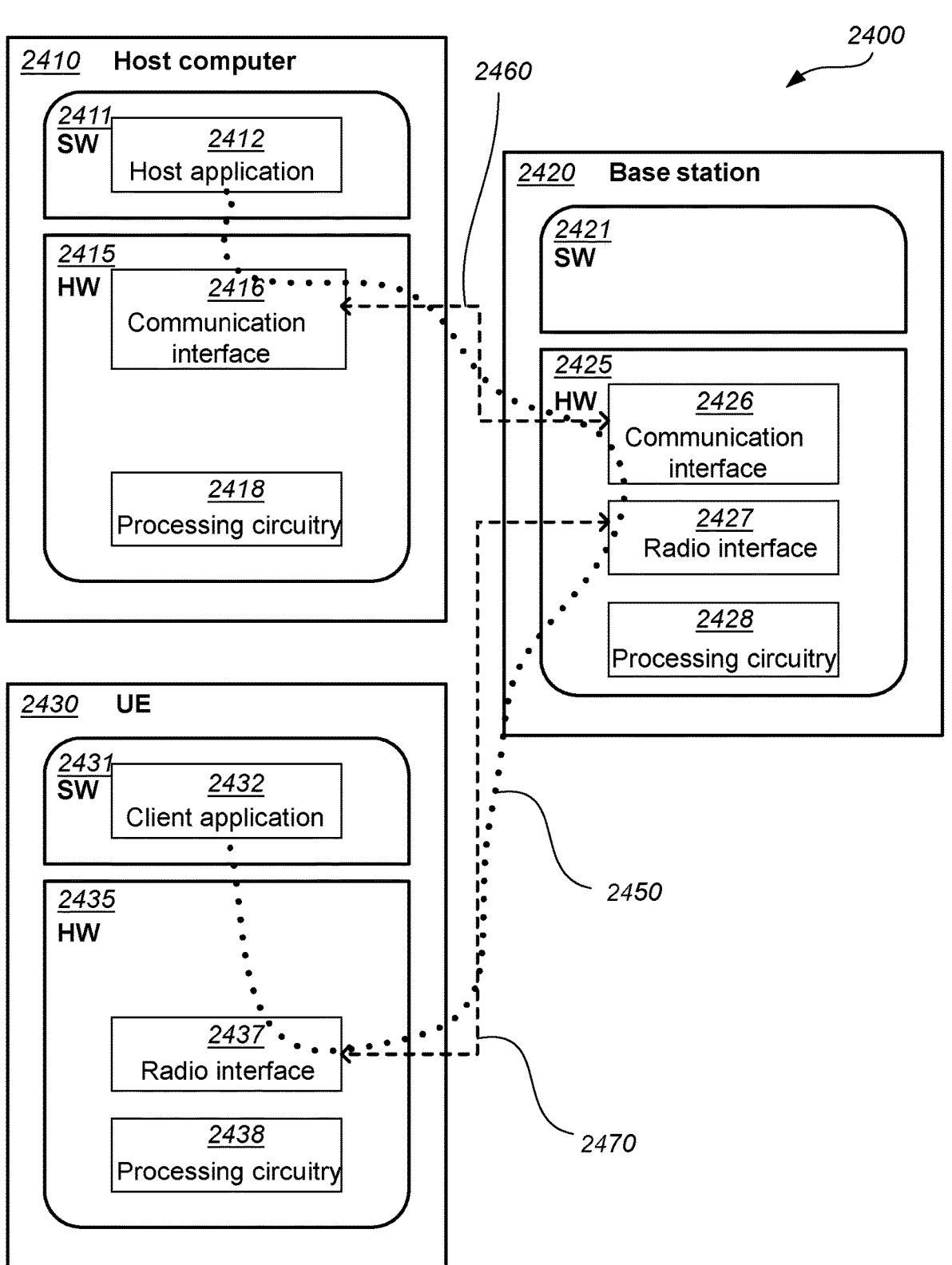
FIG. 24 is a generalized block diagram of a host computer communicating via a base station with a user equipment over a partially wireless connection, according to embodiments herein.

The first node 1811 may comprise an arrangement as shown in FIG. 21 or in FIG. 24.

The second node 1812 embodiments relate to FIG. 20, FIG. 22 and FIGS. 23-28.

A method performed by another node, such as the second node 1812, e.g., one or more next hop nodes 1804, 1805 in the communications network 1800 towards the receiving node 1802, is described herein. The method may be understood to be for handling transmission of one or more packets, e.g., from a sending node 1801 to a receiving node 1802. The second node 1812 may operate in the communications network 1800. The communications network 1800 may comprise at least one intermediate node 1803 between the sending node 1801 and the receiving node 1802. The communications network 1800 may be a multi-hop deployment. In some embodiments, the communications network 1800 may be an Integrated Access Backhaul (IAB) network.

The method may comprise one or more of the following actions.

In some embodiments all the actions may be performed. In other embodiments, one or more actions may be performed. One or more embodiments may be combined, where applicable. All possible combinations are not described to simplify the description. Some actions may be performed in a different order than that shown in FIG. 20. In FIG. 20, actions which may be optional in some examples are depicted with dashed boxes. In some examples, Action 2001 may be performed. In other examples, Action 2002 may be performed.

Receiving 2002 at least one of the one or more packets and one or more duplicates of the one or more packets. The second node 1812 may be configured to perform this receiving 2002 action, e.g. by means of a receiving unit 2201 within the second node 1812, configured to perform this action.

The receiving in this Action 2002 may be over the BAP layer, and/or the one or more Backhaul Radio Link Channels between the first node 1811 and second node 1812, e.g., the one or more next hop nodes 1804, 1805.

In some embodiments, the first node 1811 may be one of. the sending node 1801, a node providing access to the communications network 1800 to one of the sending node 1801 and the receiving node 1801, a donor data unit DU, and the at least one intermediate node 1803 between the sending node 1801 and the receiving node 1802.

The receiving 2002 may be based on at least one of:

the number of outgoing links of the second node 1812, e.g., the one or more next hop nodes 1804, 1805, the load of the second node 1812, e.g., the one or more next hop nodes 1804, 1805, and the quality of a respective link between the first node 1811 and the second node 1812, e.g., the one or more next hop nodes 1804, 1805.

In some embodiments, the receiving 2002 may be based on at least one of:

the attribute, explicit or derived, of the one or more packets, the first identity of the sending node 1801, the second identity of the receiving node 1802, the third identity of the second node 1812, e.g., the one or more next hop nodes 1804, 1805, and the indication that the one or more packets are to be duplicated.

In some embodiments, the attribute may be one of:

the backhaul logical channel associated with the one or more packets, the first identifier of a path associated with the one or more packets, the second identifier of a Backhaul Adaptation Protocol routing associated with the one or more packets, the Quality of Service (QoS) associated with the one or more packets, the delay of the one or more packets, the traffic type associated with the one or more packets, and the Radio Link Control (RLC) mode associated with the one or more packets.

In some embodiments, the receiving 2002 may be based on the existence of a single or multiple paths between the first network node 1811 and the receiving node 1802.

In some embodiments, the receiving 2002 may be based on the existence of a single or multiple paths between the second node 1812 and the next hop node.

In some embodiments, the method may comprise one or more of the following actions:

Receiving 2001 another indication, e.g., the first indication. The second node 1812 may be configured to perform this receiving action 2001, e.g., by means of the receiving unit 2201, configured to perform this action.

The receiving in this Action 2001 may be e.g., from the first node 1811.

The first indication may indicate to send the one or more packets and the one or more duplicates towards the receiving node 1802 via different links.

Other units 2204 may be comprised in the second node 1812.

The second node 1812 may also be configured to communicate user data with a host application unit in a host computer 2410, e.g., via another link such as 2450.

In FIG. 22, optional units are indicated with dashed boxes.

The second node 1812 may comprise an interface unit to facilitate communications between the second node 1812 and other nodes or devices, e.g., any of the first node 1811, the third node 113, the fourth node 114, the fifth node 115, the sixth node 116, the seventh node 117, the eighth node 118 and the ninth node 119, the sending node 1801, the receiving node 1802, the at least one intermediate node 1803, the one or more next hop nodes 1804, 1805, and/or the wireless device 130, the host computer 2410, or any of the other nodes. In some particular examples, the interface may, for example, include a transceiver configured to transmit and receive radio signals over an air interface in accordance with a suitable standard.

The second node 1812 may comprise an arrangement as shown in FIG. 22 or in FIG. 24.

Further Extensions And Variations

Figure 23:
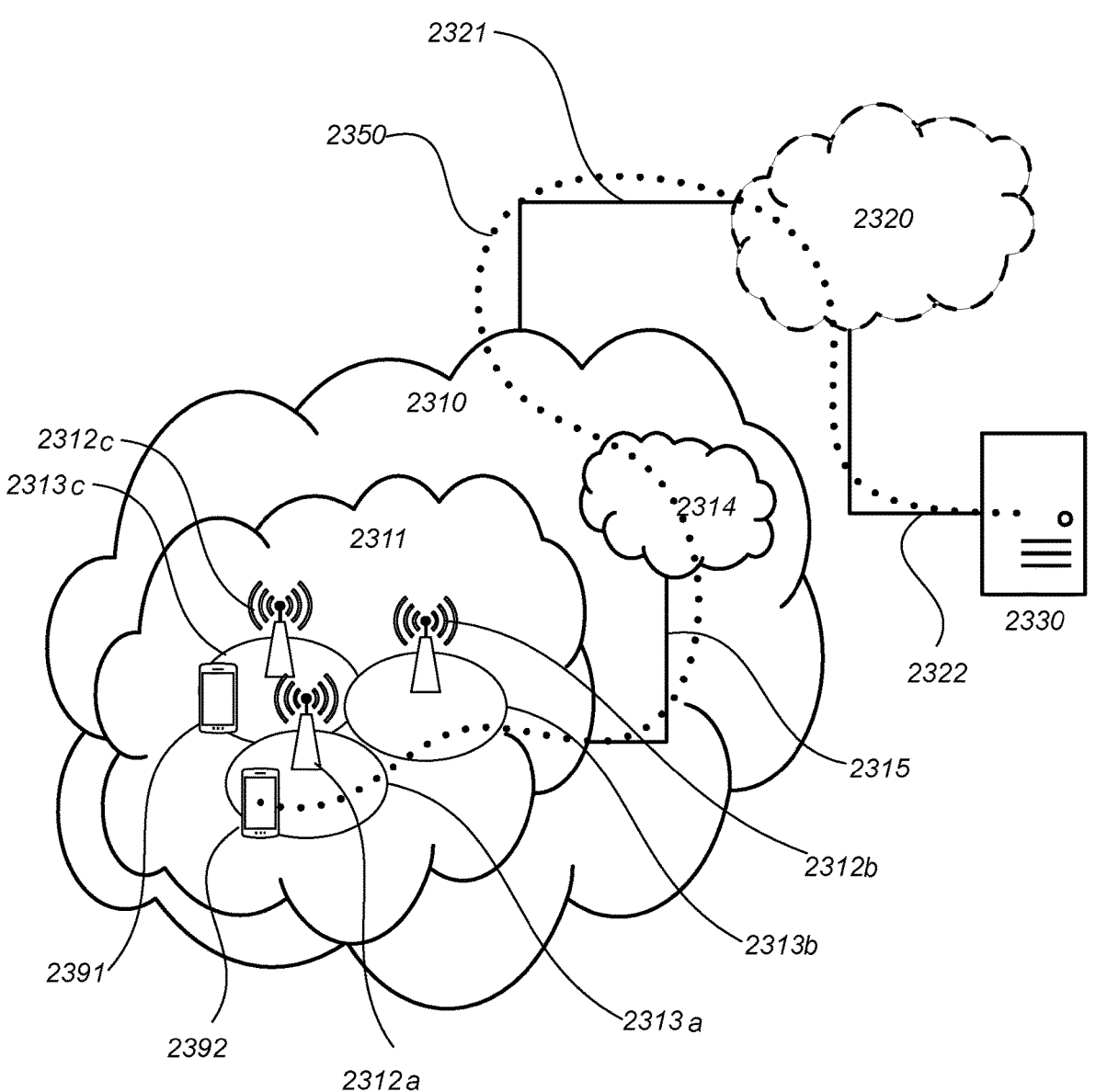
FIG. 23 is a schematic block diagram illustrating a telecommunication network connected via an intermediate network to a host computer, according to embodiments herein.

FIG. 23: Telecommunication Network Connected Via an Intermediate Network to a Host Computer in Accordance with Some Embodiments Wth reference to FIG. 23, in accordance with an embodiment, a communication system includes telecommunication network 2310 such as the communications network 1800, for example, a 3GPP-type cellular network, which comprises access network 2311, such as a radio access network, and core network 2314. Access network 2311 comprises a plurality of network nodes such as any of the first node 1811, the second node 1812, the third node 1813, the fourth node 1814, the fifth node 1815, the sixth node 1816, the seventh node 1817, the eighth node 1818 and the ninth node 1819. For example, base stations 2312a, 2312b, 2312c, such as NBs, eNBs, gNBs or other types of wireless access points, each defining a corresponding coverage area 2313a, 2313b, 2313c. Each base station 2312a, 2312b, 2312c is connectable to core network 2314 over a wired or wireless connection 2315. In FIG. 23, a first UE 2391 located in coverage area 2313c is configured to wirelessly connect to, or be paged by, the corresponding base station 2312c. A second UE 2392 in coverage area 2313a is wirelessly connectable to the corresponding base station 2312a. While a plurality of UEs 2391, 2392 are illustrated in this example, the disclosed embodiments are equally applicable to a situation where a sole UE is in the coverage area or where a sole UE is connecting to the corresponding base station 2312. Any of the UEs 2391, 2392 may be as examples of the wireless device 1830.

Telecommunication network 2310 is itself connected to host computer 2330, which may be embodied in the hardware and/or software of a standalone server, a cloud-implemented server, a distributed server or as processing resources in a server farm. Host computer 2330 may be under the ownership or control of a service provider, or may be operated by the service provider or on behalf of the service provider. Connections 2321 and 2322 between telecommunication network 2310 and host computer 2330 may extend directly from core network 2314 to host computer 2330 or may go via an optional intermediate network 2320. Intermediate network 2320 may be one of, or a combination of more than one of, a public, private or hosted network; intermediate network 2320, if any, may be a backbone network or the Internet; in particular, intermediate network 2320 may comprise two or more sub-networks (not shown).

The communication system of FIG. 23 as a whole enables connectivity between the connected UEs 2391, 2392 and host computer 2330. The connectivity may be described as an over-the-top (OTT) connection 2350. Host computer 2330 and the connected UEs 2391, 2392 are configured to communicate data and/or signalling via OTT connection 2350, using access network 2311, core network 2314, any intermediate network 2320 and possible further infrastructure (not shown) as intermediaries. OTT connection 2350 may be transparent in the sense that the participating communication devices through which OTT connection 2350 passes are unaware of routing of uplink and downlink communications. For example, base station 2312 may not or need not be informed about the past routing of an incoming downlink communication with data originating from host computer 2330 to be forwarded (e.g., handed over) to a connected UE 2391. Similarly, base station 2312 need not be aware of the future routing of an outgoing uplink communication originating from the UE 2391 towards the host computer 2330.

In relation to FIGS. 24, 25, 26, 27, and 28, which are described next, it may be understood that a UE may be considered to, be an examples of the wireless device 1830. It may be also understood that the base station is an example of any of the first node 1811, the second node 1812, the third node 1813, the fourth node 1814, the fifth node 1815, the sixth node 1816, the seventh node 1817, the eighth node 1818 and the ninth node 1819.

FIG. 24: Host Computer Communicating Via a Base Station with a User Equipment Over a Partially Wireless Connection in Accordance with Some Embodiments Example implementations, in accordance with an embodiment, of the UE, as an example of the wireless device 1830, any of the first node 1811, the second node 1812, the third node 1813, the fourth node 1814, the fifth node 1815, the sixth node 1816, the seventh node 1817, the eighth node 1818 and the ninth node 1819, e.g., a base station and host computer discussed in the preceding paragraphs will now be described with reference to FIG. 24. In communication system 2400, such as the communications network 1800, host computer 2410 comprises hardware 2415 including communication interface 2416 configured to set up and maintain a wired or wireless connection with an interface of a different communication device of communication system 2400. Host computer 2410 further comprises processing circuitry 2418, which may have storage and/or processing capabilities. In particular, processing circuitry 2418 may comprise one or more programmable processors, application-specific integrated circuits, field programmable gate arrays or combinations of these (not shown) adapted to execute instructions. Host computer 2410 further comprises software 2411, which is stored in or accessible by host computer 2410 and executable by processing circuitry 2418. Software 2411 includes host application 2412. Host application 2412 may be operable to provide a service to a remote user, such as UE 2430 connecting via OTT connection 2450 terminating at UE 2430 and host computer 2410. In providing the service to the remote user, host application 2412 may provide user data which is transmitted using OTT connection 2450.

Communication system 2400 further includes any of the first node 1811, the second node 1812, the third node 1813, the fourth node 1814, the fifth node 1815, the sixth node 1816, the seventh node 1817, the eighth node 1818 and the ninth node 1819, exemplified in FIG. 24 as a base station 2420 provided in a telecommunication system and comprising hardware 2425 enabling it to communicate with host computer 2410 and with UE 2430. Hardware 2425 may include communication interface 2426 for setting up and maintaining a wired or wireless connection with an interface of a different communication device of communication system 2400, as well as radio interface 2427 for setting up and maintaining at least wireless connection 2470 with the wireless device 1830, exemplified in FIG. 24 as a UE 2430 located in a coverage area (not shown in FIG. 24) served by base station 2420. Communication interface 2426 may be configured to facilitate connection 2460 to host computer 2410. Connection 2460 may be direct, or it may pass through a core network (not shown in FIG. 24) of the telecommunication system and/or through one or more intermediate networks outside the telecommunication system. In the embodiment shown, hardware 2425 of base station 2420 further includes processing circuitry 2428, which may comprise one or more programmable processors, application-specific integrated circuits, field programmable gate arrays or combinations of these (not shown) adapted to execute instructions. Base station 2420 further has software 2421 stored internally or accessible via an external connection.

Communication system 2400 further includes UE 2430 already referred to. Its hardware 2435 may include radio interface 2437 configured to set up and maintain wireless connection 2470 with a base station serving a coverage area in which UE 2430 is currently located. Hardware 2435 of UE 2430 further includes processing circuitry 2438, which may comprise one or more programmable processors, application-specific integrated circuits, field programmable gate arrays or combinations of these (not shown) adapted to execute instructions. UE 2430 further comprises software 2431, which is stored in or accessible by UE 2430 and executable by processing circuitry 2438. Software 2431 includes client application 2432. Client application 2432 may be operable to provide a service to a human or non-human user via UE 2430, with the support of host computer 2410. In host computer 2410, an executing host application 2412 may communicate with the executing client application 2432 via OTT connection 2450 terminating at UE 2430 and host computer 2410. In providing the service to the user, client application 2432 may receive request data from host application 2412 and provide user data in response to the request data. OTT connection 2450 may transfer both the request data and the user data. Client application 2432 may interact with the user to generate the user data that it provides.

It is noted that host computer 2410, base station 2420 and UE 2430 illustrated in FIG. 24 may be similar or identical to host computer 2330, one of base stations 2312a, 2312b, 2312c and one of UEs 2391, 2392 of FIG. 23, respectively. This is to say, the inner workings of these entities may be as shown in FIG. 24 and independently, the surrounding network topology may be that of FIG. 23.

In FIG. 24, OTT connection 2450 has been drawn abstractly to illustrate the communication between host computer 2410 and UE 2430 via base station 2420, without explicit reference to any intermediary devices and the precise routing of messages via these devices. Network infrastructure may determine the routing, which it may be configured to hide from UE 2430 or from the service provider operating host computer 2410, or both. While OTT connection 2450 is active, the network infrastructure may further take decisions by which it dynamically changes the routing (e.g., on the basis of load balancing consideration or reconfiguration of the network).

Wireless connection 2470 between UE 2430 and base station 2420 is in accordance with the teachings of the embodiments described throughout this disclosure. One or more of the various embodiments improve the performance of OTT services provided to UE 2430 using OTT connection 2450, in which wireless connection 2470 forms the last segment. More precisely, the teachings of these embodiments may improve the latency, signalling overhead, and service interruption and thereby provide benefits such as reduced user waiting time, better responsiveness and extended battery lifetime.

A measurement procedure may be provided for the purpose of monitoring data rate, latency and other factors on which the one or more embodiments improve. There may further be an optional network functionality for reconfiguring OTT connection 2450 between host computer 2410 and UE 2430, in response to variations in the measurement results. The measurement procedure and/or the network functionality for reconfiguring OTT connection 2450 may be implemented in software 2411 and hardware 2415 of host computer 2410 or in software 2431 and hardware 2435 of UE 2430, or both. In embodiments, sensors (not shown) may be deployed in or in association with communication devices through which OTT connection 2450 passes; the sensors may participate in the measurement procedure by supplying values of the monitored quantities exemplified above, or supplying values of other physical quantities from which software 2411, 2431 may compute or estimate the monitored quantities. The reconfiguring of OTT connection 2450 may include message format, retransmission settings, preferred routing etc.; the reconfiguring need not affect base station 2420, and it may be unknown or imperceptible to base station 2420. Such procedures and functionalities may be known and practiced in the art. In certain embodiments, measurements may involve proprietary UE signalling facilitating host computer 2410's measurements of throughput, propagation times, latency and the like. The measurements may be implemented in that software 2411 and 2431 causes messages to be transmitted, in particular empty or 'dummy' messages, using OTT connection 2450 while it monitors propagation times, errors etc.

The first node 1811 embodiments relate to FIG. 19, FIG. 21 and FIGS. 23-28.

The second node 1812 embodiments relate to FIG. 20, FIG. 22 and FIGS. 23-28.

The first node 1811 may also be configured to communicate user data with a host application unit in a host computer 2410, e.g., via another link such as 2450.

The first node 1811 may comprise an interface unit to facilitate communications between the first node 1811 and other nodes or devices, e.g., any of the second node 1812, the third node 1813, the fourth node 1814, the fifth node 1815, the sixth node 1816, the seventh node 1817, the eighth node 1818 and the ninth node 1819, the sending node 1801, the receiving node 1802, the at least one intermediate node 1803, the one or more next hop nodes 1804, 1805, the wireless device 1830, the host computer 2410, and/or any of the other nodes. In some particular examples, the interface may, for example, include a transceiver configured to transmit and receive radio signals over an air interface in accordance with a suitable standard.

The first node 1811 may comprise an arrangement as shown in FIG. 21 or in FIG. 24.

The second node 1812 may also be configured to communicate user data with a host application unit in a host computer 2410, e.g., via another link such as 2450.

The second node 1812 may comprise an interface unit to facilitate communications between the second node 1812 and other nodes or devices, e.g., any of the first node 1811, the third node 1813, the fourth node 1814, the fifth node 1815, the sixth node 1816, the seventh node 1817, the eighth node 1818 and the ninth node 1819, the sending node 1801, the receiving node 1802, the at least one intermediate node 1803, the one or more next hop nodes 1804, 1805, and/or the wireless device 1830, the host computer 2410, or any of the other nodes. In some particular examples, the interface may, for example, include a transceiver configured to transmit and receive radio signals over an air interface in accordance with a suitable standard.

The second node 1812 may comprise an arrangement as shown in FIG. 22 or in FIG. 24.

FIG. 25: Methods Implemented in a Communication System Including a Host Computer, a Base Station and a User Equipment in Accordance with Some Embodiments FIG. 25 is a flowchart illustrating a method implemented in a communication system, in accordance with one embodiment. The communication system includes a host computer, a base station and a UE which may be those described with reference to FIGS. 23 and 24. For simplicity of the present disclosure, only drawing references to FIG. 25 will be included in this section. In step 2510, the host computer provides user data. In substep 2511 (which may be optional) of step 2510, the host computer provides the user data by executing a host application. In step 2520, the host computer initiates a transmission carrying the user data to the UE. In step 2530 (which may be optional), the base station transmits to the UE the user data which was carried in the transmission that the host computer initiated, in accordance with the teachings of the embodiments described throughout this disclosure. In step 2540 (which may also be optional), the UE executes a client application associated with the host application executed by the host computer.

FIG. 26: Methods Implemented in a Communication System Including a Host Computer, a Base Station and a User Equipment in Accordance with Some Embodiments FIG. 26 is a flowchart illustrating a method implemented in a communication system, in accordance with one embodiment. The communication system includes a host computer, a base station and a UE which may be those described with reference to FIGS. 23 and 24. For simplicity of the present disclosure, only drawing references to FIG. 26 will be included in this section. In step 2610 of the method, the host computer provides user data. In an optional substep (not shown) the host computer provides the user data by executing a host application. In step 2620, the host computer initiates a transmission carrying the user data to the UE. The transmission may pass via the base station, in accordance with the teachings of the embodiments described throughout this disclosure. In step 2630 (which may be optional), the UE receives the user data carried in the transmission.

Figures 27, 28:
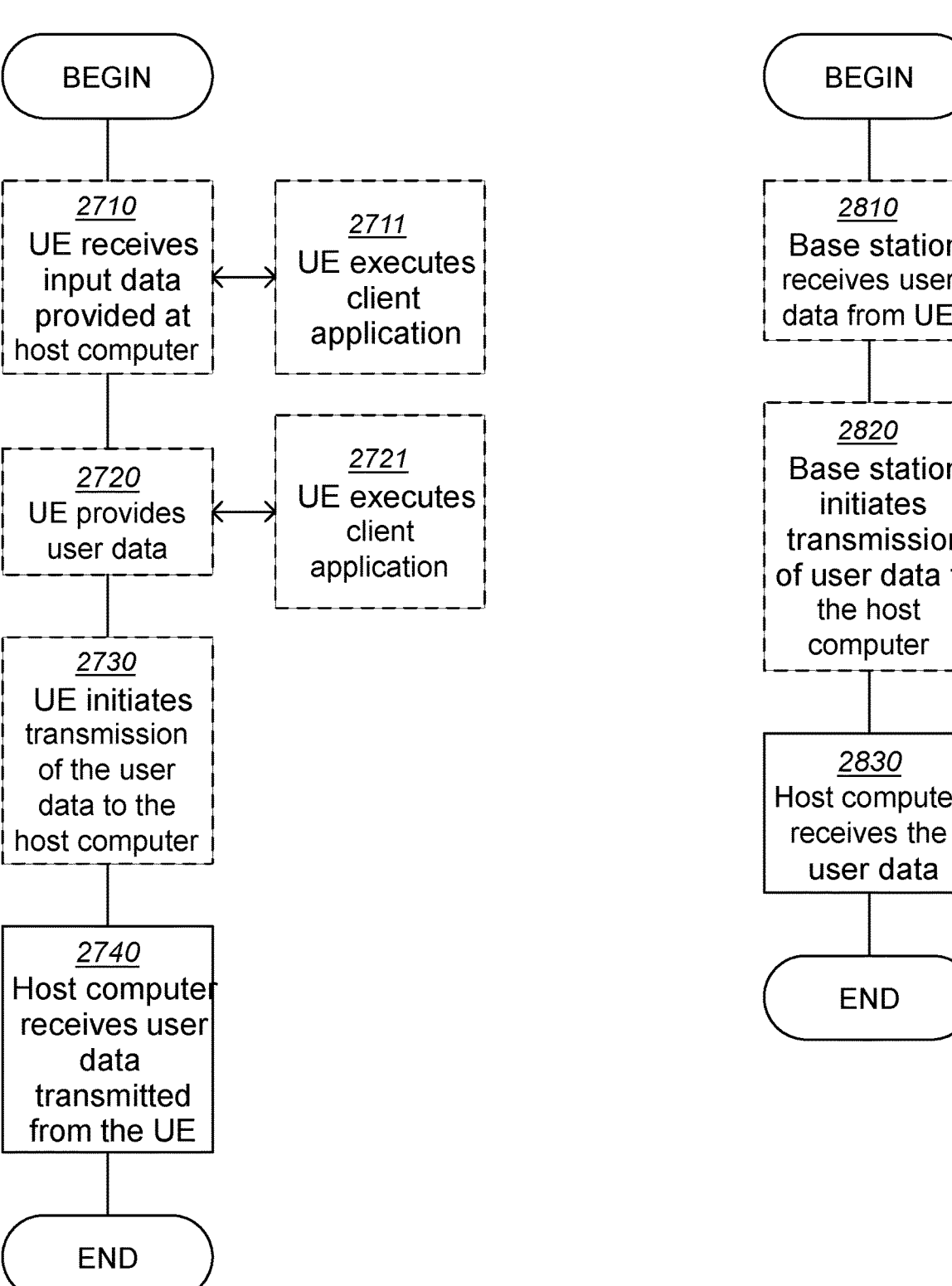
FIG. 27 is a flowchart depicting embodiments of a method in a communications system including a host computer, a base station and a user equipment, according to embodiments herein.
FIG. 28 is a flowchart depicting embodiments of a method in a communications system including a host computer, a base station and a user equipment, according to embodiments herein.

FIG. 27: Methods Implemented in a Communication System Including a Host Computer, a Base Station and a User Equipment in Accordance with Some Embodiments FIG. 27 is a flowchart illustrating a method implemented in a communication system, in accordance with one embodiment. The communication system includes a host computer, a base station and a UE which may be those described with reference to FIGS. 23 and 24. For simplicity of the present disclosure, only drawing references to FIG. 27 will be included in this section. In step 2710 (which may be optional), the UE receives input data provided by the host computer. Additionally or alternatively, in step 2720, the UE provides user data. In substep 2721 (which may be optional) of step 2720, the UE provides the user data by executing a client application. In substep 2711 (which may be optional) of step 2710, the UE executes a client application which provides the user data in reaction to the received input data provided by the host computer. In providing the user data, the executed client application may further consider user input received from the user. Regardless of the specific manner in which the user data was provided, the UE initiates, in substep 2730 (which may be optional), transmission of the user data to the host computer. In step 2740 of the method, the host computer receives the user data transmitted from the UE, in accordance with the teachings of the embodiments described throughout this disclosure.

FIG. 28: Methods Implemented in a Communication System Including a Host Computer, a Base Station and a User Equipment in Accordance with Some Embodiments FIG. 28 is a flowchart illustrating a method implemented in a communication system, in accordance with one embodiment. The communication system includes a host computer, a base station and a UE which may be those described with reference to FIGS. 23 and 24. For simplicity of the present disclosure, only drawing references to FIG. 28 will be included in this section. In step 2810 (which may be optional), in accordance with the teachings of the embodiments described throughout this disclosure, the base station receives user data from the UE. In step 2820 (which may be optional), the base station initiates transmission of the received user data to the host computer. In step 2830 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Further Numbered Embodiments

1. A base station configured to communicate with a user equipment (UE), the base station comprising a radio interface and processing circuitry configured to perform one or more of the actions described herein as performed by any of the first node 1811 and/or the second node 1812.

5. A communication system including a host computer comprising:

processing circuitry configured to provide user data; and a communication interface configured to forward the user data to a cellular network for transmission to a user equipment (UE), wherein the cellular network comprises a base station having a radio interface and processing circuitry, the base station's processing circuitry configured to perform one or more of the actions described herein as performed by any of the first node 1811 and/or the second node 1812.

6. The communication system of embodiment 5, further including the base station.

7. The communication system of embodiment 6, further including the UE, wherein the UE is configured to communicate with the base station.

8. The communication system of embodiment 7, wherein:

the processing circuitry of the host computer is configured to execute a host application, thereby providing the user data; and the UE comprises processing circuitry configured to execute a client application associated with the host application.

11. A method implemented in a base station, comprising one or more of the actions described herein as performed by any of the first node 1811 and/or the second node 1812.

15. A method implemented in a communication system including a host computer, a base station and a user equipment (UE), the method comprising:

at the host computer, providing user data; and at the host computer, initiating a transmission carrying the user data to the UE via a cellular network comprising the base station, wherein the base station performs one or more of the actions described herein as performed by any of the first node 1811 and/or the second node 1812.

16. The method of embodiment 15, further comprising: at the base station, transmitting the user data.

17. The method of embodiment 16, wherein the user data is provided at the host computer by executing a host application, the method further comprising:

at the UE, executing a client application associated with the host application.

21. A user equipment (UE) configured to communicate with a base station, the UE comprising a radio interface and processing circuitry configured to perform one or more of the actions described herein as performed by the wireless device 1830.

25. A communication system including a host computer comprising:

processing circuitry configured to provide user data; and a communication interface configured to forward user data to a cellular network for transmission to a user equipment (UE), wherein the UE comprises a radio interface and processing circuitry, the UE's processing circuitry configured to perform one or more of the actions described herein as performed by the wireless device 1830.

26. The communication system of embodiment 25, further including the UE.

27. The communication system of embodiment 26, wherein the cellular network further includes a base station configured to communicate with the UE.

28. The communication system of embodiment 26 or 27, wherein:

the processing circuitry of the host computer is configured to execute a host application, thereby providing the user data; and the UE's processing circuitry is configured to execute a client application associated with the host application.

31. A method implemented in a user equipment (UE), comprising one or more of the actions described herein as performed by the wireless device 1830.

35. A method implemented in a communication system including a host computer, a base station and a user equipment (UE), the method comprising:

at the host computer, providing user data; and at the host computer, initiating a transmission carrying the user data to the UE via a cellular network comprising the base station, wherein the UE performs one or more of the actions described herein as performed by the wireless device 1830.

36. The method of embodiment 35, further comprising: at the UE, receiving the user data from the base station.

41. A user equipment (UE) configured to communicate with a base station, the UE comprising a radio interface and processing circuitry configured to perform one or more of the actions described herein as performed by the wireless device 1830.

45. A communication system including a host computer comprising:

a communication interface configured to receive user data originating from a transmission from a user equipment (UE) to a base station, wherein the UE comprises a radio interface and processing circuitry, the UE's processing circuitry configured to: perform one or more of the actions described herein as performed by the wireless device 1830.

46. The communication system of embodiment 45, further including the UE.

47. The communication system of embodiment 46, further including the base station, wherein the base station comprises a radio interface configured to communicate with the UE and a communication interface configured to forward to the host computer the user data carried by a transmission from the UE to the base station.

48. The communication system of embodiment 46 or 47, wherein:

the processing circuitry of the host computer is configured to execute a host application; and the UE's processing circuitry is configured to execute a client application associated with the host application, thereby providing the user data.

49. The communication system of embodiment 46 or 47, wherein:

the processing circuitry of the host computer is configured to execute a host application, thereby providing request data; and the UE's processing circuitry is configured to execute a client application associated with the host application, thereby providing the user data in response to the request data.

51. A method implemented in a user equipment (UE), comprising one or more of the actions described herein as performed by the wireless device 1830.

52. The method of embodiment 51, further comprising:

providing user data; and forwarding the user data to a host computer via the transmission to the base station.

55. A method implemented in a communication system including a host computer, a base station and a user equipment (UE), the method comprising:

at the host computer, receiving user data transmitted to the base station from the UE, wherein the UE performs one or more of the actions described herein as performed by the wireless device 1830.

56. The method of embodiment 55, further comprising:

at the UE, providing the user data to the base station.

57. The method of embodiment 56, further comprising:

at the UE, executing a client application, thereby providing the user data to be transmitted; and at the host computer, executing a host application associated with the client application.

58. The method of embodiment 56, further comprising:

at the UE, executing a client application; and at the UE, receiving input data to the client application, the input data being provided at the host computer by executing a host application associated with the client application, wherein the user data to be transmitted is provided by the client application in response to the input data.

61. A base station configured to communicate with a user equipment (UE), the base station comprising a radio interface and processing circuitry configured to perform one or more of the actions described herein as performed by any of the first node 1811 and/or the second node 1812.

65. A communication system including a host computer comprising a communication interface configured to receive user data originating from a transmission from a user equipment (UE) to a base station, wherein the base station comprises a radio interface and processing circuitry, the base station's processing circuitry configured to perform one or more of the actions described herein as performed by any of the first node 1811 and/or the second node 1812.

66. The communication system of embodiment 65, further including the base station.

67. The communication system of embodiment 66, further including the UE, wherein the UE is configured to communicate with the base station.

68. The communication system of embodiment 67, wherein:

the processing circuitry of the host computer is configured to execute a host application;

the UE is configured to execute a client application associated with the host application, thereby providing the user data to be received by the host computer.

71. A method implemented in a base station, comprising one or more of the actions described herein as performed by any of the first node 1811 and/or the second node 1812.

75. A method implemented in a communication system including a host computer, a base station and a user equipment (UE), the method comprising:

at the host computer, receiving, from the base station, user data originating from a transmission which the base station has received from the UE, wherein the UE performs one or more of the actions described herein as performed by the wireless device 1830.

76. The method of embodiment 75, further comprising:

at the base station, receiving the user data from the UE.

77. The method of embodiment 76, further comprising:

at the base station, initiating a transmission of the received user data to the host computer.

REFERENCES

1. TS 38.340, v. 16.0.0.
2. TS 38.300, v. 16.1.0
3. TS 37.340, v. 16.1.0
4. TS 38.473, v. 16.1.0

The invention claimed is:

1. A method performed by a first node, the method being for handling transmission of one or more packets from a sending node to a receiving node, the first node operating in an Integrated Access and Backhaul, IAB, communications network, the IAB communications network comprising at least one intermediate node between the sending node and the receiving node, the method comprising:

determining whether or not to duplicate the one or more packets exchanged between the first node and a second node comprised in the IAB communications network, duplicating, based on the determination, the one or more packets at a Backhaul Adaptation Protocol (BAP) layer, and sending at least one of the one or more packets and the one or more duplicates over the BAP layer, wherein the determining of whether or not to duplicate is based on the existence of a single or multiple paths between the first node and the second node.

2. The method according to claim 1, further comprising:

sending, to the second node, a first indication indicating to send the one or more packets and the one or more duplicates towards the receiving node via different links.

3. A method performed by a second node, the method being for handling transmission of one or more packets from a sending node to a receiving node, the second node operating in an Integrated Access and Backhaul, IAB, network, the IAB network comprising at least one intermediate node between the sending node and the receiving node, the method comprising:

receiving at least one of the one or more packets and one or more duplicates of the one or more packets over the Backhaul Adaptation Protocol (BAP) layer, wherein the one or more duplicates of the one or more packets are duplicated by the sending node at the BAP layer.

4. The method according to claim 3, further comprising:

receiving, from the first node, a first indication to send the one or more packets and the one or more duplicates towards the receiving node via different links.

5. A first node for handling transmission of one or more packets from a sending node to a receiving node, the first node being configured to operate in an Integrated Access and Backhaul, IAB, communications network, the IAB network being configured to comprise at least one intermediate node between the sending node and the receiving node, the first node being further configured to:

determine whether or not to duplicate the one or more packets exchanged between the first node and a second node configured to be comprised in the IAB communications network, duplicate, based on the determination, the one or more packets at a Backhaul Adaptation Protocol (BAP) layer, and send at least one of the one or more packets and the one or more duplicates over the BAP layer, wherein the determining of whether or not to duplicate is based on the existence of a single or multiple paths between the first node and the second node.

6. The first node according to claim 5, wherein the first node is configured to be one of: (i) the sending node, (ii) a node configured to provide access to the IAB communications network to one of the sending node and the receiving node, (iii) a donor distributed unit, or (iv) the at least one intermediate node between the sending node and the receiving node.

7. The first node according to claim 5, being further configured to:

determine a fourth identity of the second node, the determining of the fourth identity being configured to be based on one or more of:

i. whether or not the first node has information on the second node, ii. a number of outgoing links of the second node, iii. a load of the second node, and/or iv. a quality of a respective link between the first node and the second node.

8. The first node according to claim 5, wherein the determining of whether or not to duplicate is further configured to comprise determining whether or not to remove one or more duplicates of the one or more packets prior to sending the one or more packets.

9. The first node according to claim 5, wherein the determining of whether or not to duplicate is configured to be based on one or more of:

an attribute, explicit or derived, of the one or more packets, a first identity of the sending node, a second identity of the receiving node, a third identity of the second node, and/or an indication that the one or more packets are to be duplicated.

10. The first node according to claim 9, wherein the attribute is configured to be one of:

a backhaul logical channel configured to be associated with the one or more packets, a first identifier of a path configured to be associated with the one or more packets, a second identifier of a BAP routing configured to be associated with the one or more packets, a Quality of Service, Qos, configured to be associated with the one or more packets, a delay of the one or more packets, or a traffic type configured to be associated with the one or more packets, and a Radio Link Control mode configured to be associated with the one or more packets.

11. The first node according to claim 5, wherein the determining of whether or not to duplicate is configured to be based on the existence of a single or multiple paths between the first node and the receiving node.

12. The first node according to claim 5, being further configured to:

send, to the second node, a first indication configured to indicate to send the one or more packets and the one or more duplicates towards the receiving node via different links.

13. A second node, for handling transmission of one or more packets from a sending node to a receiving node, the second node being configured to operate in an Integrated Access and Backhaul, IAB, network, the IAB network being configured to comprise at least one intermediate node configured to be between the sending node and the receiving node, the second node being further configured to:

receive at least one of the one or more packets and one or more duplicates of the one or more packets over the Backhaul Adaptation Protocol (BAP) layer, wherein the one or more duplicates of the one or more packets are duplicated by the sending node at the BAP layer.

14. The second node according to claim 13, wherein the first node is configured to be one of: the sending node, a node configured to provide access to the IAB network to one of the sending node and the receiving node, a donor distributed unit, or the at least one intermediate node configured to be between the sending node and the receiving node.

15. The second node according to claim 13, wherein the receiving is configured to be based on one or more of:

i. a number of outgoing links of the second node, ii. a load of the second node, and/or iii. a quality of a respective link between the first node and the second node.

16. The second node according to claim 13, wherein the receiving is configured to be based on one or more of:

an attribute, explicit or derived, of the one or more packets, a first identity of the sending node, a second identity of the receiving node, a third identity of the second node, and/or an indication that the one or more packets are to be duplicated.

17. The second node according to claim 16, wherein the attribute is configured to be one of:

a backhaul logical channel configured to be associated with the one or more packets, a first identifier of a path configured to be associated with the one or more packets, a second identifier of a BAP routing configured to be associated with the one or more packets, a Quality of Service, Qos, configured to be associated with the one or more packets, a delay of the one or more packets, a traffic type configured to be associated with the one or more packets, or a Radio Link Control mode configured to be associated with the one or more packets.

18. The second node according to claim 13, wherein the receiving is configured to be based on the existence of a single or multiple paths between the first node and the receiving node.

19. The second node according to claim 13, being further configured to:

receive, from the first node, a first indication to send the one or more packets and the one or more duplicates towards the receiving node via different links.

\* \* \* \* \*